United States Patent [19]
Barton et al.

[11] Patent Number: 5,343,461
[45] Date of Patent: Aug. 30, 1994

[54] FULL DUPLEX DIGITAL TRANSMISSION FACILITY LOOP-BACK TEST, DIAGNOSTICS AND MAINTENANCE SYSTEM

[75] Inventors: John C. Barton, Naperville; William J. Hanby, Bloomingdale; Bruce R. Kuhn, Bollingbrook; Michael F. Lathrope, Naperville; Christopher F. Simanonis, Wheaton; Arthur J. Varga, West Dundee, all of Ill.

[73] Assignee: Ameritech Services, Inc., Hoffman Estates, Ill.

[21] Appl. No.: 750,407

[22] Filed: Aug. 27, 1991

[51] Int. Cl.[5] .............................................. H04J 3/14
[52] U.S. Cl. ...................................... 370/13; 370/15; 370/17; 375/10; 371/20.1; 371/20.5; 379/1; 379/5
[58] Field of Search ................ 370/13, 15, 17; 379/1, 379/5; 375/10; 371/20.1, 20.5

[56] References Cited

U.S. PATENT DOCUMENTS

| | | | |
|---|---|---|---|
| 3,938,144 | 2/1976 | Pederson et al. | 370/13 X |
| 4,196,321 | 4/1980 | Bosik | 370/14 |
| 4,273,955 | 6/1981 | Armstrong | 370/13 X |
| 4,380,810 | 4/1983 | Canniff | 370/15 |
| 4,763,317 | 8/1988 | Lehman et al. | 370/58 |
| 4,852,082 | 7/1989 | Haass | 370/32 |
| 4,907,223 | 3/1990 | Wroblewski | 370/85.8 |
| 4,908,819 | 3/1990 | Casady et al. | 370/15 |
| 4,924,489 | 5/1990 | Lawrence et al. | 379/6 |
| 4,980,887 | 12/1990 | Dively et al. | 370/13.1 X |
| 5,036,318 | 7/1991 | Bachhuber et al. | 370/85.1 X |

OTHER PUBLICATIONS

"Network Element Server Family," 54002.16/08–90 Issue 1; Aug. 27, 1990; Northern Telecom.

*Primary Examiner*—Douglas W. Olms
*Assistant Examiner*—Russell W. Blum
*Attorney, Agent, or Firm*—Hamman & Benn

[57] ABSTRACT

A full duplex digital transmission, high-capacity digital, facility loop-back test, diagnostics and maintenance system having a digital transmission facility, transmission medium, and at least one microprocessor-based, full duplex facility loop-back diagnostics interface is located at predetermined end-user locations within the system. The system is capable of initiating a facility loop-back test and predetermined diagnostics for a predetermined digital transmission span and customer premises equipment at the location of the network interface for a specified end-user. The facility loop-back diagnostics interface has a performance monitoring mode of operation and a maintenance facility loop-back mode of operation. The diagnostics interface can be activated from a remote location and is compatible with and supports a particular protocol, specifically LAP-B protocol. The diagnostics interface has integral performance monitoring capabilities for nonintrusive multiple diagnostics testing and on-line monitoring of multiple predetermined performance characteristics for associated DS1 communications channels, or a specified DS1 communications channel, and customer premises equipment at the network interface. The microprocessor of the performance monitoring unit for the facility loop-back diagnostics interface is synchronized with an internal clock that is driven by conventional power. There is also a long-life battery for preventing historical performance data from being corrupted during a power loss. When the diagnostics interface is in the performance monitoring mode of operation, historical performance data pertaining to predetermined performance characteristics and criteria can be retrieved by utilizing the extended superframe, or superframe, embedded operations channel.

28 Claims, 23 Drawing Sheets

Microfiche Appendix Included
(1 Microfiche, 19 Pages)

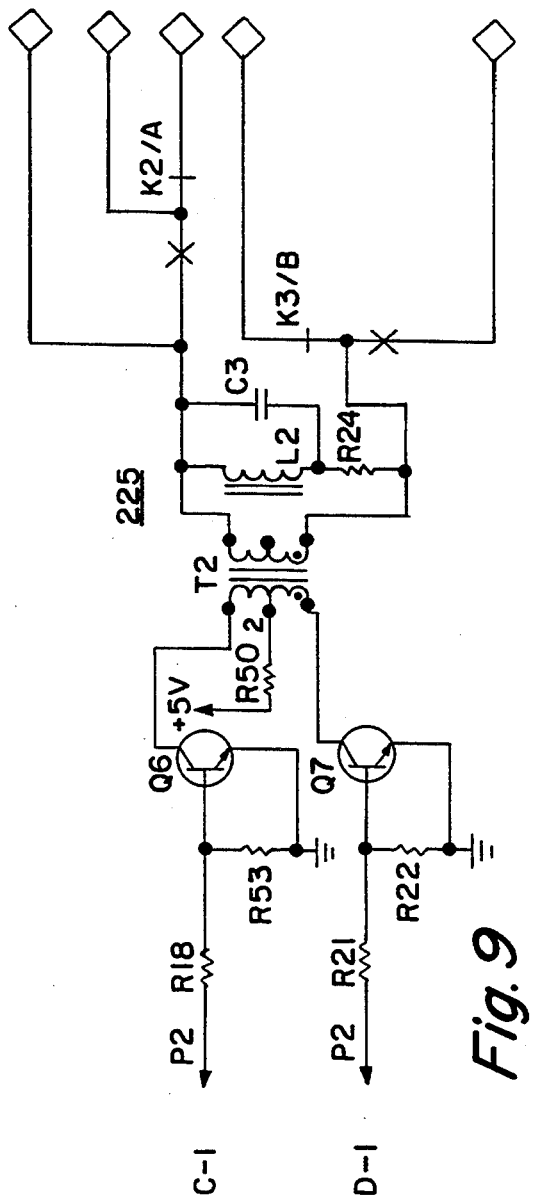
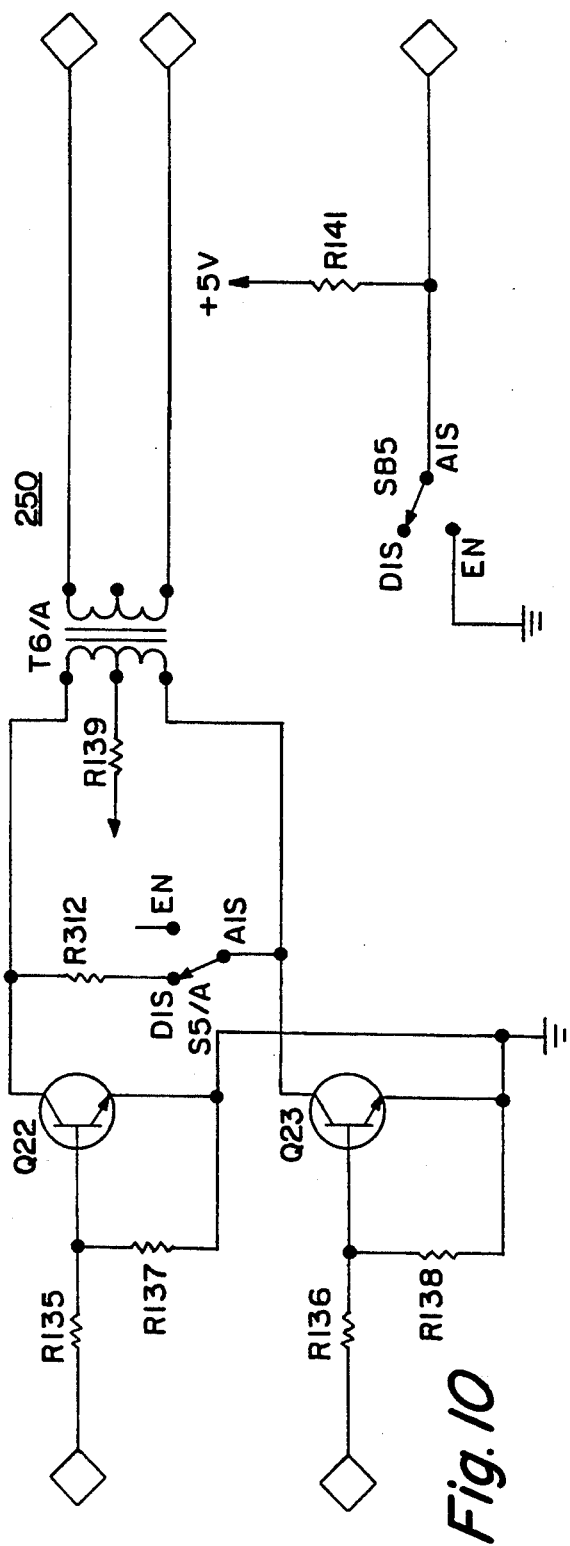
Fig. 9
Fig. 10

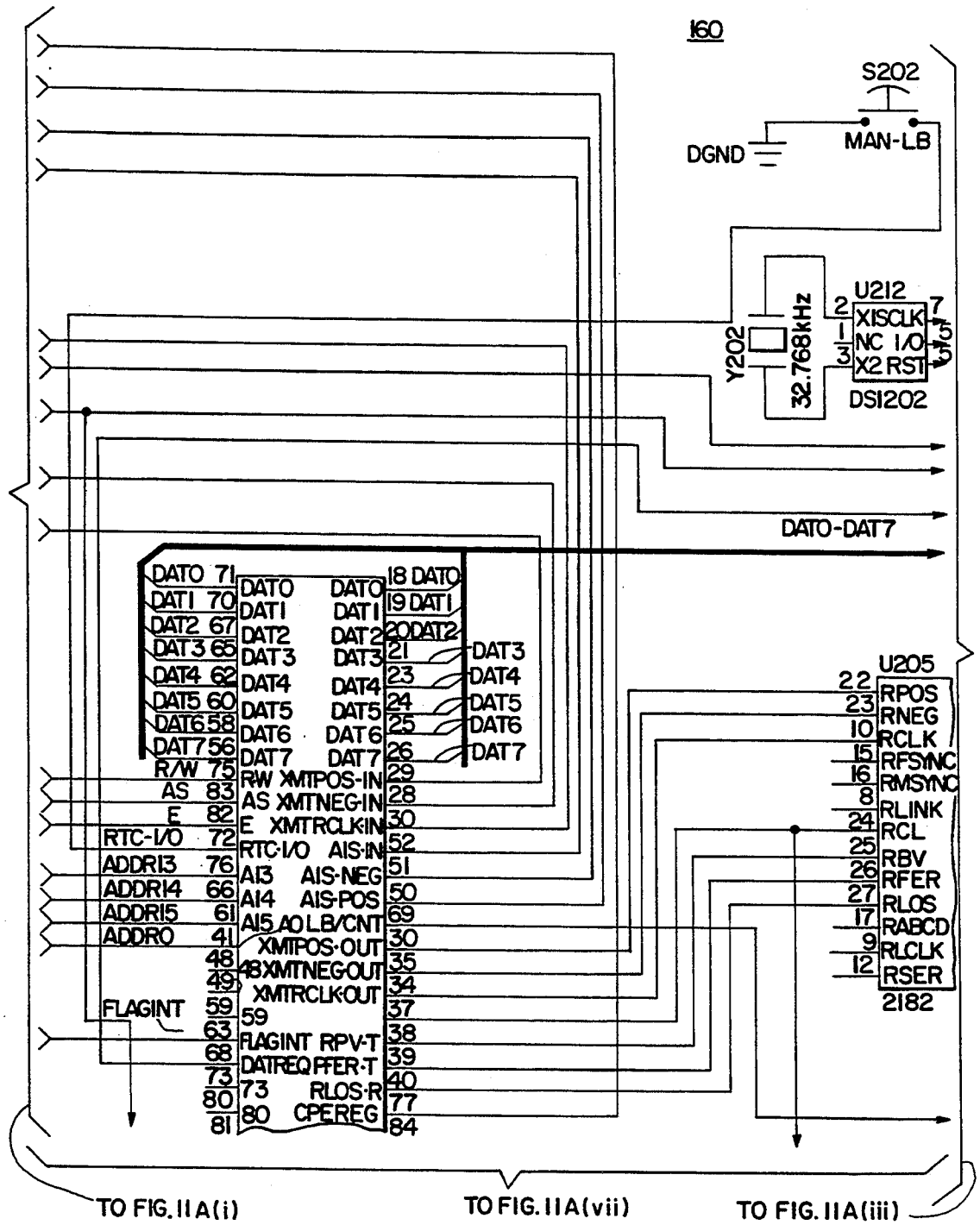
Fig. 11A(ii)

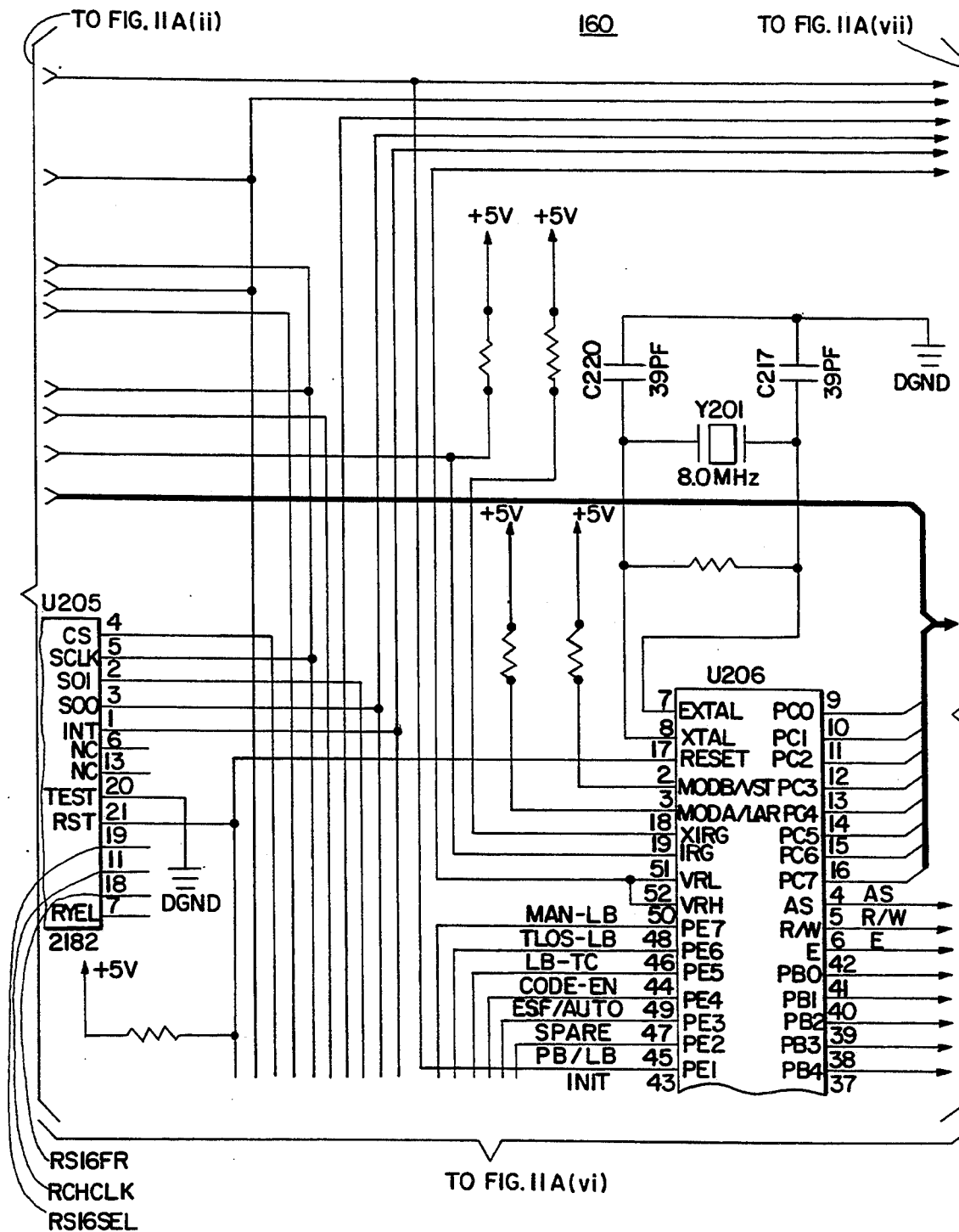
Fig. IIA(iii)

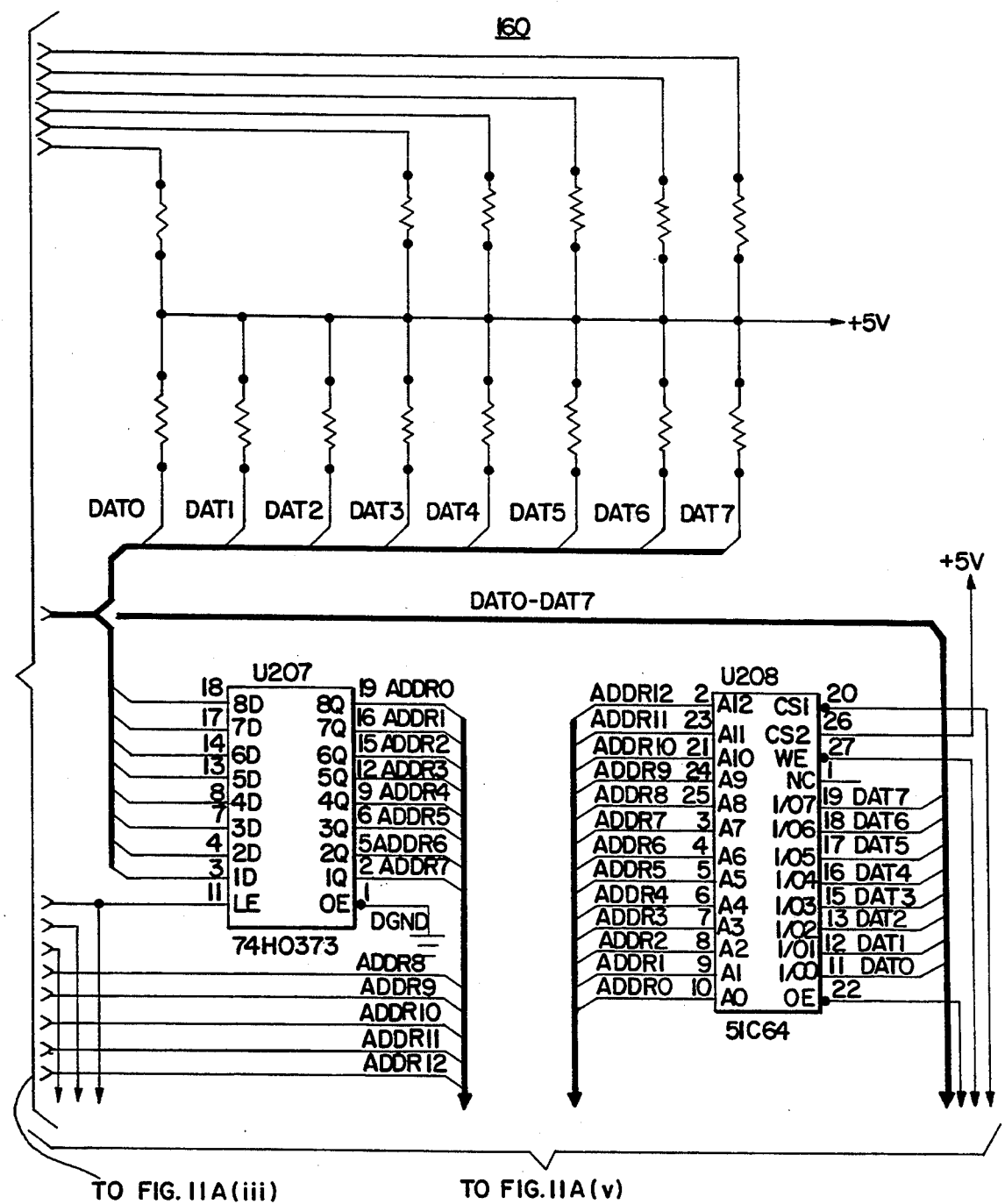
Fig. 11A(iv)

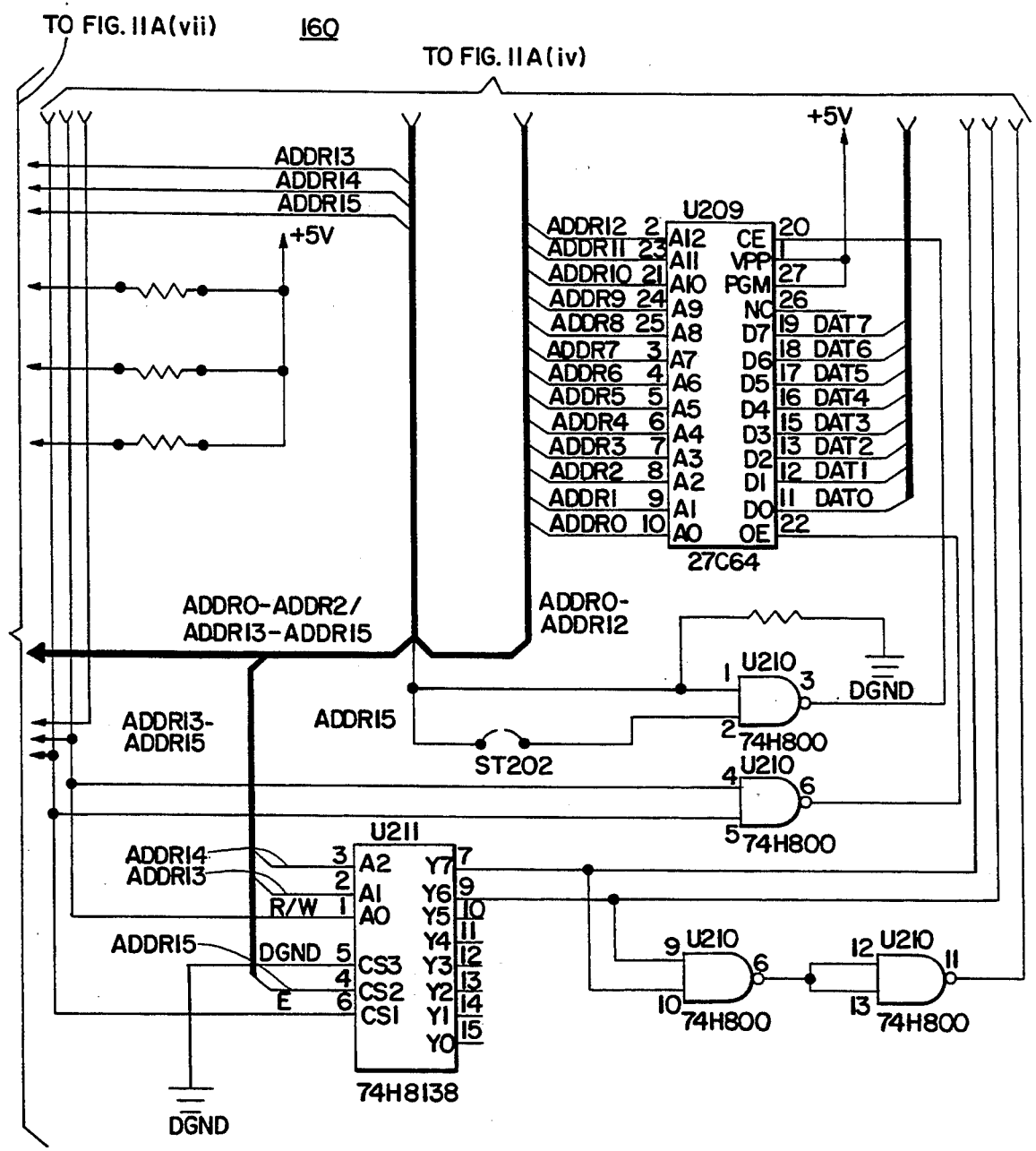
Fig. IIA(v)

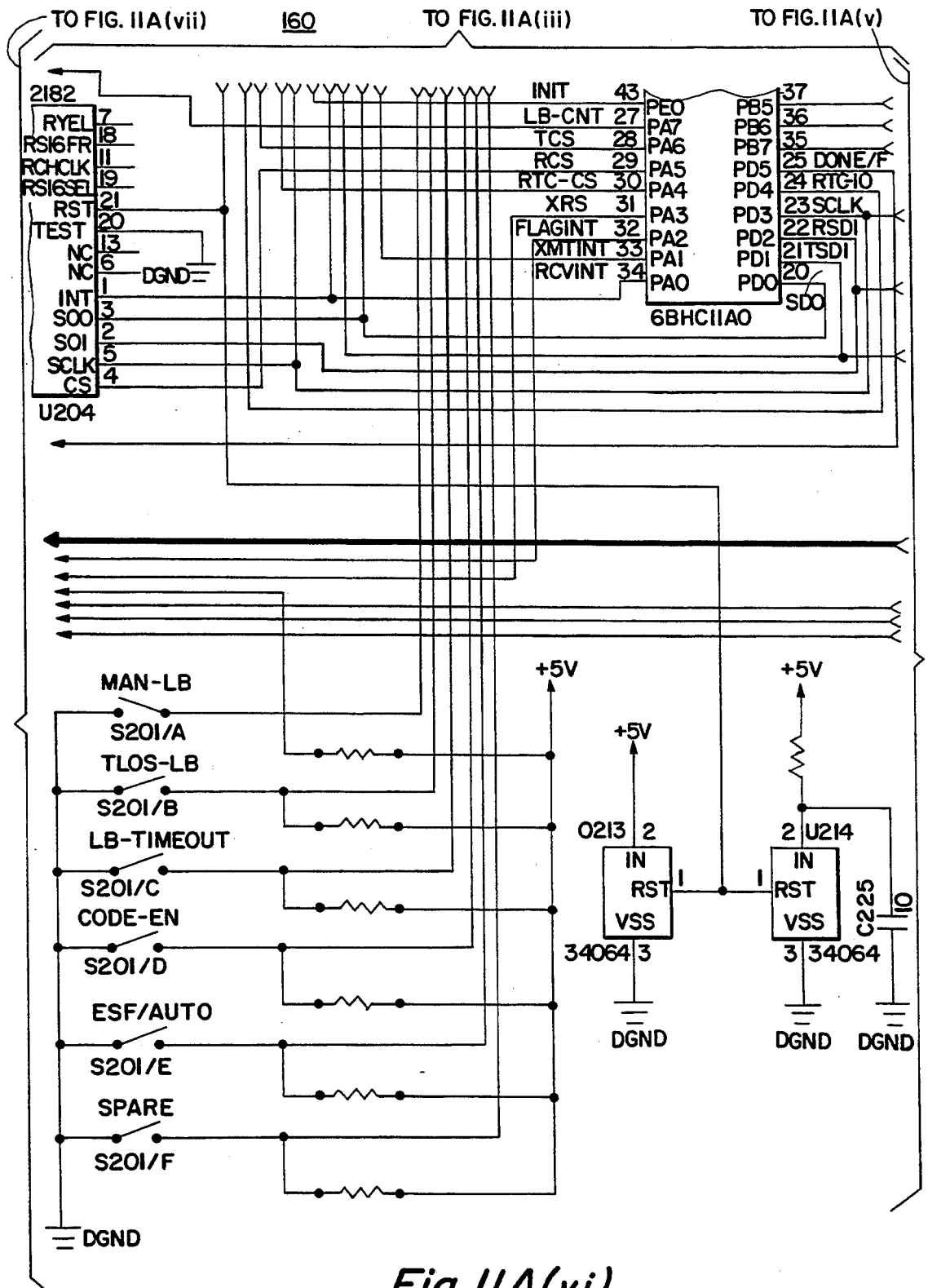
Fig. IIA(vi)

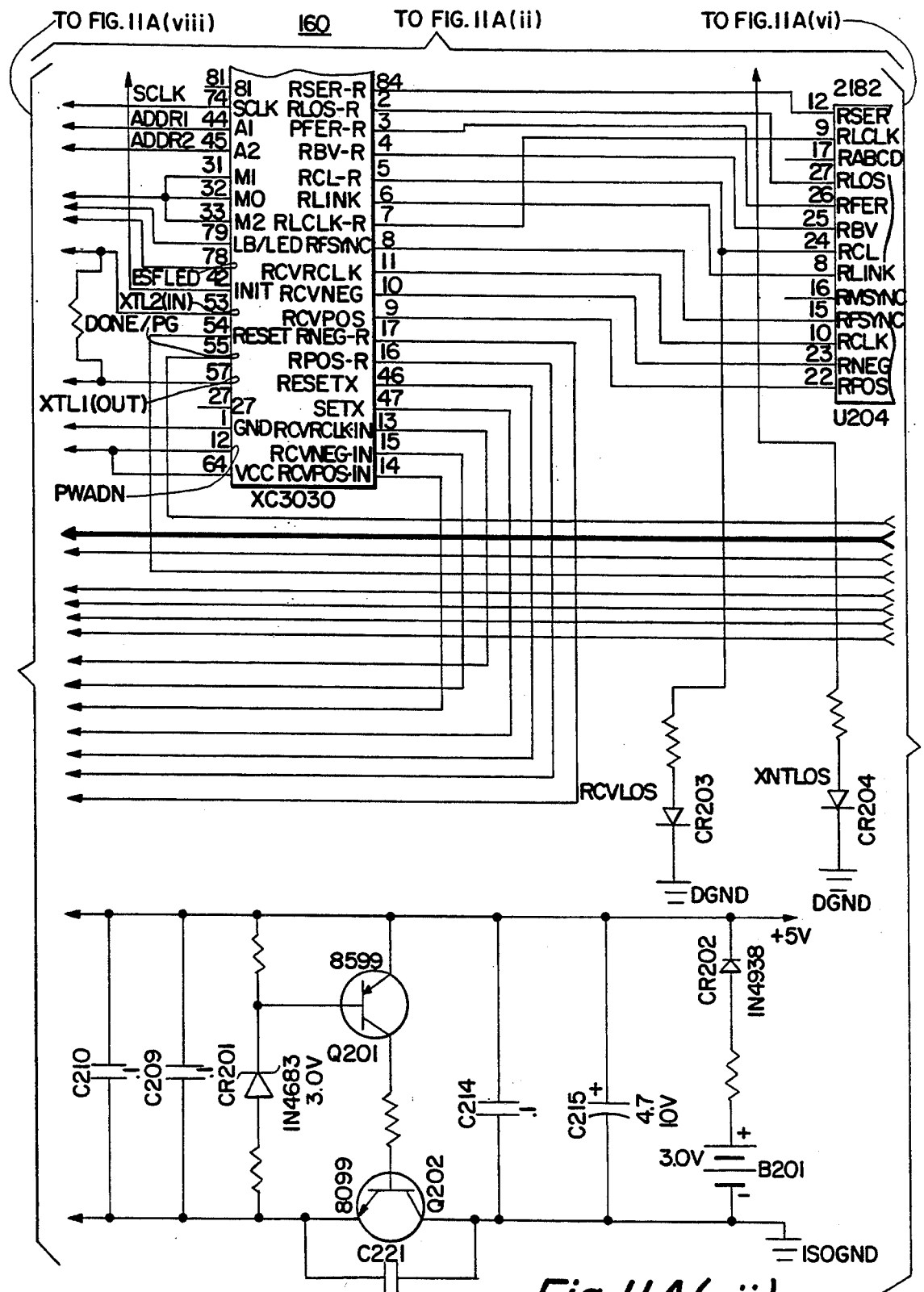
Fig. 11A(vii)

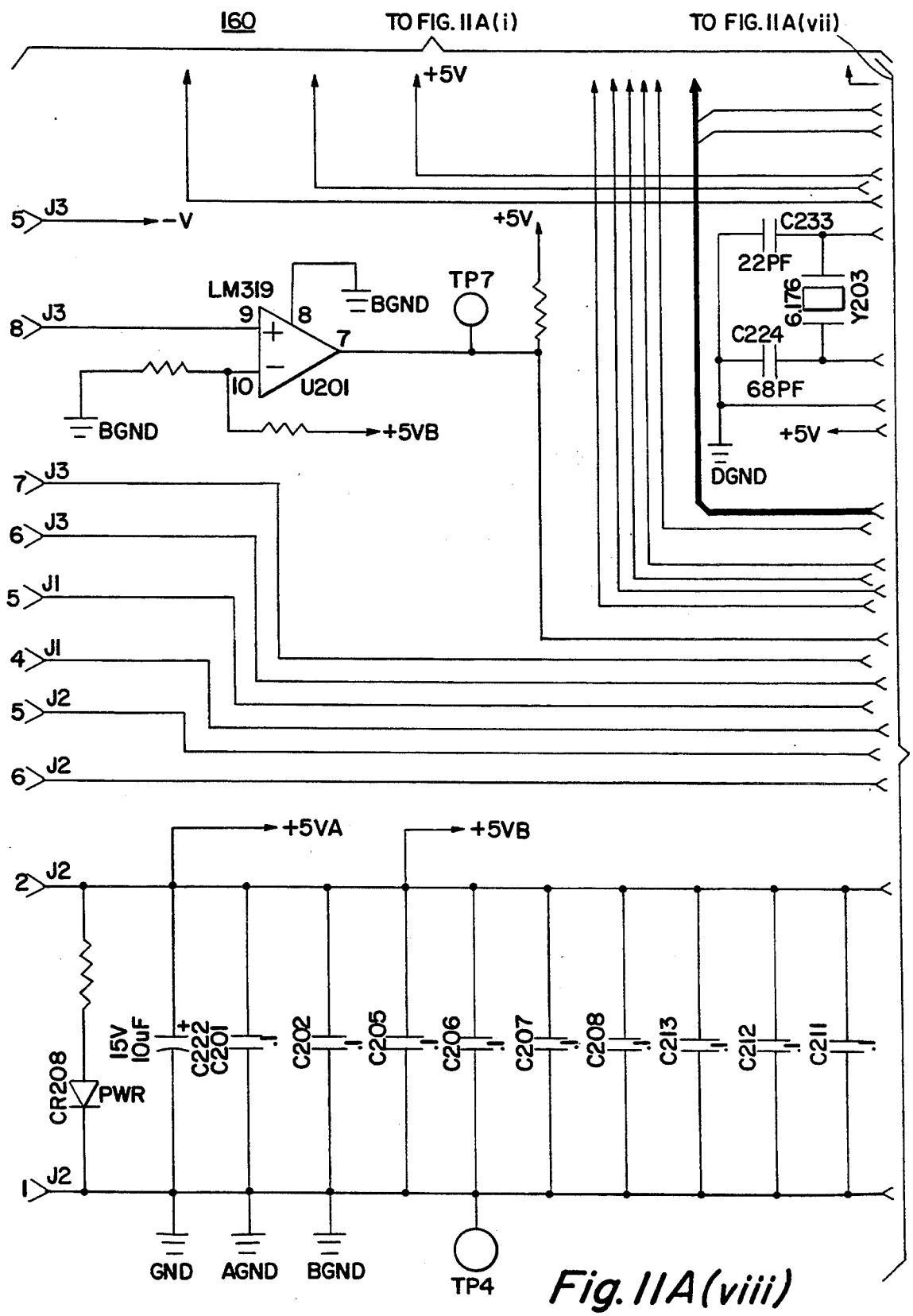
Fig. 11A(viii)

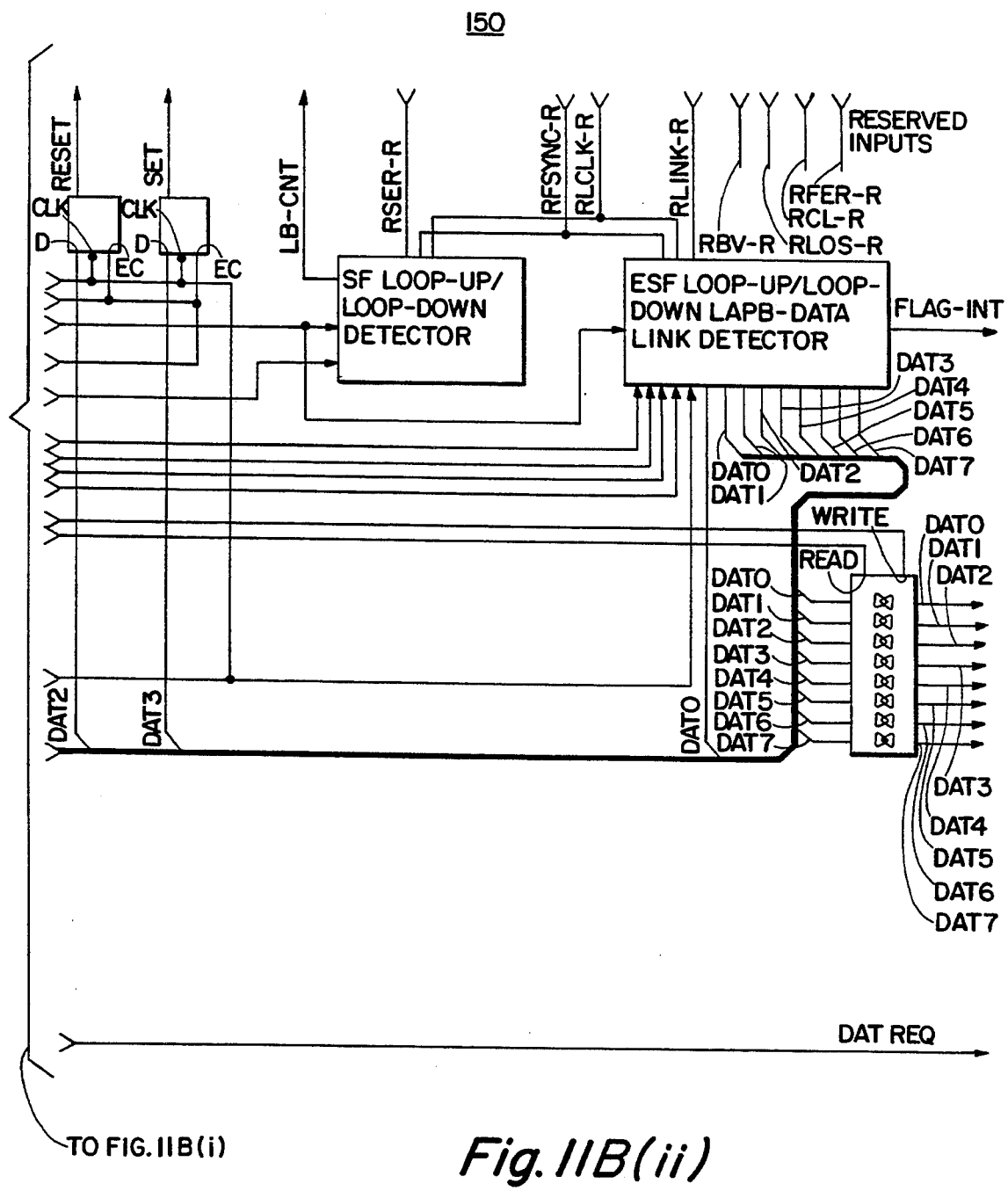
Fig. 11B(ii)

FULL DUPLEX DIGITAL TRANSMISSION FACILITY LOOP-BACK TEST, DIAGNOSTICS AND MAINTENANCE SYSTEM

APPENDIX I

Available as a microfiche reproduction on one microfiche with 19 pages.

TECHNICAL FIELD

The present invention relates to an apparatus for a full duplex facility loop-back test, diagnostics and maintenance system having an intelligent diagnostics interface which is used in conjunction with high-capacity digital telephone service (standard 4-wire, T1 service) for completely testing the operability, as well as conducting performance monitoring and diagnostics, of a specified DS1 transmission span and the remotely situated customer premises equipment, and more particularly, to a full duplex facility loop-back test, diagnostics and maintenance system having a microprocessor-based diagnostics interface having separate performance monitoring and diagnostics capabilities, which can be activated remotely, or at location of the network interface for the end-user (or "subscriber"), and which is capable of supporting a specified protocol, particularly LAP-B protocol, and having integral maintenance capabilities for the continuous nonintrusive performance on-line monitoring of multiple predetermined critical performance criteria (or characteristics associated with the DS1 telephone service), and diagnostic testing, for either the DS1 transmission span facilities, or for a specified DS1 transmission span facility, or for the customer premises equipment.

BACKGROUND OF THE INVENTION

It has been the long-felt need of the independent local telephone company (hereafter "telephone company" or "operating company") or telephone service provider (hereafter "service provider") to maximize the utilization of a subscriber's high-capacity telephone line (that is, at least 1.544 Mbps or DS1) by being able to have the capability of providing automated diagnostics of the high-capacity digital transmission path through customer premises equipment of the end-user (or "subscriber" used interchangeably hereinafter) from either a remote location, or the location of the end-user, as well as be able to conduct a facility loop-back test from a remote location, or location of the end-user, that would be able to test the portion of the transmission circuit that is situated between the particular central office and the customer premises equipment of the end-user. This is accomplished by allowing the network control center to be able to initiate facility loop-back tests by the sending of in-band or out-of-band command codes (depending on the associated framing) to remote customer premises equipment over the packet switched network, the codes being compatible with the specific protocol associated with high-capacity digital transmission presentations. Additionally, it has always been a need of the telephone company or service provider to have the technical capability to conduct continuous nonintrusive diagnostics performance monitoring with respect to multiple key variables or characteristics, thereafter store the relevant historical performance data (in associated memory or otherwise) with respect to the digital circuit for a period of time, and then be able to recall this historical performance data whenever a service disruption has been reported by the end-user, in order to determine (i) what the specific problem was that the end-user experienced, (ii) where in the transmission path was the problem fault located, and (iii) what could be done in the form of preventive maintenance in order not to re-experience or repeat the problem again in the future.

From the end-user's viewpoint, following divestiture, in as much as there may be more than a single telephone service provider in a given geographic area or market (for example, an independent local telephone company providing local telephone service and the independent long-distance carrier providing long-distance telephone service), there has resulted an increased need to be able to actually define where a given equipment problem or circuit fault or out-of-service problem is physically located, as end-users have generally assumed more of the responsibility for the maintenance of customer premises equipment that is located at the location of the end-user. This has resulted in a need for automated diagnostics that are capable of testing the portion of the telephone service for which the service provider or telephone company is responsible, as well as being able to pinpoint the particular problem fault or disruption in service that the end-user had experienced which has resulted in the customer premises equipment being out of service. If the service provider or telephone company can find the trouble and localize the fault or problem circuit to reside physically within the customer premises equipment at the location of the end-user (and hence beyond the perpetual warranty of the service provider or telephone company), the end-user will have to decide whether or not to invest the necessary funds to acquire customer premises equipment of greater reliability and improved quality with respect to obtaining the benefit of continuous and reliable performance of its customer premises equipment with an appropriate duty or life cycle.

Specifically, high-capacity digital services (HCDS), with associated transmission rates of at least 1.544 Mbps, represent a major revenue opportunity for the telephone company or service providers, and consequently, have grown rapidly in recent years. To realize the full potential of these service offerings, the service provider or telephone company must provide a quality of service that is sufficient to dissuade end-users or customers from selecting the bypass-type private commercial networks, or other alternatives, to the available data services provided by the service provider or telephone company. Digital transmission errors occurring in short bursts are a common complaint of end-users who use any type of high-capacity digital services and are the type of transmission errors that are difficult to localize with after-the-fact, the out-of-service type of portable test equipment or methods that are usually used by maintenance personnel who travel to the location of the end-user location where the HCDS-facility troubleshooting is then conducted (by taking the specific digital circuit out-of-service for purposes of diagnostics testing). It would be advantageous to be able to test and evaluate the overall digital circuit integrity to determine if the problem fault resides in the DS1 facility side of the circuit or the side of the circuit that has the customer premises equipment connected thereto without the need to dispatch maintenance technicians to the location of the end-user, or without the need to take the specific digital circuit out-of-service.

Preventative maintenance in the form of performance diagnostic testing and circuit monitoring has become a standard part of the preventative maintenance and circuit trouble-shooting procedures for determining or assessing continuity of the DS1 communications path between the central office and the customer premises equipment at the site of the end-user. Since equipment of the prior art design and construction does not provide any information or knowledge with respect to how bad the HCDS service has degraded at the network interface, this has usually required a technician to take a portable test unit to a designated service area, or number of designated service areas in the DS1 transmission span, in order to be able to conduct suitable testing and maintenance of the DS1 transmission spans by conducting a loop-back test to analyze and test the specific suspect digital circuit. Once the DS1 circuit is looped-up, the overall circuit integrity can be evaluated to determine if the problem fault resides in the DS1 facility or in the customer premises equipment without the need to dispatch technicians to the location of the end-user.

Furthermore, with the present facility loop-back equipment of the prior art design and construction, there was no capability to retrieve historical information relative to performance of the HCDS circuit. Specifically, the facility loop-back equipment of the prior art design and construction utilized the embedded maintenance channel of the 4 Kbps facility data link to communicate only in-band loop-up or loop-down command codes (thereby either looping-up or looping-down the facility loop-back interface for purposes of conducting a facility loop-back test). It would be advantageous to be able to use the embedded maintenance channel of the 4 Kbps facility data link to additionally communicate with the facility loop-back interface to download performance data that has been stored relative to a specific digital communications path, without interfering with the ability of the facility loop-back interface to receive its respect loop-up or loop-down command codes. Accordingly, it would be advantageous to be able to loop-up the DS1 circuit from any remote test location has access to the DS1 circuit and be able to obtain relevant historical performance data regarding the nonintrusive monitoring of the recent performance of the DS1 circuit for both directions of transmission in order to evaluate overall transmission span integrity for HCDS and similar services utilizing a 1.544 mbps DS1 facility which may be extended to an end-user location. Furthermore, the telephone company or service provider would like to be able to determine whether the facility signal is good, or bad, and if bad, to thereafter be able to sectionalize the problem fault in the circuit to either the receive circuit path to the end-user, or to the transmit circuit path from the end-user.

The present competitive commercial environment requires the telephone company or service provider to minimize burdensome costs associated with trouble-shooting interconnection equipment, with respect to determining if the trouble and/or fault operation can be attributable to either the local telephone equipment, contracted service, or remote customer premises equipment. This may lead to disputes in discovering and assessing where the particular problem fault is physically located and who should pay for or incur the eventual cost to correct or repair the problem fault. It would be desirable to have a cost-effective means for facilitating rapid detection of error bursts and immediate trouble shooting sectionalization of the problem fault.

In the future, it will also be advantageous to have a facility loop-back interface that will be compatible with present high-capacity digital signals and networks, and be upward compatible with expected future ISDN (integrated services digital networks, which provide for simultaneous audio, video and data) with respect to standard and/or unique in-band and/or out-of-band signaling protocols that will be used or with respect to the digital transmission rates that will be available for high-capacity digital network signals and networks. Early generation products pertaining to facility loop-back interfaces of the prior art design and construction have often lacked technical compatibility with one or more of the state-of-the-art high-capacity digital signals or networks, or have lacked the ability to have build-in flexibility to accomplish these necessary objectives.

A design for a microprocessor-based, full duplex facility loop-back test, diagnostics and maintenance system having an intelligent diagnostics interface which is capable of supporting LAP-B protocol, or any given protocol with simple reprogramming of the central microprocessor, and having specified maintenance capabilities for testing and continuous nonintrusive diagnostics of multiple on-line performance capabilities of both DS1 facilities and customer premise equipment, is lacking in the art. Furthermore, the ability to conduct facility loop-back testing for the DS1 communications path continuity through the customer premises equipment at the location of the network interface for the end-user, remotely from a centralized network location of the service provider or telephone company without having to dispatch a technician, is additionally lacking in the art.

SUMMARY OF THE INVENTION

It is an object of the present invention to provide a full duplex facility loop-back test, diagnostics and maintenance system having an intelligent diagnostics interface with nonintrusive multiple performance monitoring and maintenance capabilities which is capable of receiving a command from either a remote or on-site location for purposes of initiating loop-up or loop-down of the facility loop-back test to be able to test the continuity of any selected high-capacity circuit within the DS1 transmission span.

It is a further object of the present invention to provide a microprocessor-based full duplex facility loop-back test, diagnostics and maintenance system having an intelligent diagnostics interface that will be able to perform continuous nonintrusive monitoring of certain performance characteristics of the DS1 digital signal, store the information in real-time (or otherwise), calculate certain other performance information that is predicated on the monitored performance characteristics, store this performance information, and download the stored information upon the interface receiving an appropriate out-of-band command code in extended superframe format (ESF), the command code originating from a remote location (as from the central office of the service provider or telephone company), or from the end-user location (where the customer premises equipment is located), or from the location of the network interface for the customer premises equipment.

It is still a further object of the present invention to provide a full duplex facility loop-back test, diagnostics and maintenance system that will be able to overcome various operational problems relating to localizing problem faults in the DS1 transmission path that exist the in facility loop-back interface apparatus presently found in the prior art.

This invention is directed to solving these and other disadvantages of the prior art.

Accordingly, in accordance with an illustrative embodiment of the present invention there is provided a full duplex digital transmission facility loop-back test, diagnostics and maintenance system, the system capable of initiating a facility loop-back test and predetermined diagnostics for a predetermined digital transmission span and customer premises equipment at the location of the network interface for a specified end-user, the system comprising in combination: a digital transmission facility and transmission medium comprising in combination: means for originating a high-capacity digital signal of at least 1.544 Mbps from a predetermined location over a plurality of digital communications channels, the digital signal having multiple predetermined performance characteristics inherent thereto, the digital transmission facility having an originating first end and a terminating second end, the first end and the second end being operatively coupled by a plurality of digital transmission spans of predetermined lengths; means for transmitting the high-capacity digital signal over the digital communications channel including any predetermined digital transmission span to a single end-user location selected from a plurality of end-user locations; means for receiving the high-capacity digital signal from the digital communications channel by a predetermined single end-user location selected from a plurality of end-user locations; and at least one microprocessor-based facility loop-back diagnostics interface, the interface having a performance monitoring mode of operation and a maintenance mode of operation, the facility loop-back diagnostics interface comprising: means for operatively locating the interface at any predetermined location selected from a plurality of available end-user locations; means for continuous and nonintrusive monitoring of a plurality of predetermined performance characteristics relating to a digital DS1 communications channel, thereafter producing an output signal corresponding to each of the multiple performance characteristics, the output signal having associated binary content in response to the performance characteristics; means for storing the binary content of each of the output signals for a predetermined period of time; means responsive to adapting predetermined protocols pertaining to the digital DS1 communications channel and to the transmission and reception of digital signals within the digital DS1 communications channel, the protocol being selected from a plurality of available protocols; means responsive to adapting a particular syntax pertaining to a first and a second set of predetermined command codes for the particular protocol utilized; means for receiving the first set of predetermined command codes from any predetermined location of a digital DS1 communications channel to place the interface into a predetermined mode of operation, the interface thereafter responding by initiating a facility loop-back test from any predetermined location within the DS1 communications channel to the location of the network interface; means for receiving the second set of predetermined command codes from any predetermined location of the digital DS1 communications channel; and means responsive to the second set of predetermined command codes for down-loading the stored binary content to a predetermined location within the digital DS1 communications channel. The facility loop-back and diagnostics interface of the present system has means that are responsive to adapting a predetermined protocol pertaining to the digital DS1 communications channel and that is specifically responsive to the LAP-B Protocol. Further, the facility loop-back and diagnostics interface of the present system has means that are responsive to adapting a particular syntax pertaining to the first set of predetermined command codes and that is specifically responsive to the superframe format. Further, the facility loop-back and diagnostics interface of the present system has means that are responsive to adapting a particular syntax pertaining to the second set of predetermined command codes and is specifically responsive to the transaction language-1 syntax. Further, the facility loop-back and diagnostics interface of the present system has means that are responsive to adapting a particular syntax pertaining to the first and the second sets of predetermined command codes that are specifically responsive to the extended superframe format. Further, the facility loop-back and diagnostics interface of the present system has means that are responsive to adapting a particular syntax pertaining to a second set of predetermined command codes that is further specifically responsive to a data stream of transaction language-1 syntax within an extended superframe data stream utilizing LAP-B Protocol. Further, the facility loop-back and diagnostics interface of the present system has means that are responsive to adapting a particular syntax pertaining to the first and the second sets of predetermined command codes that are further responsive to a data stream of transaction language-1 syntax within an extended superframe data stream utilizing LAP-B Protocol and further specifically facilitates queries and responses that utilize transaction language-1 commands which are transmitted and received in extended superframe format within the 4 Kbps facility data link embedded operations channel which is associated with the digital DS1 communications channel.

Accordingly, in accordance with another illustrative embodiment of the present invention there is provided a full duplex digital transmission facility loop-back test, diagnostics and maintenance system, the system capable of initiating a facility loop-back test and predetermined diagnostics for a predetermined digital transmission span and customer premises equipment at the location of the network interface for a specified end-user, the system comprising in combination: a digital transmission facility and transmission medium comprising in combination: means for originating a high-capacity digital signal of at least 1.544 Mbps from a predetermined location over a plurality of digital communications channels, the digital signal having multiple predetermined performance characteristics inherent thereto, the digital transmission facility having an originating first end and a terminating second end, the first end and the second end being operatively coupled by a plurality of digital transmission spans of predetermined lengths; means for transmitting the high-capacity digital signal over the digital communications channel including any predetermined digital transmission span to a single end-user location selected from a plurality of end-user locations; means for receiving the high-capacity digital signal from the digital communications channel by a predetermined single end-user location selected from a plurality of end-user locations; and at least one microprocessor-based facility loop-back diagnostics interface, the interface having a performance monitoring mode of operation and a maintenance mode of operation, the facility loop-back diagnostics interface comprising: means for operatively locating the interface at any predetermined location selected from a plurality of available end-user locations; means for continuous and nonintrusive monitoring of a plurality of predetermined performance characteristics relating to a digital DS1 communications channel, thereafter producing an output signal corresponding to each of the multiple performance characteristics, the output signal having associated binary content in response to the performance characteristics; means for storing the binary content of each of the output signals for a predetermined period of time; means for deriving certain predetermined performance information relative to the binary content and thereafter storing the performance information for a predetermined period of time; means responsive to adapting predetermined protocols pertaining to the digital DS1 communications channel and to the transmission and reception of digital signals within the digital DS1 communications channel, the protocol being selected from a plurality of available protocols; means responsive to adapting a particular syntax pertaining to a first and a second set of predetermined command codes for the particular protocol utilized; means for receiving the first set of predetermined command codes from any predetermined location of a digital DS1 communications channel to place the interface into a predetermined mode of operation, the interface thereafter responding by initiating a facility loop-back test from any predetermined location within the DS1 communications channel to the location of the network interface; means for receiving the second set of predetermined command codes from any predetermined location of the digital DS1 communications channel; and means responsive to the second set of predetermined command codes for down-loading the stored binary content and the performance information to a predetermined location within the digital DS1 communications channel. The facility loop-back and diagnostics interface of the present system has means that are responsive to adapting a predetermined protocol pertaining to the digital DS1 communications channel and that is specifically responsive to the LAP-B Protocol. Further, the facility loop-back and diagnostics interface of the present system has means that are responsive to adapting a particular syntax pertaining to the first set of predetermined command codes and that is specifically responsive to the superframe format. Further, the facility loop-back and diagnostics interface of the present system has means that are responsive to adapting a particular syntax pertaining to the second set of predetermined command codes and is specifically responsive to the transaction language-1 syntax. Further, the facility loop-back and diagnostics interface of the present system has means that are responsive to adapting a particular syntax pertaining to the first and the second sets of predetermined command codes that are specifically responsive to the extended superframe format. Further, the facility loop-back and diagnostics interface of the present system has means that are responsive to adapting a particular syntax pertaining to a second set of predetermined command codes that is further specifically responsive to a data stream of transaction language-1 syntax within an extended superframe data stream utilizing LAP-B Protocol. Further, the facility loop-back and diagnostics interface of the present system has means that are responsive to adapting a particular syntax pertaining to the first and the second sets of predetermined command codes that are further responsive to a data stream of transaction language-1 syntax within an extended superframe data stream utilizing LAP-B Protocol and further specifically facilitates queries and responses that utilize transaction language-1 commands which are transmitted and received in extended superframe format within the 4 Kbps facility data link embedded operations channel which is associated with the digital DS1 communications channel.

Accordingly, in accordance with another illustrative embodiment of the present invention there is provided a full duplex digital transmission facility loop-back test, diagnostics and maintenance system, the system capable of initiating a facility loop-back test and predetermined diagnostics for a predetermined digital transmission span and customer premises equipment at the location of the network interface for a specified end-user, the system comprising in combination: a digital transmission facility and transmission medium comprising in combination: means for originating a high-capacity digital signal of at least 1.544 Mbps from a predetermined location over a plurality of digital communications channels, the digital signal having multiple predetermined performance characteristics inherent thereto, the digital transmission facility having an originating first end and a terminating second end, the first end and the second end being operatively coupled by a plurality of digital transmission spans of predetermined lengths; means for transmitting the high-capacity digital signal over the digital communications channel including any predetermined digital transmission span to a single end-user location selected from a plurality of end-user locations; means for receiving the high-capacity digital signal from the digital communications channel by a predetermined single end-user location selected from a plurality of end-user locations; and at least one microprocessor-based facility loop-back diagnostics interface, the interface having a performance monitoring mode of operation and a maintenance mode of operation, the facility loop-back diagnostics interface comprising: means for operatively locating the interface at any predetermined location selected from a plurality of available end-user locations; means for continuous and nonintrusive monitoring in real-time of a plurality of multiple predetermined performance characteristics relating to a digital DS1 communications channel, thereafter producing an output signal corresponding to each of the multiple performance characteristics, the output signal having associated binary content in response to the performance characteristics; means for storing the binary content of each of the output signals in associated nonvolatile memory means for a predetermined period of time; means responsive to adapting predetermined protocols pertaining to the digital DS1 communications channel and to the transmission and reception of digital signals within the digital DS1 communications channel, the protocol being selected from a plurality of available protocols; means responsive to adapting a particular syntax pertaining to a first and a second set of predetermined command codes for the particular protocol utilized; means for receiving the first set of predetermined command codes from any predetermined location of a digital DS1 communications channel to place the interface into a predetermined mode of operation, the interface thereafter responding by initiating a facility loop-back test from any predetermined location within the DS1 communications channel to the location of the network interface; means for receiving the second set of predetermined command codes from any predetermined location of the digital DS1 communications channel; and means responsive to the second set of predetermined command codes for down-loading the stored binary content to a predetermined location within the digital DS1 communications channel. The facility loop-back and diagnostics interface of the present system has means that are responsive to adapting a predetermined protocol pertaining to the digital DS1 communications channel and that is specifically responsive to the LAP-B Protocol. Further, the facility loop-back and diagnostics interface of the present system has means that are responsive to adapting a particular syntax pertaining to the first set of predetermined command codes and that is specifically responsive to the superframe format. Further, the facility loop-back and diagnostics interface of the present system has means that are responsive to adapting a particular syntax pertaining to the second set of predetermined command codes and is specifically responsive to the transaction language-1 syntax. Further, the facility loop-back and diagnostics interface of the present system has means that are responsive to adapting a particular syntax pertaining to the first and the second sets of predetermined command codes that are specifically responsive to the extended superframe format. Further, the facility loop-back and diagnostics interface of the present system has means that are responsive to adapting a particular syntax pertaining to a second set of predetermined command codes that is further specifically responsive to a data stream of transaction language-1 syntax within an extended superframe data stream utilizing LAP-B Protocol. Further, the facility loop-back and diagnostics interface of the present system has means that are responsive to adapting a particular syntax pertaining to the first and the second sets of predetermined command codes that are further responsive to a data stream of transaction language-1 syntax within an extended superframe data stream utilizing LAP-B Protocol and further specifically facilitates queries and responses that utilize transaction language-1 commands which are transmitted and received in extended superframe format within the 4 Kbps facility data link embedded operations channel which is associated with the digital DS1 communications channel.

Accordingly, in accordance with another illustrative embodiment of the present invention there is provided a full duplex digital transmission facility loop-back test, diagnostics and maintenance system, the system capable of initiating a facility loop-back test and predetermined diagnostics for a predetermined digital transmission span and customer premises equipment at the location of the network interface for a specified end-user, the system comprising in combination: a digital transmission facility and transmission medium comprising in combination: means for originating a high-capacity digital signal of at least 1.544 Mbps from a predetermined location over a plurality of digital communications channels, the digital signal having multiple predetermined performance characteristics inherent thereto, the digital transmission facility having an originating first end and a terminating second end, the first end and the second end being operatively coupled by a plurality of digital transmission spans of predetermined lengths; means for transmitting the high-capacity digital signal over the digital communications channel including any predetermined digital transmission span to a single end-user location selected from a plurality of end-user locations; means for receiving the high-capacity digital signal from the digital communications channel by a predetermined single end-user location selected from a plurality of end-user locations; and at least one microprocessor-based facility loop-back diagnostics interface, the interface having a performance monitoring mode of operation and a maintenance mode of operation, the facility loop-back diagnostics interface comprising: means for operatively locating the interface at any predetermined location selected from a plurality of available end-user locations; means for continuous and nonintrusive monitoring in real-time of a plurality of multiple predetermined performance characteristics relating to a digital DS1 communications channel, thereafter producing an output signal corresponding to each of the multiple performance characteristics, the output signal having associated binary content in response to the performance characteristics; means for storing the binary content of each of the output signals in associated nonvolatile memory means for a predetermined period of time; means for deriving certain predetermined performance information relative to the binary content and thereafter storing the performance information in associated nonvolatile memory means for a predetermined period of time; means responsive to adapting predetermined protocols pertaining to the digital DS1 communications channel and to the transmission and reception of digital signals within the digital DS1 communications channel, the protocol being selected from a plurality of available protocols; means responsive to adapting a particular syntax pertaining to a first and a second set of predetermined command codes for the particular protocol utilized; means for receiving the first set of predetermined command codes from any predetermined location of a digital DS1 communications channel to place the interface into a predetermined mode of operation, the interface thereafter responding by initiating a facility loop-back test from any predetermined location within the DS1 communications channel to the location of the network interface; means for receiving the second set of predetermined command codes from any predetermined location of the digital DS1 communications channel; and means responsive to the second set of predetermined command codes for down-loading the stored binary content and the performance information to a predetermined location within the digital DS1 communications channel. The facility loop-back and diagnostics interface of the present system has means that are responsive to adapting a predetermined protocol pertaining to the digital DS1 communications channel and that is specifically responsive to the LAP-B Protocol. Further, the facility loop-back and diagnostics interface of the present system has means that are responsive to adapting a particular syntax pertaining to the first set of predetermined command codes and that is specifically responsive to the superframe format. Further, the facility loop-back and diagnostics interface of the present system has means that are responsive to adapting a particular syntax pertaining to the second set of predetermined command codes and is specifically responsive to the transaction language-1 syntax. Further, the facility loop-back and diagnostics interface of the present system has means that are responsive to adapting a particular syntax pertaining to the first and the second sets of predetermined command codes that are specifically responsive to the extended superframe format. Further, the facility loop-back and diagnostics interface of the present system has means that are responsive to adapting a particular syntax pertaining to a second set of predetermined command codes that is further specifically responsive to a data stream of transaction language-1 syntax within an extended superframe data stream utilizing LAP-B Protocol. Further, the facility loop-back and diagnostics interface of the present system has means that are responsive to adapting a particular syntax pertaining to the first and the second sets of predetermined command codes that are further responsive to a data stream of transaction language-1 syntax within an extended superframe data stream utilizing LAP-B Protocol and further specifically facilitates queries and responses that utilize transaction language-1 commands which are transmitted and received in extended superframe format within the 4 Kbps facility data link embedded operations channel which is associated with the digital DS1 communications channel.

Other objects, features, and advantages of this invention will become apparent from the following detailed description of the preferred embodiment of this invention, as illustrated in the accompanying drawings.

BRIEF DESCRIPTION OF THE DRAWINGS

These and other objects, features, and advantages of the present invention, its organization, construction and operation will be best understood from an examination of the following detailed description of an illustrative embodiment of the invention when read in connection with the accompanying drawings.

FIGS. 7A-1 and 7A-2 a detailed electrical schematic circuit diagram of specific power supply driver circuitry that is used to implement a particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 9 is a detailed electrical schematic circuit diagram of specific circuitry that is used to implement a portion of the operation of the block diagrams of FIGS. 5 and 6 relating to the customer premises equipment regenerator driver circuitry for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 10 is a detailed electrical schematic circuit diagram of specific circuitry that is used to implement a portion of the operation of the block diagrams of FIGS. 5 and 6 relating to the alarm indicator system driver circuitry for the loop-back regenerator driver circuitry for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 13 illustrates a modified timing diagram for the frame bit assignments to establish communications over the DS1 channel utilizing the extended superframe format in which the Transaction Language 1 syntax command codes are multiplexed (i.e., embedded) within the 4 Kbps facility data link channel that is available and that is used in conjunction with the present invention for a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

DETAILED DESCRIPTION OF THE INVENTION

Figure 1:
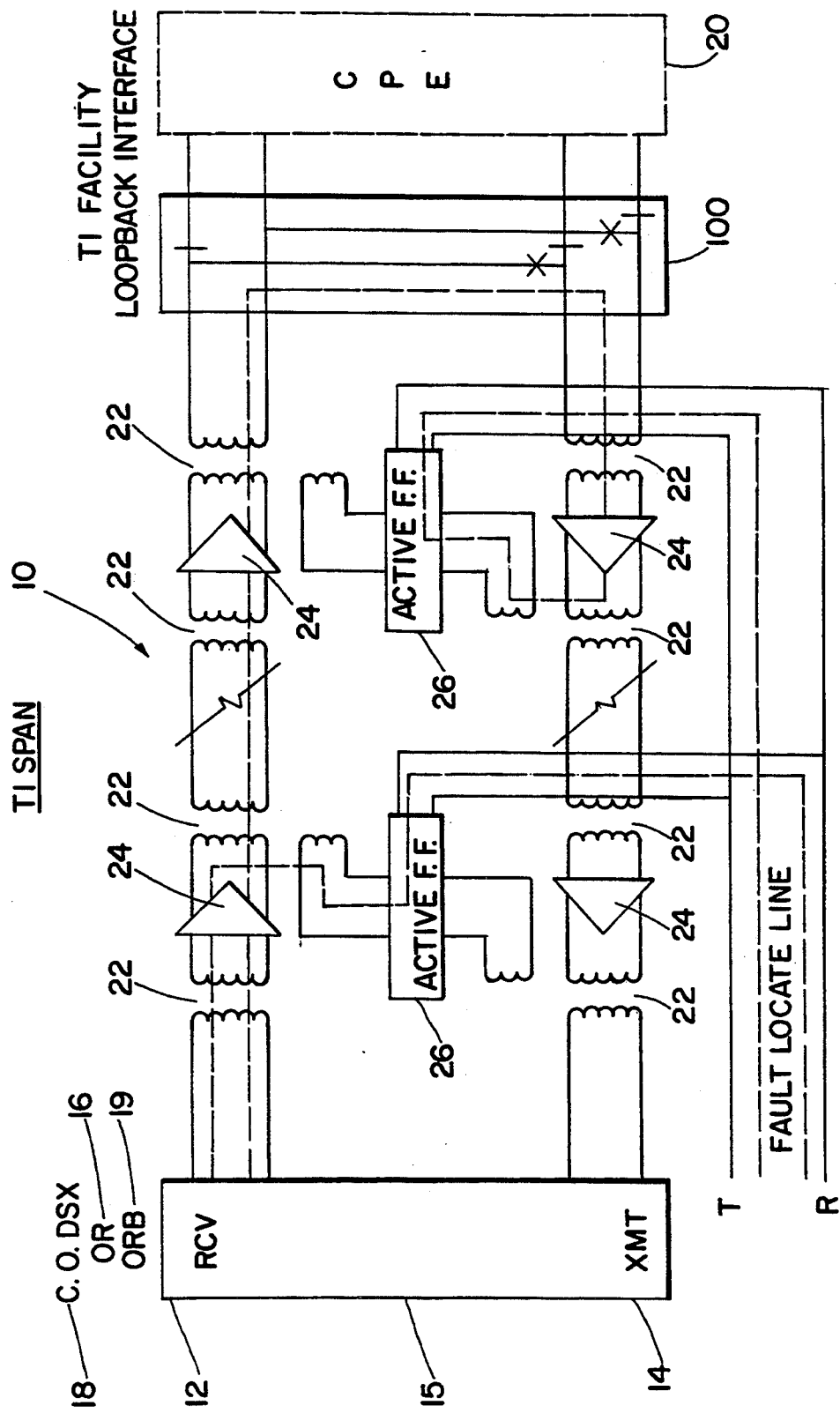
FIG. 1 is a diagrammatic representation illustrating the DS1 facility cable span fault location paths that are available for evaluating and troubleshooting DS1 transmission span integrity to the customer premises equipment that is provided by the end-user at the location of the end-user by utilizing the facility loop-back interface of the prior art design or construction.

The system of the present invention requires the origination, transmission and reception of DS1 digital signals over DS1 facilities. While many technical approaches are feasible to accomplish this objective, certain BellCore technical publications and corresponding Federal Communications Commission mandates describe the origination, transmission and reception of DS1 digital signals in sufficient detail to permit one skilled in the art to construct equipment to originate, transmit and receive DS1 digital signals over DS1 facilities. Accordingly, in order to reasonably limit the enormous amount of technical information in this detailed description of the preferred embodiment, the following Bellcore Technical References are available to the general public and are hereby incorporated by reference, namely, "High-Capacity Digital Service Interface Generic Requirements For End Users" (TR-NPL-000054 April, 1989); "Digital Cross-Connect System Requirements And Objectives" (TR-TSY-000170 November, 1985); "High-Capacity Digital Special Access Service" (TR-INS-000342 February, 1991); "Operations Technology Generic Requirements: Network Maintenance Access And Testing" (TR-TSY-000476 November, 1989); "Transport Systems Generic Requirements (TSGR): Common Requirements" (TR-TSY-000499 December, 1989); and "High Capacity Digital Service Channel Interface Specification" (PUB 62411 September, 1983 and PUB 62411A November, 1984). Also, certain BellCore Practice References are further incorporated herein by reference, namely, "DS-1 High Capacity Digital Service Overall Description" (BR-314-645-100 January, 1991); "DS-1 High-Capacity Digital Service Maintenance And Test Procedures" (BR-314-645-500 January, 1991); "Digital Transmission Systems—T1 Digital Line—General Description" (BR-365-200-100 May, 1987); "Digital Data System Qualification Test—T1 Digital Line—Digital Transmission Systems" (BR-365-228-500 July, 1982); and "DS-1 High-Capacity Digital Service Engineering Considerations" (BR-880-610-100 January, 1991).

The BellCore technical references previously cited, in whole or in part, directly or indirectly pertain to the ISDN technology being required, applied or modified for the successful operation of the subject matter of the present invention, including but not limited to, various aspects of the ISDN system requirements for having ISDN compatibility with respect to a digital transmission facility and transmission medium, including but not limited to, certain aspects for originating a high-capacity digital signal of at least 1.544 Mbps from a predetermined location over a plurality of digital communications channels, the digital transmission facility having an originating first end and a terminating second end, the first end and the second end being operatively coupled by a plurality of digital transmission spans of predetermined lengths, and certain aspects for transmitting the high-capacity digital signal over the digital communications channel including any predetermined digital transmission span to a single end-user location selected from a plurality of end-user locations, and certain aspects for receiving the high-capacity digital signal from the digital communications channel by a predetermined single end-user location selected from a plurality of end-user locations.

Referring to FIG. 1, there is shown a diagrammatic representation illustrating the DS1 facility cable span fault location paths for evaluating and troubleshooting DS1 transmission span integrity to the customer premises equipment at the location of the subscriber by utilizing the facility loop-back interface 100 that is built in accordance with the prior art. Effectively, this depicts the relative position where the DS1 facility loop-back interface 100 is physically located at the network interface of the DS1 facility cable transmission span 10 relative to the customer premises equipment 20, thereby facilitating the troubleshooting of the individual receive path 12 and the transmit path 14 by conducting a standard loop-back test, in order to facilitate locating where an unknown problem fault in the DS1 facility cable transmission span 10 is localized to either the receive path side 12 or the transmit path side 14 of the transmission span 10. The standard loop-back test is that state of a transmission facility in which the received signal is returned towards the sender in order to test the suspect circuit. The DS1 facility cable transmission span is a full duplex transmission facility that is composed of two twisted metallic pairs and regenerators that carry one digital signal transmitted at the nominal rate of 1.544 Mbps. The network interface is the point of demarcation between the telephone company or service provider and the end-user interface with customer premises equipment 20. The DS1 facility cable transmission span 10 is operatively interfaced to the customer premises equipment 20 thru the DS1 facility loop-back interface 100.

The receive signal path 12 and transmit signal path 14 each have a respective termination in the digital signal cross connect 16, that is, a series of mechanical jacks (not shown) that are used to access the high-capacity digital line for testing or monitoring purposes that are located at either the central office 18 or office repeater bay 19, of the particular telephone company or service provider for the high-capacity digital services, and acts to actually cross connect Level-1 type 1.544 mbps digital signals from the DS1 facility cable transmission span 10 that are at substantially the same power level). The office repeater bay 19 is the specific apparatus within the DS1 facility cable transmission span 10 that provides the necessary regeneration of the high-capacity digital signal in either direction at any point in the DS1 facility cable transmission span 10 for either the receive path 12 or transmit path 14. The office repeater bay 19 will also provide simplex powering capabilities to the DS1 facility cable transmission span 10. The DS1 facility cable transmission span 10 more or less consists of 24 adjacent pairs of repeaters 19 in the transmit loop of the transmission span 10 (plus an additional pair of repeaters 19 that is used for maintenance purposes); and the same type of numbers exist in a separate cable on the receive side of the DS1 transmission span 10.

While the DS1 facility cable transmission span 10 shown pertains to a high-capacity digital signal of at least 1.544 Mbps, commonly referred to a DS1 (or T1 facility), it is understood that the facility loop-back interface 100 may also be used in conjunction with other digital transmission mediums and rates relating to a given transmission medium, namely, a DS2 (or T2 facility) which has a digital signal transport of at least 6.038 Mbps, a DS3 (or T3 facility) which has a digital signal transport of at least 23.000 Mbps, and a primary rate ISDN facility with its accompanying transmission rate.

The high-capacity digital signal, either the receive path signal 12 (leaving the central office of the telephone company or service provider), or the transmit path signal 14 (coming from the customer premises equipment to the central office of the telephone company or service provider) will initially pass thru DC pulse transformers 22 for isolation and impedance purposes. The DC pulse transformers 22 are located at various geographic points in the DS1 facility cable transmission span 10. The output signals from the DC pulse transformers 22 will then pass to certain DS1 line regenerators 24 that act to regenerate the incoming pulse signal to a DC pulse waveform having the requisite and proper amplitude. The DS1 line regenerators 24 are located between selected DC pulse transformers 22 in the DS1 facility cable transmission span 10. On the customer premises equipment 20 side of the DC pulse transformers 22, the facility loop-back interface 100 provides termination for the customer premises equipment 20 and for the DS1 facility cable transmission span 10.

Certain active filters 26, also referred to as fault locating line filters, are positioned in series with the DS1 line regenerators 24, which contain the specific function relating to the fault locate line capability. Two DS1 line regenerators 24 are used for each direction of DS1 line regeneration (i.e., the transmit line regeneration path 14 and the receive line regeneration path 12). The DS1 line regenerators 24 are typically used in the copper or metallic facility DS1 transmission loop environment, consisting from about every 6,000 feet or so along the DS1 facility cable transmission span extending from the transmission facility to the various locations of the end-users. Other regeneration means are utilized regarding optical-fiber transmission medium for high-capacity digital signals.

Referring to FIG. 1, the broken line in the middle of each loop indicates that any number of additional regenerators or repeaters (up to approximately a maximum of 25) can exist between the regenerators or repeaters that are shown in the DS1 transmission span or loop leading from a central office to the location of the end-user.

From the central office location of the telephone company or service provider, each of the active line filters 26 in the DS1 facility cable transmission span 10 can be checked by a technician to verify the particular active line filters 26 at a specific line regenerator location, if the digital signal is being received. This allows the digital signal to be checked from point-to-point along the DS1 facility cable transmission span 10, which is required in order to isolate a problem fault between the central office and the location of the end-user. Each of the active line filters 26 are tuned filters and will accordingly respond to different frequencies or sine waves, which permits the predetermined points in the transmission lines to be selectively tested by sending out a digital signal from the receive path 12 in order to be able to test the receive path 12 of the transmission loop [i.e., by using different repeaters that are selected within the transmission loop], as the digital test information being transmitted comes back to a selected active fault locate line filter 26 under selected test conditions. Since each of the active fault locate line filters 26 are looking for a particular frequency, when the right frequency is detected, the active line filter 26 will then send back an appropriate output voltage reading to the test set located at the central office (or portable test unit positioned at a given repeater bay with the transmission loop) of the telephone company or service provider, which will be able to determine if the particular circuit under test is either open or closed, which thereby isolates the problem fault between known individual regenerators 24 on the same DS1 facility cable transmission span 10.

Figure 2:
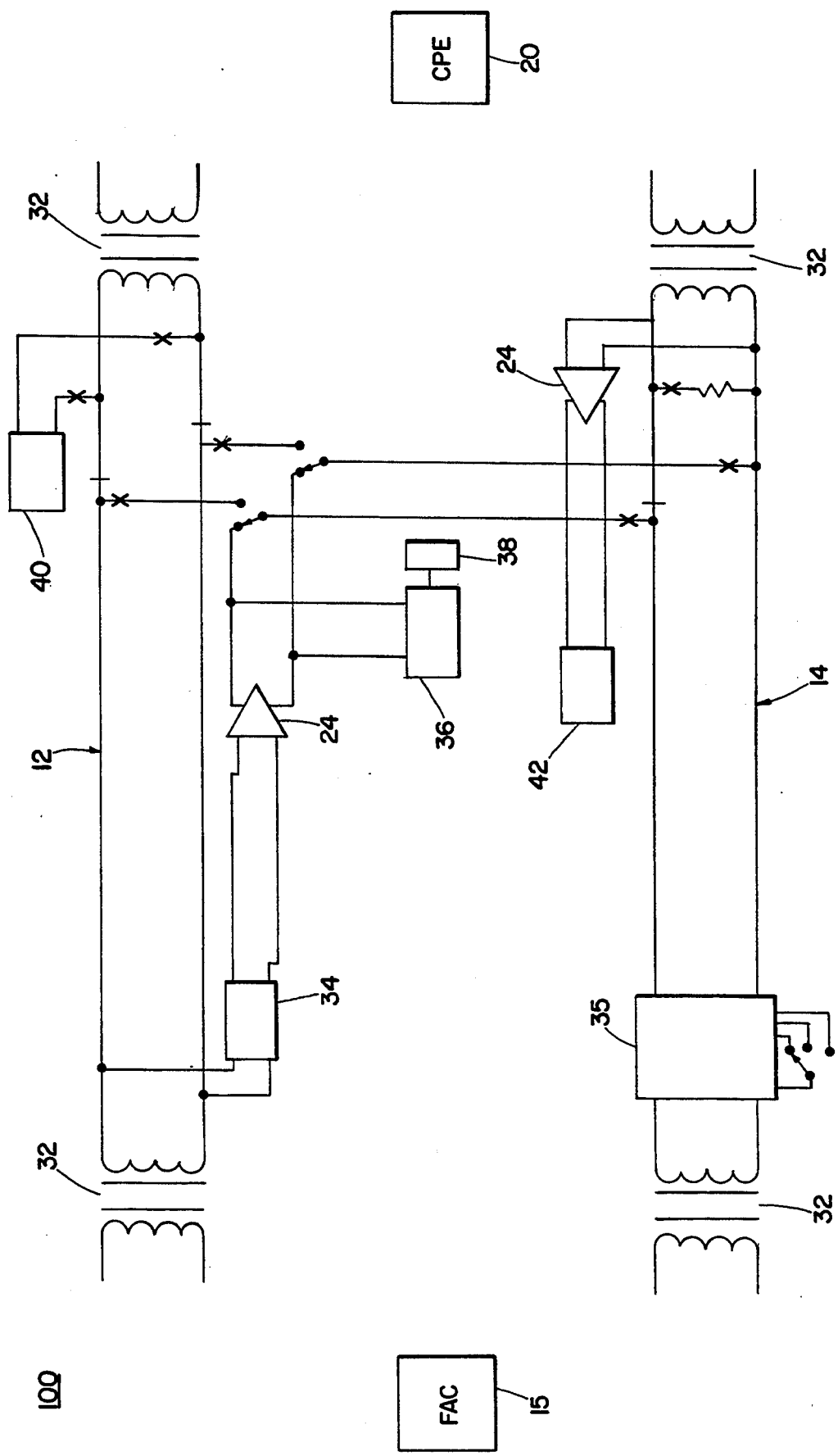
FIG. 2 is a generalized block diagram describing a full duplex facility loop-back interface apparatus of the prior art design.
Figure 3:
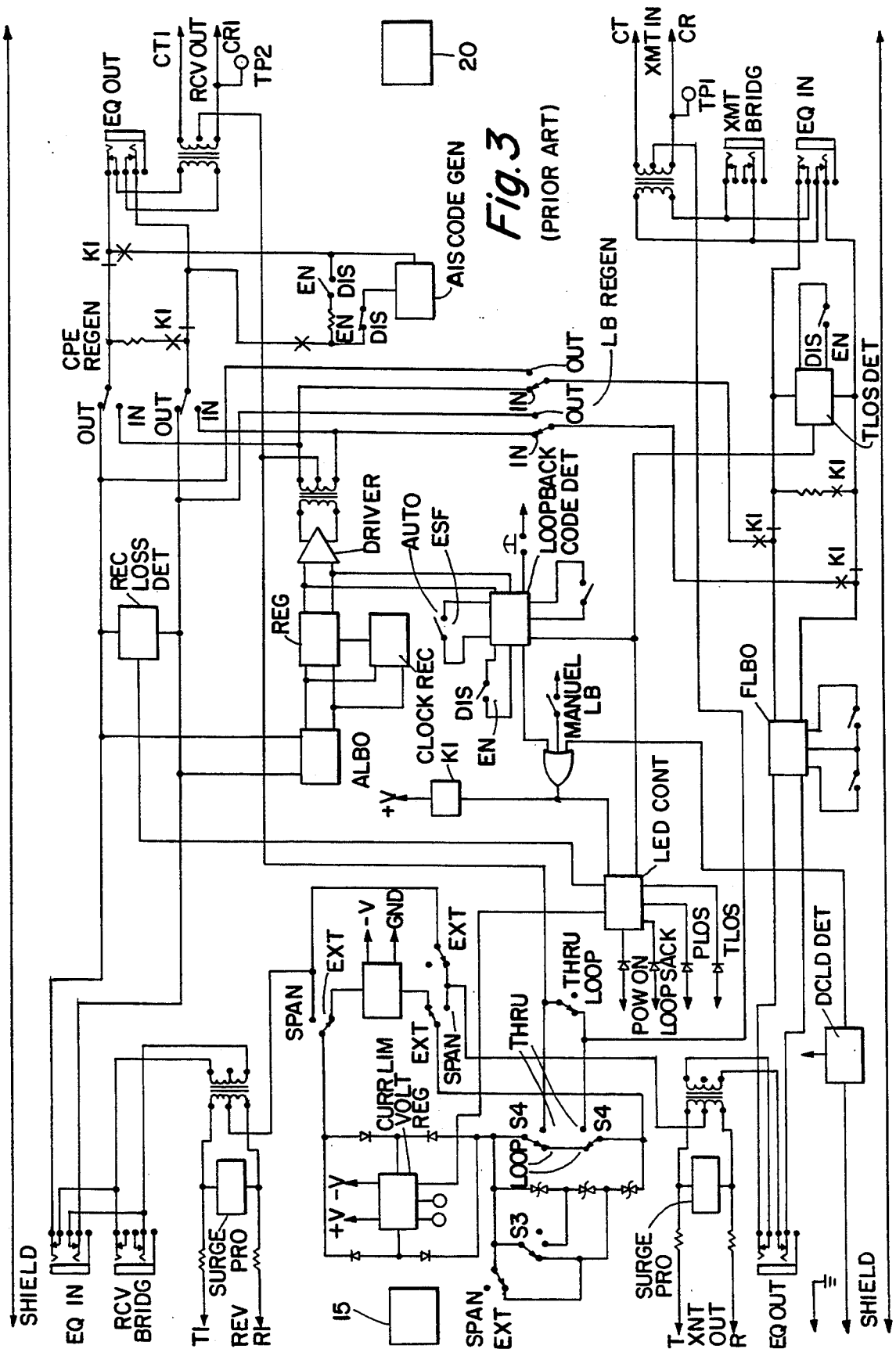
FIG. 3 is a detailed block diagram of the electronic circuitry of a specific embodiment of the full duplex facility loop-back interface of the prior art shown in FIG. 2.

Referring to FIG. 2 there is a generalized block diagram describing a full duplex facility loop-back interface of the prior art design and construction (commonly referred to as a DS1 interface connector), as more fully described in Bellcore Technical Reference TR-TSY-000312(d), which is incorporated herein by reference. In FIG. 3 there is shown a detailed block diagram of the electronic circuitry of a specific embodiment of the full duplex facility loop-back interface of the prior art that is shown in FIG. 2. Referring now to FIGS. 1 and 2, the block diagrams shows a single representative receive 12 and transmit 14 side of the DS1 transmission span or network 10, which operatively connects the DS1 facility 15 of the telephone company or service provider with the customer premises equipment 20 which is at the location of the end-user. The facility loop-back interface 100 is connected between each the receive path 12 and the transmit path 14. On the receive path 12 side of the network 10 at the DS1 facility 15, the facility loop-back interface 100 has DC coupling transformers 32 which provide the necessary isolation and impedance matching technical requirements of the high-capacity digital signal (or circuit). The facility loop-back interface 100 has a automatic line build-out 34 on the receive path side of the network, as well as a code detector 36, which continuously monitors the receive path 12 side of the facility loop-back interface 100 for the presence of a loop-up or loop-down command code on either path, which will initiate the facility loop-back interface 100 to conduct a facility loop-back test for the particular portion of the digital circuit that is operatively connected to the facility loop-back interface 100. The command code is a series or ones (i.e., 111111 . . . ) or zeros (i.e., 000000 . . . ), or any combination of ones and zeros (i.e., 111000111000 . . . ), that will operatively cause the facility loop-back interface 100 to either loop-up (and conduct a standard loop-back test), or loop-down (thereby returning the facility loop-back interface 100 to preloop-up status) in either the superframe (SF) or extended superframe (ESF) format. For a detailed explanation of the superframe and extended superframe formats, see Bell Communications Research, Inc., Technical Advisory TA-TSY-000194 (as revised from time to time) and which is hereby incorporated by reference. The loop-up or loop-down command code, which the code detector 36 within the facility loop-back interface 100 is waiting to receive, may be either an in-band command code (i.e., utilized the end-user's band-width and accordingly will disrupt service to the end-user during the duration of the loop-back test), or alternatively, a command code that is transmitted within the facility data link using extended superframe format. The command code is in-band when the code being sent to the code detector 36 uses the information digit time slots of a DS1 frame (i.e., bit assignments of a frame exclusive of the framing bit). The facility data link is a 4 Kbps channel which constitutes a dedicated data link to the DS1 facility 15 and the facility loop-back interface 100.

Superframe format is where a superframe consists of twelve consecutive frames where a frame is a set of 192 information digit time slots preceded by one digit time slot containing the framing bit (F). The framing sequence consists of a 101010 sequence carried in odd-numbered frame positions interleaved with a 111000 sequence carried in the even-numbered frame positions. This combination of sequences, producing a composite framing sequence 110111001000, forms a time-shared combination of a terminal frame pattern and a signaling frame pattern. The terminal framing pattern is used to identify superframe boundaries. The signaling framing pattern is used to identify superframe boundaries and, when the 192 digit time slots are channelized, is used to identify the robbed-bit signaling frames and associated signaling channels (e.g., designated channel A and channel B). In earlier equipment designs, the transmitted framing sequence was an alternate "1" and "0" pattern as the framing pattern. The extended superframe format is the preferred framing format for all new equipment designs of DS1 rate terminals, or equipment that frames on a pattern using the 193rd framing bit (F) position of the 1.544 Mbps DS1 digital signal. The extended superframe consists of twenty-four consecutive frames where each frame is a set of 192 information digit time slots preceded by one digit time slot containing the F bit. Extended superframe format is a structure in which the F bits are divided into a 2 Kbps framing pattern sequence, a 2 Kbps cyclic redundancy check sequence and a 4 Kbps facility data link.

The code detector 36 will act to cause the loop-back test to occur in conjunction with the operation of associated K1 relays 38, since the code detector 36 will recognize the incoming signal to be either a loop-up signal or a loop-down signal and correspondingly trigger the K1 relay 38 to close the circuit (i.e., and loop-up the facility loop-back interface 100) or open the circuit (i.e., and loop-down the facility loop-back interface 100). The K1 relay 38 will interrupt the end-user's digital signal from the receive signal path 12, thereafter be looped through the facility loop-back interface 100, and then be transmitted out the transmit signal path 14 to the DS1 facility central office (or office bay repeater).

Once the portion of the DS1 facility circuit 15 that is under a loop-back test, either a manual loop-back test or a remote loop-back test, the overall circuit integrity can be evaluated to determine if the suspect fault or problem physically resides in the DS1 facility 15, or the customer premises equipment 20, without necessarily the need to dispatch technicians with portable test equipment to the location of the end-user. But, if there is an existing fault in the DS1 circuit, this facility loop-back test will not permit the telephone company or service provider to be able to determine which side (i.e., the receive signal path 12 side or the transmit signal path 14 side) of the DS1 facility 15 that is under the loop-back test contains the suspect fault or problem, as all the facility loop-back interface 100 does is loop-up the entire suspect circuit for purposes of conducting a standard loop-back test. As such, this represent a network-wide limitation with respect to the relatively simple diagnostic capability to sectionalize and localize a problem fault being experienced by an end-user to either the receive signal path 12 or transmit signal path 14 side of a portion of digital circuit that is able to be tested in accordance with a standard loop-back test.

The facility loop-back interface 100 does incorporate the facility data link message channel of the 24-bit framing pattern to receive the necessary command codes for the loop-up or loop-down of the facility loop-back interface 100 and will respond to a repetitive pulse pattern of ones and zeros applied to the facility data link message channel. The extended superframe loop-up command code is a 16-bit code (i.e., 0001001011111111) which utilizes the facility data link to transmit the extended superframe message bits to the facility loop-back interface 100. In similar fashion, but with a different 16-bit command code, the facility loop-back interface 100 can be caused to loop-down to a preloop-up status.

The automatic line build-out 34 is looking at the incoming signal from the last line repeater or digital cross connect and will equalize the digital line out for subsequent input to the regenerator 24. The regenerator 24, located at specified locations or DS1 transmission spans within the overall DS1 transmission network, and will act to regenerate the DS1 digital signal.

The transmission loss of signal detector 42 typically is on the transmit path of the end-user, as when the end-user is transmitting toward the DS1 facility of the telephone company or service provider. The transmission loss of signal detector 42 is an indicator (i.e., usually a light emitting diode) which will illuminate and indicate when the digital circuit from the end-user is down or dead and consequently is not able to send any signal or is sending an unintelligible signal to the DS1 facility.

When the technician causes the facility loop-back interface 100 to loop-up, the alarm indication signal generator 40 will generate a signal to the end-user (i.e., the receive path side of the end-user) to inform the end-user having customer premises equipment 20 that a loop-back test is being conducted on the digital line and that a loop-up test pattern has been sent by the telephone company or service provider (i.e., sending a sequence of all frame ones test signal, or other suitable test signal, transmitted over the suspect digital circuit). This is required in order to avoid sending the customer premises equipment 20 into an automatic alarm mode. Basically, the alarm indication signal generator 40 will hold the customer premises equipment of the end-user in a controlled alarm environment and indicate this status to the end-user. The alarm indication signal generator 40 will also indicate to the end-user that loop-back testing has been initiated on its high-capacity digital line, and accordingly, that the line will be out-of-service for the duration of the loop-back test. The alarm circuitry is directed to controlling the customer premises equipment of the end-user, as well as various indicators at the central office of the telephone company or service provider, with respect to the various alarms for flagging technical problems arising any point in the DS1 facility cable digital transmission span for high-capacity digital services, that are of a system-wide nature for the telephone company or service provider.

When a suspect fault in the DS1 circuit occurs, either on the receive path side 12 or on the transmit path side 14, the technician will conduct a loop-back test on the suspect circuit which would necessitate making a disruption in service to the end-user for the duration of the loop-back test. The loop-back test would be conducted manually at either at an available digital cross connect or at a office repeater bay or at a facility alarm center. Once the suspect circuit is looped-up, thereafter test signals or test patterns are transmitted across the network to determine whether the DS1 facility circuit was operational or problematic. If the DS1 facility side tested to be completely operational, the DS1 facility circuit would then be put back into operation and given back to the end-user. At this point there was no way for the technician to be able to determine if the end-user side of the circuit was operational or not. This loop-back test procedure would take on the order of 30–45 minutes, which means that the end-user's high-capacity digital line was not available to the end-user for the full duration of the loop-back test being performed.

In addition to the loop-back test performed remotely from the central office (or from the location of a designated bay repeater), the loop-back test procedure used with the facility loop-back interface 100 can also be conducted as a manual loop-back test performed at the location of the end-user, which requires a technician to be dispatched in order to physically attach portable test equipment to the DS1 facility 15 and loop-up the facility loop-back interface 100 to test the suspect circuit. Accordingly, with respect to this approach, which is when the technician would send an in-band command code to the facility loop-back interface 100 that is located at the site of the end-user where the customer premises equipment 20 is situated, the repair technician would have to actually go to the location of the digital cross connect for the network in order to connect the portable test equipment into the digital cross connect, and then initiate and perform a loop-back test of the suspect circuit by looping-up the facility loop-back interface 100 from that particular location.

Figure 4:
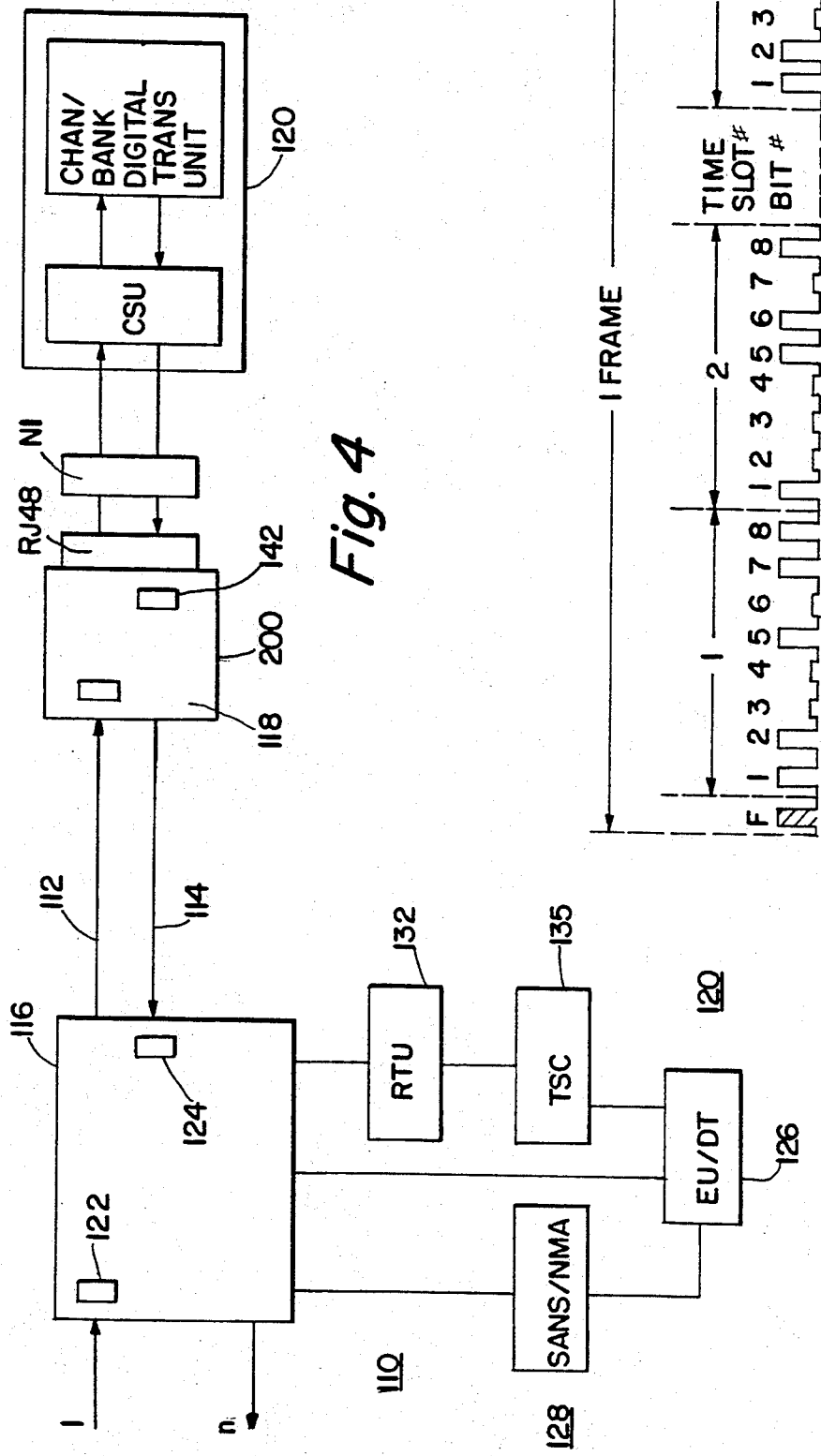
FIG. 4 is a diagrammatic representation illustrating the signal and data flow paths for the a full duplex facility loop-back test, diagnostics and maintenance system with an intelligent diagnostics interface having both diagnostics and continuous nonintrusive performance monitoring and storing capabilities which is used within a high-capacity digital network and that is built in accordance with the present invention.

FIG. 4 is a diagrammatic representation illustrating the signal and data flow paths for the a full duplex facility loop-back test, diagnostics and maintenance system 1 with an intelligent diagnostics interface 200 having both diagnostics and continuous nonintrusive performance monitoring and storing capabilities which is used within a high-capacity digital network and that is built in accordance with the present invention. Referring to FIG. 4, the facility loop-back diagnostics interface 200 has operational compatibility with the earlier facility loop-back interface 100 of the prior art design and construction by using both the superframe format protocol, as well as the extended superframe format protocol, and incrementally adds a microprocessor-based diagnostic technical capability of functionally be able to continuously monitor, in a nonintrusive manner, the DS1 facility high-capacity communications channel with corresponding digital signal being sent to the end-user in real-time for a designated time frame (which, if desired, may be changed from time to time), and then store certain performance parameters relative to that signal in designated nonvolatile memory locations within the diagnostics interface 200, and later transmit or download the stored performance data upon receipt of an appropriate command code, as well as to loop-up or loop-down the diagnostics interface 200 to conduct a standard loop-back test, from the central office of the telephone company or service provider where the suspect circuit may be analyzed and where the most recent historical performance data relative to certain parameters of the suspect circuit may also be analyzed. As a result, by troubleshooting the suspect DS1 digital circuits, the facility loop-back diagnostics interface 200 provides for relatively fast fault isolation, and with the diagnostics interface 200, it will be possible to quickly determine from a remote location if the problem or suspect fault is located within the digital network of the telephone company or service provider or within the customer premises equipment 120 of the end-user.

The facility loop-back diagnostics interface 200 makes the required electrical connection to the DS1 digital line side through a conventional 56 pin connector (edge-type) to a double-sided printed circuit board for the diagnostics interface 200. The end-user connects its customer premises equipment 120 to the network interface through a customary 4-wire, 8-pin modular telephone jack (i.e., a standard FCC-type RJ48), which represents an extension of the interface 200 to the premises of the end-user.

After the end-user or subscriber has been provided with high capacity digital service by the telephone company or service provider, (that is, the end-user with the 1.544 Mbps DS1 digital signal), should the DS1 origination facility 110 thereafter determine that technical difficulty is being experienced relative to the DS1 communications channel or the digital signal being transmitted (for example, water getting into the transmission cable, communications electronics going bad, customer premises equipment failing, the occurrence of natural disasters, etc.), the degraded digital signal will be routed by the digital cross-connect system 116 (which is typically located at the central office of the DS1 origination facility of the telephone company or service provider), where the degraded DS1 digital signal 114 being transmitted will be flagged and noticed by appropriate technicians, who will thereafter attempt to isolate the suspect fault. The digital cross-connect system 116 can directly read and write into the facility data link, thereby avoiding the need to use a mandatory mechanical-type of test port vis-a-vis portable test equipment to perform a facility loop-back test on the degraded digital signal 114 that is being transmitted to determine where the location of the suspect fault physically is located (that is, from the customer premises equipment of the end-user or from the DS1 communications channel relating to the DS1 origination facility of the telephone company or service provider). The digital cross-connect system 116 will have a alarm at the facility maintenance and alarm center 118 which will be activated. The alarm condition will be automatically flagged by the network monitoring and administration system 120 which is located at the central office of the telephone company or service provider. The network monitoring and administration system 120 continuously monitors the digital signal being received by the DS1 facility from the facility network (at reference point 122) and the same digital signal that is being transmitted by the end-user (at reference point 124), thereby completing the transmission path with respect to the DS1 digital signal. This will enable anyone to know that the digital signal is not degraded at reference point 122, while the same digital signal is degraded at reference point 124, but cannot give any insight as to the exact location of whether the suspect fault is in the DS1 facility to the end-user or from the end-user back to the DS1 facility. The network monitoring and administration system 120 has a number of critical operating systems or subsystems, including the end user data terminal 126, the surveillance assurance network services and network monitoring and analysis systems 128, the test system controller 130, such other systems which are required from time to time, and a remote test unit 132.

Following a triggering of the alarm, the central office would be able to call the end-user to inform the end-user that there is presently on-going technical problems with its DS1 facility signal, and that the suspect fault and resulting problem could thereafter be isolated and its location determined if the end-user would all the central office to have its transmit signal for 2-3 minutes in order for the central office to conduct performance testing remotely vis-a-vis the facility loop-back diagnostics interface 200 to either initiate a standard facility loop-back test and/or down-load certain performance data from designated registers that are resident in associated nonvolatile memory the previously stored performance data relative to certain performance characteristics of the digital signal that is recently being received and transmitted by the end-user.

Once notified, the end-user will allow the test system controller 130 to drive a dedicated remote test unit 132 (or the digital cross connect system matrix 116 vis-a-vis the facility data link channel), to allow the digital signal 114 being transmitted by the DS1 origination facility to be electronically cross-connected to the facility access digroup by the network management and administration system 120, which will allow an appropriate command code to be transmitted either in-band (i.e., in superframe format) or via the facility data link (i.e., in extended superframe format) to the facility loop-back diagnostics interface 200 (at reference point 140) in order to loop-back the diagnostics interface 200 to conduct a facility loop-back test. Once the diagnostics interface 200 is looped-back, an appropriate command code can be transmitted vis-a-vis the facility data link channel of extended superframe format using LAP B protocol in order to facilitate down-loading of the previously stored performance data pertaining to the digital signal that is being received and transmitted by the end-user. Alternatively, if an remote test unit 132 is used, the remote test unit 132 will appear as the digital transmit signal 114 from the end-user and would functionally be the apparatus that would communicate with the facility loop-back diagnostics interface 200 in order to either loop-up or loop-down the interface 200. When the facility loop-back diagnostics interface 200 is caused to loop-down, the digital signal is effectively returned to the end-user for further utilization. The test porting is not necessary if the digital cross connect system 116 is utilized by the central office to loop-up or loop-down the diagnostics interface 200. While the facility loop-back diagnostics interface 200 is conducting a standard loop-back test or is down-loading performance data to the digital cross connect system 116, the digital cross connect system 116 would inform the customer premises equipment 120 of the end-user vis-a-vis the facility data link that a loop-up test is currently on-going to determine if there is a problem fault present on the digital circuit of the end-user. Therefore, the standard loop-back test, as well as the down-loading of performance data relative to the DS1 digital signal of the end-user, is an intrusive type of performance test from the viewpoint of the end-user. Once the loop-up code has been sent to the facility loop-back diagnostics interface 200, the operation support and test systems at the central office, or a manual command will be activated at the interface 200 located near the end-user, will transmit a designated command code in LAP B protocol using extended superframe format, to down-load the particular performance data that is resident within designated registers of the associated memory of the facility loop-back diagnostics interface 200, that has been previously stored with respect to that specific DS1 digital signal.

The facility loop-back diagnostics interface 200 down-loads its performance data using extended superframe format in LAP B protocol using the 4 Kbps facility data link channel, thereby allowing the various operations test and support systems that are in place at the central office to collect the performance data. If required by analysis of the performance data, the test systems will thereafter, perform various types of particular transmission and error testing of the suspect DS1 digital signal. The down-loaded performance data is then either stored at the digital cross connect 116 or stored in the test controller of the network monitoring and assurance system 128, and will become part of a historical data file directly relating to the relevant performance history of the specific DS1 digital signal of the end-user.

Eventually, in order to restore the digital line to the end-user, the operations support system is also able to send an in-band command code in superframe format, or an out-of-band command code in extended superframe format vis-a-vis the 4 Kbps facility data link channel, to the diagnostics interface 200. Overall, this results in an absolute minimum amount of time that the DS1 digital service to the end-user is disrupted to perform the loop-back test or to down-load the performance data pertaining to the DS1 digital signal.

In as much as it can be determined whether the digital signal being received by the diagnostics interface 200 (at reference point 140) is originating from the DS1 Facility network, and it can also be determined whether the digital signal being transmitted to the interface 200 is originating and being transmitted by the customer premises equipment of the end-user (at reference point 142) or the suspect fault can effectively be thereafter isolated as existing on either side of the facility loop-back diagnostics interface 200. That is, the suspect problem fault can be isolated and localized as being either on the DS1 digital circuit being transmitted by the end-user, or,.on the DS1 digital circuit being received by the end-user from the telephone company or service provider, since the T1 facility signal of the end-user being transmitted by the end-user is effectively being operationally separated by the diagnostics interface 200 from the T1 facility signal of the telephone company or service provider that is being received by the end-user.

Furthermore, the facility loop-back diagnostics interface 200 will provide the telephone company or service provider with the capability of nonintrusive monitoring the performance of the digital signal in real-time and thereafter facilitate the storing of both sides of the T1 receive path 112 and the T1 transmit path 114 that pertain to the high-capacity digital signal. Thereafter, the specific historical performance data can be down-loaded as required by the telephone company or service provider, as when appropriate diagnostics of a defective or suspect digital signal are needed to be conducted. During the performance monitoring of the digital signal in real-time, and storing of historical performance data relating thereto, the digital signal of the end-user will not be disturbed or interfered with. Further, if the end-user is complaining that it has experienced previous problems with its high-capacity digital service, the telephone company or service provider will be able to collect the previous seven (7) days performance data pertaining to the specific digital signal, which has been monitored in real-tine nonintrusively and automatically stored in designated registers of associated memory by the diagnostics interface 200, to determine whether or not in fact the end-user really had technical problems with its T1 digital circuit, as the telephone company or service provider will be examining the same historical data or information that the end-user has experienced for a given period of time.

For example, if there had been an electrical power interruption or outage on the line of the end-user, which occasionally randomly occurs, the internal electronics of the facility loop-back diagnostics interface 200, particularly the microprocessor and resident software of the performance monitor 150, will inform the telephone company or service provider, that there has been a loss of power experienced on the digital line of the end-user.

Figure 5:
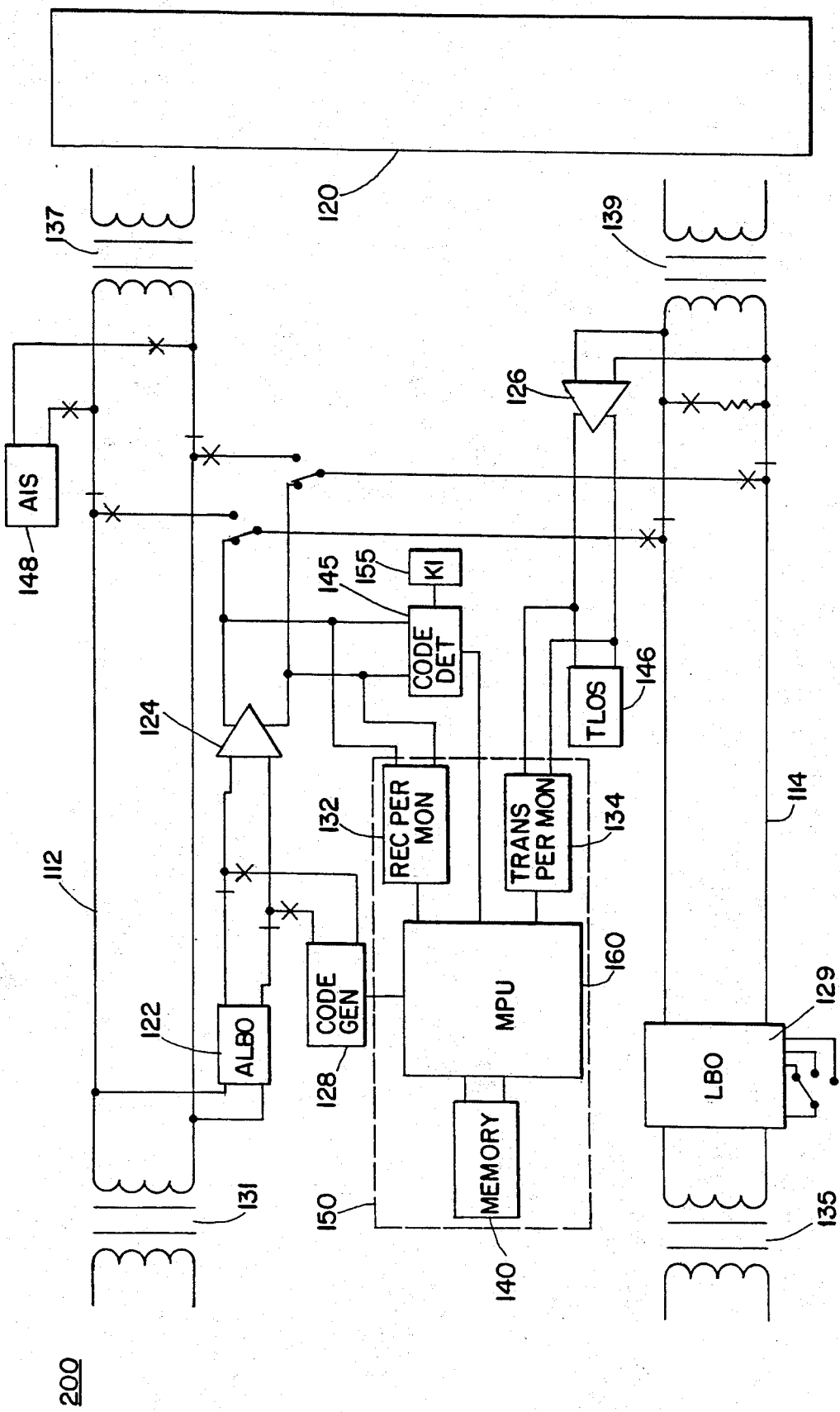
FIG. 5 is a generalized block diagram describing the enhanced a full duplex facility loop-back test, diagnostics and maintenance system with an intelligent diagnostics interface having both diagnostics and continuous nonintrusive performance monitoring and storing capabilities which is used within a high-capacity digital network and that is built in accordance with the present invention.

FIG. 5 is a generalized block diagram describing the enhanced a full duplex facility loop-back test, diagnostics and maintenance system 1 with an intelligent diagnostics interface 200 having both diagnostics and continuous nonintrusive performance monitoring and storing capabilities which is used within a high-capacity digital network and that is built in accordance with the present invention. Referring to FIG. 5, the T1 digital facility signal will arrive vis-a-vis the signal receive path 112 to the facility loop-back diagnostics interface 200, representing the incoming termination point at the network interface for the end-user, and, generally, the incoming digital signal will pass thru the diagnostics interface 200 unaffected to the customer premises equipment. The signal will also be monitored by an automatic line build-out 122, a regenerator 124, and thereafter to the performance monitor 150 of the facility loop-back diagnostics interface 200. The automatic line build-out 122 is looking at the incoming digital signal from the line repeater of the T1 facility transmission span, or from the digital cross connect of the T1 facility network, and acts to equalize the digital line to provide an input signal to the regenerator 124. Additionally, the automatic line build-out 122 is utilized when the facility loop-back diagnostics interface 200 is looped-up to conduct a facility loop-back test of a suspect digital circuit within the T1 digital facility network. Thereafter, the incoming signal will pass to a code generator 128. The code generator 128 when not activated will be off-line, waiting to receive a command code in LAP-B protocol from the digital cross connect system (or alternatively, a test system) to cause the diagnostics interface 200 to down-load the most recently stored performance information or data for the digital signal for both the receive and transmit sides of the digital signal path that is presently stored in the associated registers of memory for the microprocessor 160 of the performance monitor 150 to the central office of the telephone company or service provider. The incoming digital signal will first pass from the transformer to the automatic line build out 124, and then the signal will pass to the code detector. Thereafter, the incoming digital signal will pass to the performance monitor 150, and be passed to the microprocessor 160. The incoming signal will then proceed to the code generator 128 to down-load information (if relays are energized by the solenoid) or to the automatic line build out 124 (if relays are not energized by the solenoid).

In similar fashion, this will also be true for the transmit signal originating from the end-user, with the outgoing digital signal being transmitted over the outgoing digital signal path 114 by the customer premises equipment of the end-user to the T1 facility, which initially passes thru the network interface termination point and the diagnostics interface 200 before being monitored by regenerator 126. The performance monitor 150 is operatively connected to, and bridges both, the incoming receive signal path from the T1 facility transmission span and the outgoing transmit signal path of the customer premises equipment of the end-user and nonintrusively monitors both of these signal paths by functionally acting as a pair of test-sets (that is, one test-set positioned on the incoming [or receive] digital signal path coming from the T1 facility transmission span, and one test-set positioned on the outgoing [or transmit] digital signal path coming from the customer premises equipment 120 of the end-user), automatically monitoring and storing the performance information or data that is presently occurring with respect to the receive and transmit signal paths.

In general fashion, the microprocessor 160 for the facility loop-back diagnostics interface 200 has multiple functions, one of which is to continuously monitor the receive and transmit digital signals nonintrusively through internal logic associated with the receive performance monitor 132 and the transmit performance monitor 134, and thereafter store certain of the information or data being monitored in associated nonvolatile memory 140, for a known period of time certain information or data relating to various historical characteristics or factual events that are relevant to assessing digital signal performance for both the receive signal path or transmit signal path. By changing the software resident in the microprocessor 160 the data being collected may be varied from time to time. For example, initially the performance information derived, or performance data collected, will include the following, namely: (i) bi-polar violations [i.e., in a bipolar signal, a "one" [mark, pulse] which has the same polarity as its predecessor], (ii) cyclical redundancy check, (iii) framing errors, (iv) B8ZS signature octet, (v) line coding violations, (vi) line errored seconds, (vii) line severely errored seconds, (viii) line unavailable seconds, (ix) path coding violations (i.e., code redundancy check [6 frames] for extended superframe format and frame error count for framing [12 frames] for superframe format), (x) path errored seconds, (xi) path severely errored seconds, (xii) path unavailable seconds, (xiii) pulse density violation seconds, (xiv) B8ZS violation seconds, (xv) monitored seconds, (xvi) status register (including loop-back request, data incomplete indicator, loss of signal indicator, alarm signal indicator (i.e., that blue alarm has been sent), yellow alarm indicator (i.e., that alarm has been received), and out-of-frame condition), (xvii) current hour counts for both the A-Z and Z-A directions, (xviii) current daily counts for both the A-Z and Z-A directions, (xix) 24 hourly history counts for both the A-Z and Z-A directions, and (xx) 7 daily history counts for both the A-Z and Z-A directions. This performance data or resulting performance information will be stored in associated memory registers (which can be later down-loaded, upon receipt of an appropriate command code to the interface, to a remote location of the telephone company or service provider). The memory registers may be solid-state random access memory or otherwise.

The transmission loss of signal detector 146 bridges the transmit circuit path for the customer premises equipment of the end-user and is activated (vis-a-vis an LED indicator located on the diagnostics interface 200) when the transmit circuit path of the end-user is either dead or not transmitting any digital signal at all.

The alarm indication signal generator 148 is activated when the diagnostics interface 200 conducts a facility loop-back test and holds the customer premises equipment 120 in a controlled alarm environment, indicating to the end-user that a facility loop-back test is being conducted on the digital line serving the end-user and consequently, the end-user will not be able to transmit over the digital line until the facility loop-back test is completed by the telephone company or service provider.

Consequently, for the first time, by analyzing the data being monitored and collected by the facility loop-back diagnostics interface 200, the telephone company or service provider will be able to ascertain "when" the digital service initially encountered problems and "how long" the digital service has been degraded and in which direction it occurred. Accordingly, by having the performance monitoring capabilities on both the receive and transmit digital signals paths, the telephone company or service provider will be able to determine if the technical problems which the end-user is experiencing with its customer premises equipment 120, is the cause of digital network facility of the telephone company or service provider (i.e., the problem fault can be isolated to the T1 digital network facility side of the facility loop-back diagnostics interface 200), or were the cause by the end-user's customer premises equipment 120 (i.e., the problem fault can be isolated to the end-user side of the facility loop-back diagnostics interface 200). For the first time, rather than dispatching a technician to the location of the end-user to test the customer premises equipment of the end-user, by simply initiating a facility loop-back test of the suspect circuit by the diagnostics interface 200, either remotely or at a designated location within the DS1 facility transmission span, a problem fault will be able to be placed under test and localized to either the digital DS1 facility network side of the signal path or to customer premises equipment end-user side of the signal path. This is possible since the telephone company or service provider will be able to access (i.e., loop-back) the diagnostics interface 200 remotely (i.e., vis-a-vis the data access sequence), which places the interface 200 into the data access mode of operation in order to down-load the previously stored performance data or initiate a facility loop-back tests. To access the stored performance data or performance information, the telephone company or service provider will send an appropriate command code in extended superframe format in LAP-B protocol to have the diagnostics interface 200 down-load the previously stored performance information or data pertaining to the suspect digital signal path or circuit, and the interface 200 will down-load and transmit the particular performance information or data for the suspect digital circuit in LAP-B protocol vis-a-vis the 4 Kbps facility data link utilizing extended superframe format that is available for the diagnostics interface 200 to communicate with the telephone company or service provider. Afterwards, the telephone company or service provider will place the facility loop-back diagnostics interface 200 in its performance monitoring mode of operation, by sending an appropriate in-band command code, or extended superframe format, to the interface 200 to loop-down the interface 200.

The facility loop-back diagnostics interface 200 allows the telephone company or service provider to examine and analyze the performance of the suspect signal path coming from the telephone company or service provider receive side digital line, as well as be able to examine and analyze the performance of the suspect signal path coming from the end-user transmit side digital line, thereby being able to examine a particular closed digital loop (or digital signal path) with respect to monitoring the performance of either the receive digital signal or the transmit digital signal. This performance data or derived performance information is captured in real-time by the diagnostics interface 200, and thereafter stored in appropriate memory registers, which may be down-loaded at the appropriate time by the telephone company or service provider.

The facility loop-back diagnostics interface 200 is operationally and functionally compatible with the earlier facility loop-back interface 100, which manifests itself in at least the following three areas. First, both the facility loop-back diagnostics interface 200 and the facility loop-back interface 100 of the prior art design and construction respond to both superframe in-band codes or extended superframe out-of-band codes for looping-up the interface to perform a facility loop-back test, thereby providing the ability for remote testing of the DS1 transmission span. Since the facility loop-back diagnostics interface 200 is microprocessor driven, by making changes in the resident software in the future, the facility loop-back diagnostics interface 200 will have built-in flexibility or adaptability and will be able to be operationally and functionally compatible with future revisions to the LAP data link protocol, such as the proposed LAP-D data link protocol. This increased flexibility ensures that the facility loop-back diagnostics interface 200 will not be made obsolete and will remain operationally and functionally compatible with prospective changes in the data link protocols. The LAP-D protocol is presently proposed as the American National Standard for Telecommunications by the American National Standard Institute, Inc. (in ANSI technical publication T1.602-1989, which is incorporated herein in its entirety by reference); the stated purpose of LAP-D .data link protocol is to convey information between layer-3 entities across the ISDN user-network using the D-Channel. The facility loop-back diagnostics interface 200 is also functionally and operationally compatible with the DS1 signal transmission rate of 1.544 Mbps that is presently used by the earlier facility loop-back interface 100.

Accordingly, the facility loop-back diagnostics interface 200 will provide a cost-effective, continuous and nonintrusive performance monitoring for high-capacity digital service extended to an end-user location, will facilitate rapid detection of transmission error bursts and will permit immediate trouble-shooting and sectionalization of suspect problem faults to a particular digital signal path or circuit located within the digital DS1 facility network or within the customer premises equipment at the location of the end user.

Figure 6:
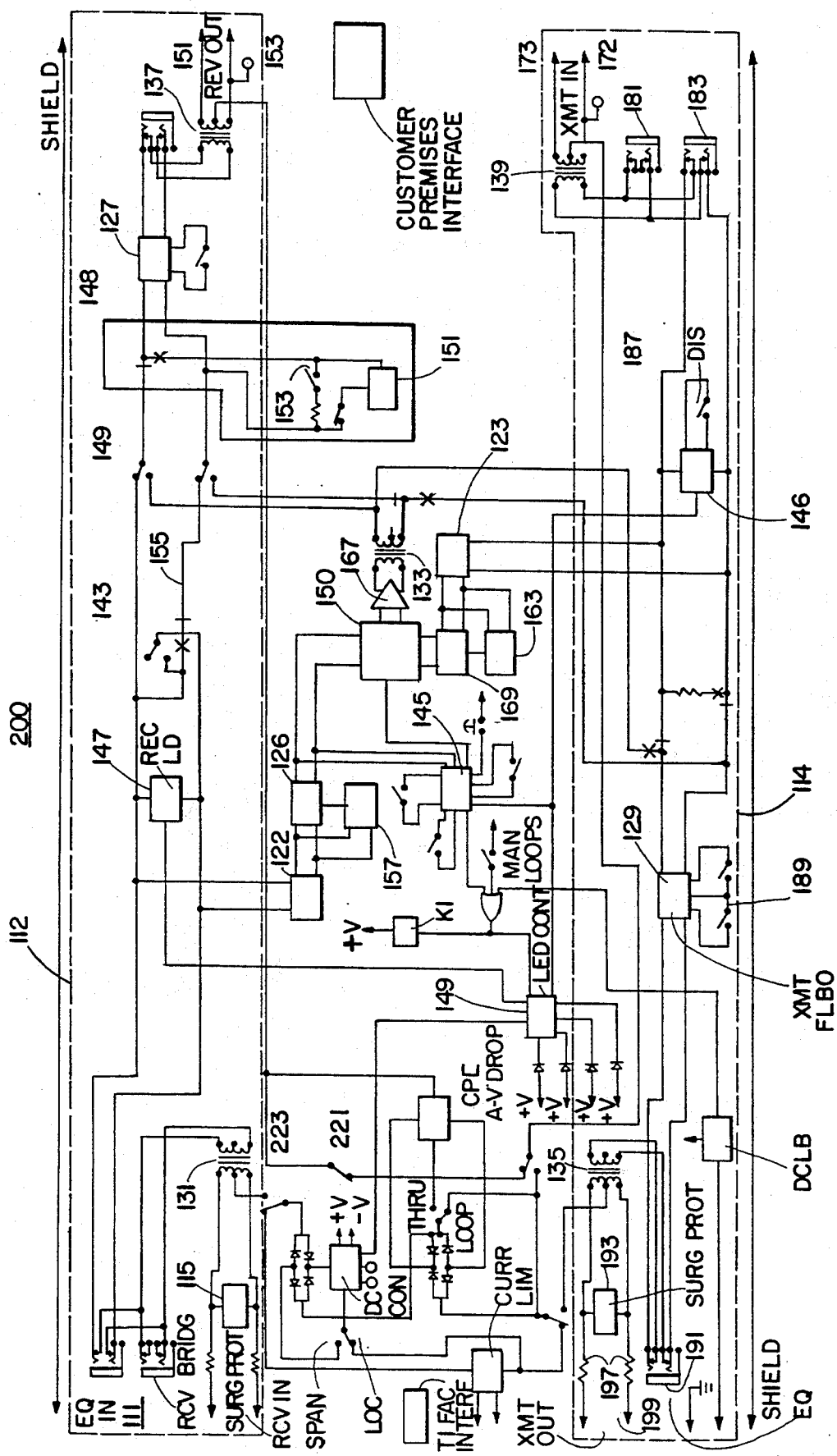
FIG. 6 is a detailed block diagram of the electronic circuitry of a specific embodiment of the a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 6 is a detailed block diagram of the electronic circuitry of a specific embodiment of the a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. The facility loop-back diagnostics interface 200 contains a number of specific circuits performing particular functions. Detail schematic circuit diagrams of a specific embodiment corresponding to the block diagram of FIG. 6 are shown in FIGS. 7 through 13 with corresponding blocks shown enclosed within dash lines and labeled with corresponding reference numerals. The interface 200 utilizes a double-sided printed circuit board for its various circuits and subcircuits; reference numerals on the right and left side of the schematic pertain to the conductive connections of the double-sided printed circuit board in conjunction with a customary 56 pin connector, with each side of the double-sided printed circuit board has 28 inputs and outputs from the various circuits (e.g., odd numbers representing the top component side, even numbers representing the bottom solder side). Referring to FIG. 6, the incoming digital signal to the facility loop-back diagnostics interface 200 is generally a DS1 transmission line that consists of a full duplex digital transmission facility that is composed of two twisted metallic pairs and regenerators, as required, that carry high-capacity digital signals having a digital signal transmission rate of at least 1.544 Mbps. The facility loop-back diagnostics interface 200 is operatively connected to the network interface, thereby serving as a termination point for the DS1 digital transmission facility and the customer premises equipment at the location of the end-user. This is accomplished by a modular mechanical connector, commonly referred to as RJ48, and is able to accommodate 4-wire, 8-pin connections. The interface 200 has various protective circuits and various mechanical connections that are required by the interface 200 along with various circuits and subcircuits representing the incoming receive signal path 112, the outgoing transmit signal path 114, the performance monitoring circuits and associated logic 150, the various power circuits 225 for loop powering or thru powering (to optionally provide customary power requirements to customer premises equipment) that are required to operate the interface 200, the loop-back regenerator driver circuits 250, and the automatic voltage drop circuits 275 used to ensure span continuity.

Figures 1, 7A:
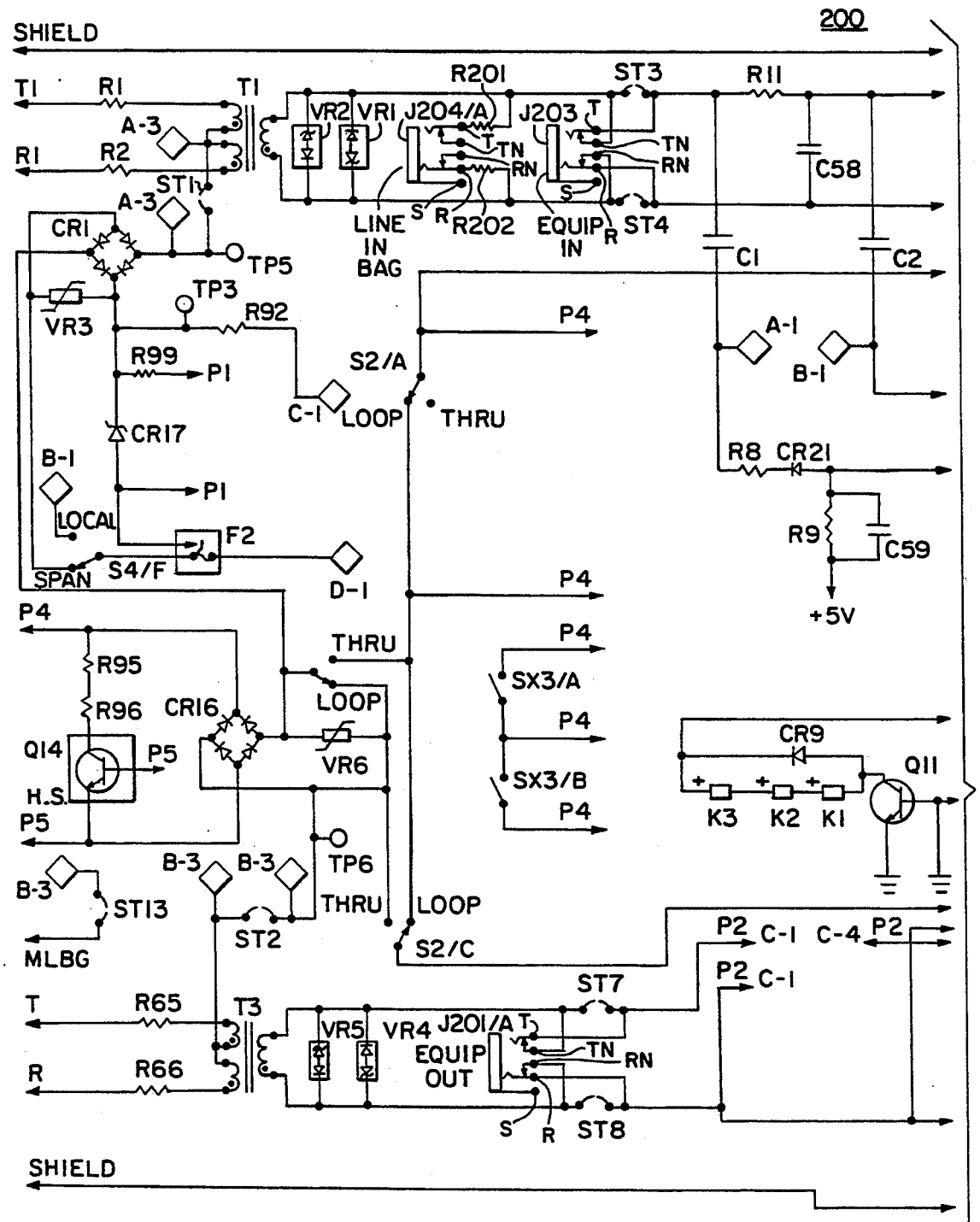
Figures 2, 7A:
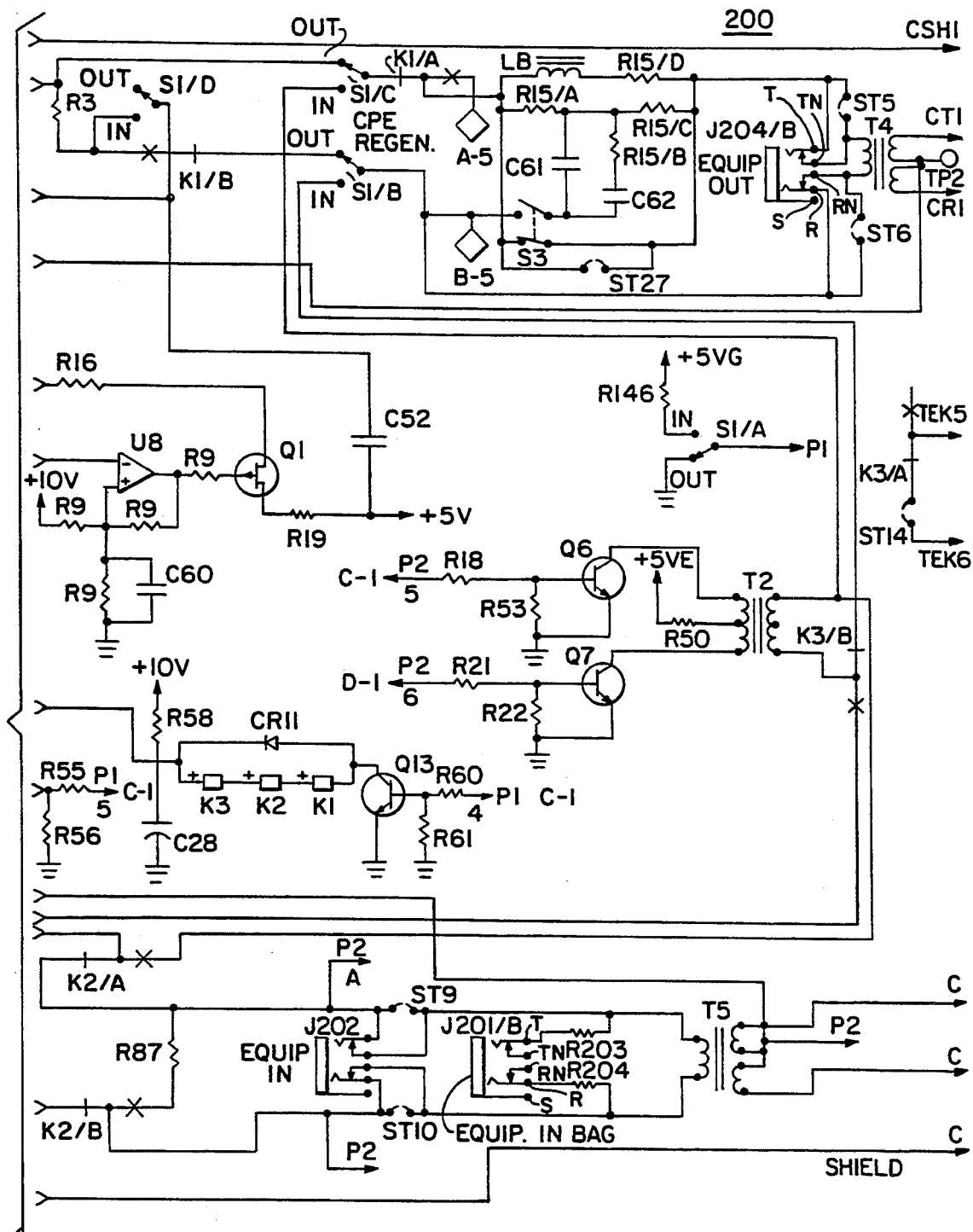
Figure 7B:
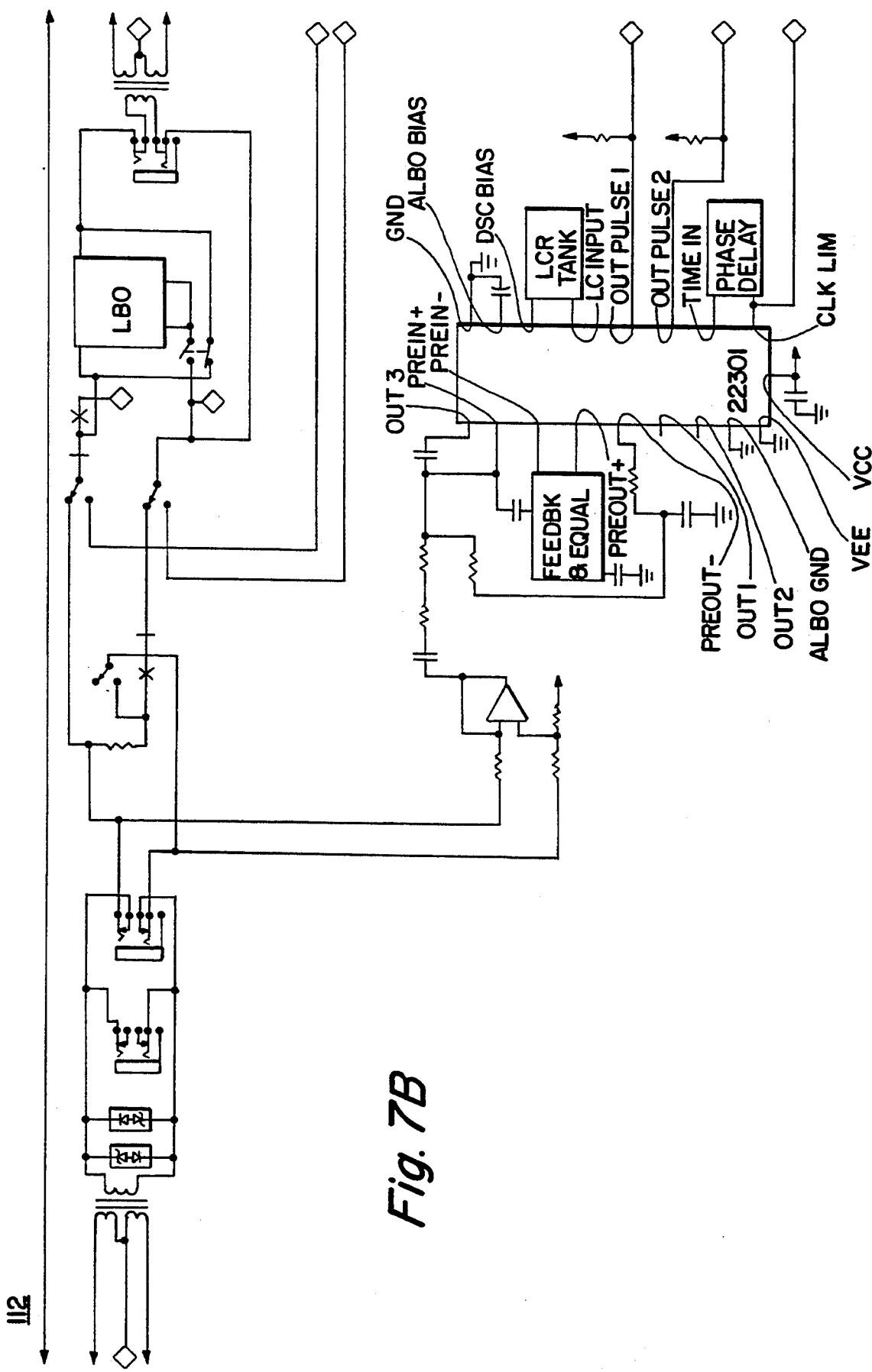
FIG. 7B is a detailed electrical schematic circuit diagram of specific circuitry that is used to implement a portion of the operation of the block diagrams of FIGS. 5 and 6 relating to the receive signal path for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 7A is a detailed electrical schematic circuit diagram of specific power supply driver circuitry that is used to implement a particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. FIG. 7B is a detailed electrical schematic circuit diagram of specific circuitry that is used to implement a portion of the operation of the block diagrams of FIGS. 5 and 6 relating to the receive signal path for one particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. Referring to FIG. 7, the incoming digital signal that is being transmitted over the DS1 facility cable transmission span from the DS1 facility digital network of the telephone company or service provider to the end-user arrives to the interface 200 through the receive-in jack (which is located at the beginning of the incoming receive signal path 112 and which is commonly referred to as T1R1), and thereafter will proceed to the interface 200, specifically to the incoming receive signal path 112 of the interface 200, by initially passing thru DC pulse transformer 132. Incoming surge protection is provided by coupling the incoming receive signal path with an appropriate surge protector 115. Balanced resisters 113 provides fusing protection for any sensitive telephone equipment of the telephone company or service provider or end-user that is on the incoming receive signal path line 112, while surge protection will provide protection against electrical spikes and surges, etc., by a combination of circuit breaker 115 and various fuses of appropriate ratings. The DC pulse transformer 132 has a center tap and ground which will permit the simplex DC current to be tapped whenever needed to provide a DC source (i.e., from −48 volts to −130 volts) to be used by equipment of the DS1 facility transmission span (e.g., office repeater bays, etc.). Also note, that each of the DC pulse transformers in the facility loop-back diagnostics interface 200 will, whenever required, provide a nonintrusive high impedance bridging-type test set of the telephone company or service provider to be used in order to monitor the incoming DS1 1.544 Mbps digital signal for errors at the location of the interface 200.

The equipment-in jack is an intrusive jack and can serve as an auxiliary circuit path, if required, by allowing a facility test signal to be inserted at the equipment-in jack in order to test the circuit path continuity of the customer premises equipment of the end-user. Each of the jacks are built to accept standard bantom-type plugs (e.g., the plugging into an equipment-in jack allows the technician to insert a test signal toward the customer premises equipment of the end-user, or initiate a facility loop-back test by the interface 200). Furthermore, if required, the equipment-out jack may also be used for patching the incoming DS1 signal into other high-capacity digital lines that may be available, but are currently not used or inactive for whatever reason (by the utilization of the equipment-in jack, in conjunction with the receive bridging jack, the equipment-out jack, and the transmit bridging jack that are physically present for both the incoming receive and outgoing transmit sides of the digital circuit), all of which when combined together will comprise the functional equivalent of a miniaturized digital cross-connect signal matrix which is used to provide direct access to the digital circuit by the telephone company or service provider as may be required from time to time. In similar fashion, this approach may be used to allow a suspect problem digital signal (from another digital transmission line or from the same digital transmission span) to be patched-in from the customer premises equipment using shielded patching ports for further facility testing and evaluation purposes as is also required from time to time. Additionally, the facility loop-back diagnostics interface 200 is able, from the location of the central office of the telephone company or service provider, to have a technician in the field patch-into a given diagnostics interface 200 and thereafter manually transmit the in-band code and conduct a loop-back test remotely by sending a test signal (vis-a-vis the 4 Kbps facility data link channel) to any given facility loop-back diagnostics interface 200 located within the DS1 facility transmission span. Accordingly, the facility loop-back test can be accomplished remotely, say at the location of the network interface, rather than necessarily from a digital cross connect facility of the service provider or telephone company. The test signal for the facility loop-back test is placed on the suspect circuit from a remote location, and is then fed from that remote location vis-a-vis the facility loop-back interface 200 to dedicated test equipment, which will then make the technical determination as to whether the particular facility transmission circuit or loop that is presently under test does in fact have a problem fault or was operational.

The incoming receive signal path 112 and the outgoing transmit signal path 114 of the facility loop-back diagnostics interface 200 are passive in addition to providing optional additional attenuation to the signal. Also, each signal path is passive in that each signal path allows the respective incoming and outgoing signals to pass thru a respective DC pulse transformers 131 and 139 respectively and minimally (i.e., less than 1 db) loads down the signal. Since the incoming receive signal path 112 is monitoring for a broader range of signals, which requires greater sensitivity than does the outgoing transmit signal path 114 which is monitoring for transmit signals originating from the customer premises equipment 120 of the end-user. Furthermore, the incoming signal will be able to have its signal strength attenuated by 7.5 db by the attenuation of the fixed line build-out 127 which bridges across the tip and ring of the incoming receive signal path 112; this is to be distinguished from the outgoing transmit signal which will be able to have its signal strength attenuated up to 22.5 db in increments of 7.5 db by the variable attenuation of the fixed line build-out 129 which bridges across the tip and ring of the outgoing signal of the outgoing transmit signal path 114. The increased attenuation required by the outgoing transmit signal (prior to the outgoing signal entering the DS1 transmission cable of the telephone company or service provider) is necessary to, among other things, eliminate errors due to cross-talk.

The incoming digital signal will pass thru an automatic line build-out 122, which bridges the incoming receive signal path 112, and allows the incoming digital signal to have the associated line voltage adjusted, in order to achieve the proper line voltage level for the correct operation of the receive line regenerator 125. The incoming digital signal passes thru the automatic line build-out 122, and, if necessary, the receive line regenerator 125, thereafter becoming an input signal to the performance monitor 150. The performance monitor 150 will send an output signal to a digital driver circuit 167 to drive the DC pulse transformer 133, in order to down-load the previously stored performance data or information relating to both the receive and transmit signal paths, when requested, through the loop-back regenerator 145 to the telephone company or service provider. This is accomplished by either enabling or disabling the loop-back regenerator 145. When the respective solenoids are energized for the K1 relay 155, and the K2 relay 171 respectively, the receive and transmit signal paths are opened. The K1 relay 155 is associated with the receive signal path and the K2 relay 171 is associated with the transmit signal path. Both relays 155 and 171 operate in conjunction with each other upon the receive signal path 112 and connect the outgoing transmit signal path 114 to the DC pulse transformer 133 and its associated driver 167.

Prior to the receive line regenerator 125, there is a receive clock recovery circuit 157, which bridges the incoming receive signal path 112. The receive clock recovery circuit 157, provides the ability to extract clock information from the incoming signal for use in extracting data and performance information from the DS1 transmission span. Since there is an separate transmit clock recovery circuit 163 for the outgoing transmit signal path 114, the performance monitor 150 is able to continuously monitor the performance of both the receive and transmit signal paths of the interface 200 simultaneously and nonintrusively. The performance monitor 150 will automatically and continuously monitor and store the historical performance information or* data for the receive and transmit signal paths simultaneously and nonintrusively.

A receive loss of signal logic detector 147 is bridged across the incoming receive signal path 112 and monitors the line for the presence of a signal. When no signal is present, the LED control circuitry 149, correspondingly lights the front panel mounted receive loss of signal LED.

In the event that a loop-up code is detected by the detector 145 the interface 200 will initiate a facility loop-back, and energize the solenoid of the K1 relay 155, thereby causing the relay to operate, and accordingly, thereafter interrupt or break the incoming receive digital signal being transmitted to the end-user by the telephone company or service provider. Immediately following the interruption or break in the incoming digital signal, at the location of the end-user, the alarm indicator signal code generator 151 would automatically activate, and accordingly, send a prearranged alarm signal of all "ones" to the customer premises equipment 120; this alarm signal is also customarily referred to as the "keep-alive" signal, or blue alarm signal, by the industry. The blue alarm signal would indicate to the end-user that the DS1 facility digital circuit of the end-user is presently out-of-service and under a facility loop-back test (or other appropriate test). The alarm indicator signal code generator 151 will additionally act to inhibit a separate alarm of the customer premises equipment from activating. The alarm indicator signal code generator 151 may be manually disabled (or manually enabled) by operation of switch 153.

Note, that the independent operation of a switch 143 allows a signal regenerator 167, if needed, to come on-line in order to strengthen the incoming digital signal to the correct voltage level require for the specific voltage level of the customer premises equipment 120. Through switch 143 the customer premises equipment regenerator 167 is required to be able to switch both sides of the pair, that is the DS1 R1 of the incoming receive signal path 112, in order to obtain a balanced input into the regenerator 167. In the usual "regenerator out" position, switch 143 will allow the incoming signal to pass to the K1 relay 155 and directly through to the DC pulse transformer 137. DC pulse transformer 137 is coupled directly to the customer premises equipment 120 through electrical contacts 151 and 153 respectively.

Figure 8:
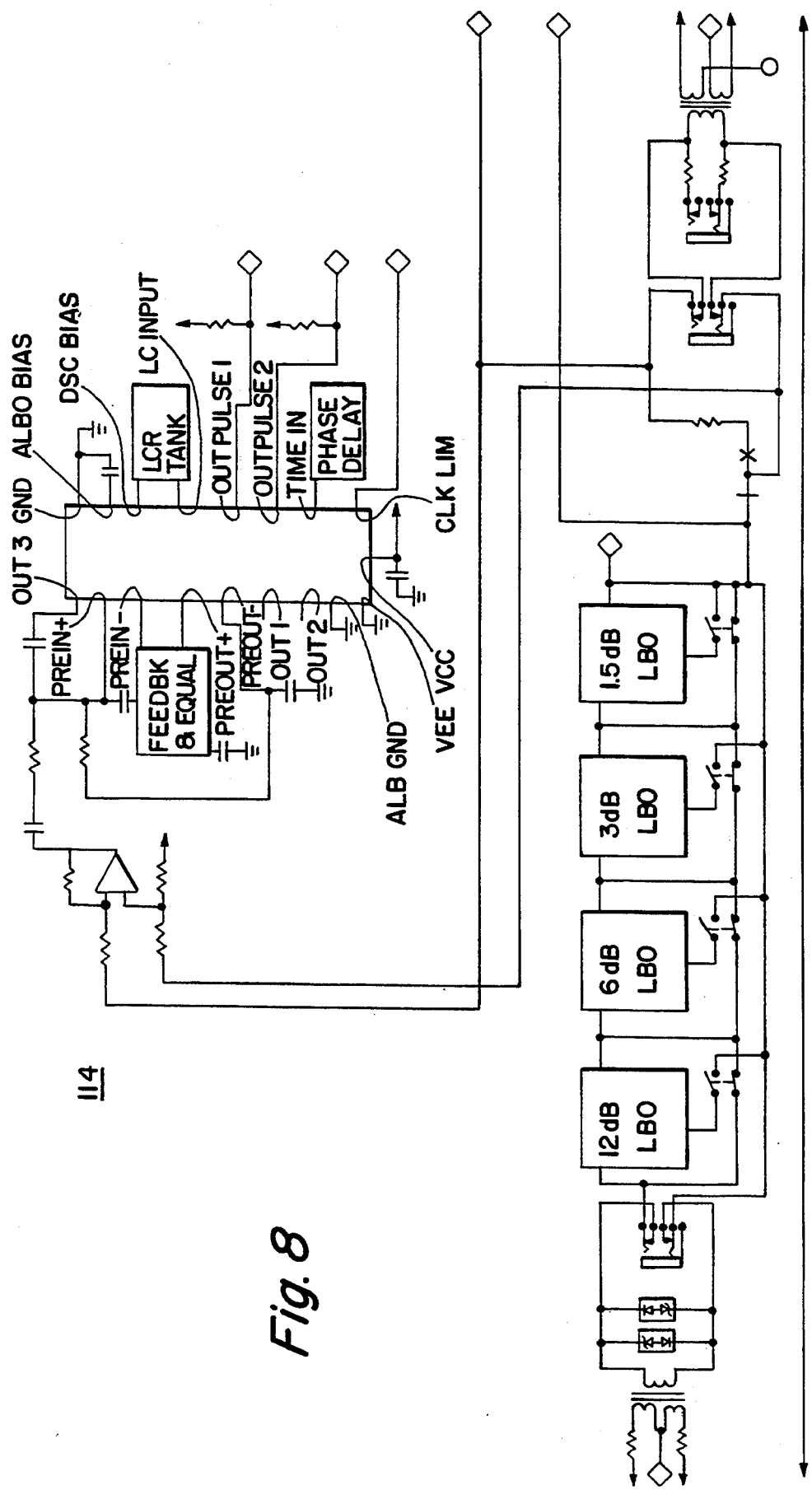
FIG. 8 is a detailed electrical schematic circuit diagram of specific circuitry that is used to implement a portion of the operation of the block diagrams of FIGS. 5 and 6 relating to the transmit signal path for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 8 is a detailed electrical schematic circuit diagram of specific circuitry that is used to implement a portion of the operation of the block diagrams of FIGS. 5 and 6 relating to the transmit signal path for one particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. Referring to FIG. 8, and focusing on the operation of the outgoing transmit signal path 114 originating from the customer premises equipment 120 at the location of the end-user. The transmit digital signal from the customer premises equipment 120 of the end-user is transmitted over a shielded outgoing transmit signal path 114 (as is the incoming receive digital signal over the incoming receive signal path 112), thereby providing protection from noise spikes, electromagnetic and radio frequency interference that may be present across the transmit and receive cable pairs. The customer premises equipment 120 is connected to the tip and ring of the digital signal paths of the end-user. Corresponding connections 172 and 173 facilitate the outgoing transmit signal path connections from the customer premises equipment 120 to the interface 200. With respect to the outgoing transmit signal path 114, both the tip and ring of the digital signal paths are being monitored or bridged. The outgoing transmit signal path 114 is coupled to a DC pulse transformer 139. The DC pulse transformer 139 is center-tapped to provide power through to the end-user.

The outgoing transmit signal path 114 has a bridging-type "transmit-in" jack 181, that is associated with a manual test point for the end-user to access in order to be able to independently test the digital signal circuit path associated with the customer premises equipment 120 at the location of the end-user. The bridging type jack 181 allows the end-user to monitor the digital signal at the interface 200 without breaking or interrupting the outgoing transmit signal path 114. Additionally, the transmit signal path 114 has a separate, intrusive, or breaking-type "equipment-in" jack 183, that will interrupt or break the transmit signal path of the customer premises equipment 120 of the end-user from the outgoing transmit signal path 114, thereby allowing a separate digital test signal to be transmitted down the facility side 114.

The digital signal of the outgoing transmit signal path 114 will then be fed into the transmit loss of signal detector 146, which bridges the outgoing transmit signal path 114. The transmit loss of signal detector functions identically to the receive loss of signal detector, except that the transmit loss of signal detector controls the front panel mounted transmit loss of signal LEDs on the interface 200. Associated with the transmit loss of signal detector is the transmit loss of signal loop back switch 187. When switch 187 is enabled, the interface 200 will automatically loop the receive side signal path 112 to the transmit side signal path 114 (the same way a remote loop-back command does) when a loss of transmit signal is detected by the transmit loss of signal detector.

Generally, with respect to the operation of the K2 relay 171, the outgoing transmit signal will be pass over to the transmit signal fixed line build-out 129 which allows for attenuation of up to 22.5 db for the outgoing transmit signal in order to compensate for digital signal strength. By virtue of the operation of a series of switch logic 189, the attenuation is added by optional increments of 1.5 db, 3.0 db, 4.5 db, 6.0 db, 9.0 db, 7.5 db, 12 db, 15 db or 22.5 db. The required attenuation is required to attenuation that is present by the DS1 facility cable transmission span of the telephone company or service provider and up to 22.5 db of attenuation may be required by the outgoing transmit signal to overcome possible cross-talk problems. The switch logic 189 that is present (i.e., four switches are associated with switch 189) the end-user is able to fulfill the requirements of its network interface, that is, the standard of an outgoing voltage for the outgoing transmit digital signal of from +3.0 volts to +3.3 volts present at the interface; these parameters are required by the telephone company or service provider to ensure that the attenuation that exists relative to the outgoing transmit digital signal does not overdrive (or underdrive) the respective input levels to the other regenerators in the DS1 facility cable transmission span during injection of the outgoing transmit digital signal into the transmission span. The switch logic 189 for the interface 200 is as follows: if all the switches are open, there will be zero attenuation added to the outgoing transmit signal; if both switches are closed, there will be 22.5 db attenuation added to the outgoing transmit signal; and when one of the switches is open and the other switch is closed, there will be 15 db attenuation added to the outgoing transmit signal. This switch logic 189 is bi-directional, as its really just a matter of referencing the switch logic 189 in the correct direction.

From the transmit fixed line build-out 129, the outgoing transmit digital signal is then fed to an intrusive breaking-type equipment-out bantom-type jack 191 of the interface 200. This permits the telephone company or service provider to be able to test the outgoing transmit digital signal that is originating from the customer premises equipment 120 of the end-user. When the equipment-out jack 191 is not being used, which is the normal state of operations, the outgoing transmit digital signal will pass along the outgoing transmit signal path 114 thru DC pulse transformer 135. Downstream of the transformer 135 is surge protection for the outgoing transmit signal path 114 provided by surge protector 193. A pair of balanced resistors 197 lead to the separate tip and ring leads 199 that are being bridged by the interface 200 and which are associated with the outgoing digital signal that is being sent by the customer premises equipment 120 of the end-user on the outgoing transmit signal path 114.

Returning to the outgoing transmit signal path 114, and particularly the transmit automatic line build-out 123, the outgoing transmit digital signal is thereafter fed to the transmit regenerator circuit 169, which is an integrated circuit (IC22301), manufactured to industry standards and which is generally known as a T1 repeater chip in the industry. The transmit regenerator circuit 169 basically functions as an automatic gain control and has an internal operational amplifier to provide a gain in order to achieve the needed high-frequency and a tap, which can act as a short the signal to ground under certain circumstances. The transmit regenerator circuit 169 also is monitoring the level of the digital signal that is fed to it, and the higher the digital is the more the transmit regenerator circuit 169 will act to attenuate the digital signal. The net effect is that if the input to the transmit regenerator circuit 169 is great, the circuit 169 will automatically attenuate the digital signal so that a flat response is the result; but if the input to the transmit regenerator circuit 169 is initially at a low level of attenuation, the circuit 169 will automatically provide high frequency gain to the digital signal. The transmit regenerator circuit 169 has an internal signal level detector or sensor, with the resulting high gains and frequency responses being provided by preamp inputs and outputs within the logic of the circuit 169 (i.e., an operational amplifier with a feedback resistor and frequency compensating network in series). Note that the DS1 digital signal is an alternating marked inversion (which alternates for a "1"), and every other "1" will thereafter alternate. There may be a "zero" present, but then the next "1" will be the alternate of the previous inversion. What the T1 repeater chip within the transmit regenerator circuit 169 does is regenerate the DS1 digital signal and also provides either a positive pulse or a negative pulse. The interface 200 obtains a clock cycle from the T1 repeater chip as part of the transmit regenerator circuit 169. All of this logic results in a digital signal on the positive pulse, a signal on the negative pulse, and a clock signal which is used as a reference.

The output signal paths from the transmit automatic line build-out 123 are bridged by the transmit clock recovery circuit 163, which acts more or less as a tank equalization circuit and is pulsed by the incoming digital signal, and accordingly, will thereafter oscillate to the point of being able to lock in the clock frequency that is present; the signal then is fed into an internal comparator for transmit pluses and minuses (which functionally acts as a high impedance buffer in order not to load down the clock circuitry), before the signal from the transmit clock recovery circuit 163 is fed into the transmit regenerator 169. The transmit regenerator 169 then feeds its output signal to the performance monitor 150, which has an 16-bit microprocessor, associated programmable gate array, associated nonvolatile memory having internal storage registers and associated logic.

As can be seen from FIGS. 7 and 8, one of the many advantages of the facility loop-back diagnostics interface 200 is that the interface 200 is functionally compatible with either superframe or extended superframe formats, and the interface 200 may be looped-up from a remote location to initiate a facility loop-back test of a suspect receive or transmit digital circuit or signal path by utilizing either an in-band command code sent to the interface over the DS1 digital facility transmission span or the 4 Kbps facility data link channel.

FIG. 9 is a detailed electrical schematic circuit diagram of specific circuitry that is used to implement a portion of the operation of the block diagrams of FIGS. 5 and 6 relating to the customer premises equipment regenerator driver circuitry for one particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. Referring to FIG. 9, the way that electrical power is achieved for the facility loop-back diagnostics interface 200 is that electrical power may either be derived from the simplex path of the incoming pair of tip and ring leads associated with the DS1 facility cable transmission span (referred to as "span power"), or alternatively, electrical power may be obtained from an external power supply available at the location where the interface 200 is connected to the network interface (referred to as "local power"). The interface 200 has a switch 221, which is used in conjunction with switch 223, to permit the interface 200 to be powered from either span power or local power.

Local power provides standard commercial AC electrical power (24 volts) to the interface 200, which is protected from damage by an upstream fuse of suitable capacity (or milli-amp current-limiting type circuit breaker). The local power is allowed to pass through the bridge rectifier 228, thereby allowing the for either AC or DC, with the DC in either polarity. Appropriate surge protection is provided by a surge protector in series with the bridge rectifier. Next a zener in series with a transistor will act to regulate the power to a 30 volt output, that is required to operate the operational amplifier, which is, in turn, used to regulate a steady flow of 60 milli-amps current to, if need be, to the customer premises equipment 120. There is a 41.2 ohm sensing resistor that acts to turn the operational amplifier "on", thereby controlling the base current to the pass transistor, which effectively regulates the flow of current to customer premises equipment 120 to 60 milliamps. Since the power and current is only supplied in one direction, a diode is used for protection with respect to the resulting DC polarity.

Span power has varying voltage depending on the location of the interface 200 with respect to the actual voltage required to provide sufficient current to power the DS1 facility cable transmission span at the location of the interface 200, but will provide the interface 200 with 60 milli-amp, current-limited simplex DC voltage. The incoming will arrive to the interface 200 through its pair of tip and ring leads of the incoming transmission span associated with the incoming digital signal path 112, and the simplex DC current is then tapped from the primary side of the DC pulse transformer 131 by the center tap that is present with the transformer. There are dedicated test locations in the voltage regulator network of the interface 200 whereby the voltage regulator (also referred to as a DC to DC converter) may be tested, if required, to determine if the voltage regulator is functioning correctly. The bridge rectifier 228 eliminates the troubling polarity associated with the incoming simplex DC voltage. Further downstream in the voltage regulator network and in series with the bridge rectifier 228 are certain zener diodes 229. A switching power supply will utilize the +22 volt source at 60 milli-amps to generate and maintain the required +5 volts reference threshold that is required by all the internal digital logic and associated integrated circuits necessary for the performance monitor 150, with its internal microprocessor 160, to correctly operate all of the diagnostics and performance monitoring functions now associated with the interface 200. The switching power supply has an internal oscillator to generate a smooth AC signal out, and will start pulling current which is coupled to the secondary transformers of the DC pulse transformer, thereby generating the voltages required by the interface 200 in order to operate correctly. Center tapping the DC pulse transformer will provide a DC output of +5 volts, with +10 volts possible across the secondary transformers, which is required by the interface 200 to correctly operate.

Through the switch 221, the interface 200 has two different modes of operation with respect to the powering features, that is, the loop-through powering option (referred to as "loop-powering") and the thru powering option (referred to as "thru-powering"). If the interface 200 is in the loop-powering mode, simplex current arriving to the interface 200 is "looped" back towards the service provider or telephone company. Depending on the position of the local/span switch 223, the simplex current may or may not be used to power the interface 200. Similarly, the simplex leads on the customer premise side (i.e., the center taps of transformers 137 and 139) are effectively shorted. If the interface 200 is in the thrupowering mode, the electrical current is derived from the simplex DC voltage of the span power in conjunction with the associated voltage regulator network. This also means the customer premises equipment 120 is span powered, a transformer is required is located at the termination point. There will be a current loop at that point, returning the simplex power to the DS1 facility cable transmission span of the telephone company or service provider.

FIG. 10 is a detailed electrical schematic circuit diagram of specific circuitry that is used to implement a portion of the operation of the block diagrams of FIGS. 5 and 6 relating to the alarm indicator system driver circuitry 250 for the loop-back regenerator driver circuitry for one particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. Referring to FIG. 10, as the DS1 digital signal is passed to the loop-back regenerator driver 167 (prior to the signal passing to the DC pulse transformer 133), it may have been reduced to a level of milli-volts. The microprocessor logic requires 0.0 to 5.0 volts peak-to-peak TTL digital signal. Accordingly, the regenerator circuits 167 provides and necessary regeneration of the of the digital signal to achieve a final +3 volt peak-to-peak TTL digital signal resulting in an output signal that will be sent to digital microprocessor logic of a plus data, a minus data and a clock lead, all of which are TTL compatible. The regenerator circuit 167 in conjunction with the Zilinx integrated circuits, generate a resulting output signal that will pass to the microprocessor 160. When a plus data signal is feeding the circuit, the transistors of the plus data will turn a transistor "on" thereby providing a current path through the transformer in the positive direction which provides a positive data signal output (with no data on the minus data signal input being present). The opposite will occur when a negative voltage, which will result in current flowing in the negative direction. With the usual performance monitoring state for the interface 200, the loopback regenerator circuit is always "in", which allows the output signal is always regenerated by the same regenerator circuit. This overall associated microprocessor-based logic of the interface 200, then uses this input signals to extract the data signals, and to conduct the continuous nonintrusive performance monitoring of the digital signal, and the storing of the relevant data or information in associated nonvolatile memory registers that are associated with this logic, by the microprocessor 160 and associated logic components of the performance monitor 150.

Accordingly, by a close examination of the details relating to FIGS. 4 through 10 of the present invention, the facility loop-back diagnostics interface 200 may initiate a facility loop-back test by either using the normal loop-back control circuitry or by using the manual facility loop-back test circuitry that is present for the interface 200. The interface 200 has a switch 201 to position the interface 200 in the superframe or in the extended superframe loop-back mode of operation. Regarding the option of having the interface 200 initiate a facility loop-back test normally, that is from a remote location, the incoming loop-up command code will eventually pass to the loop-back code detector circuit for the interface 200. The command codes will be either an in-band or out-of-band code (in either superframe or extended superframe format, respectively) that is transmitted over the standard DS1 facility cable transmission span. The loop-back code detector circuit has an internal loop-back timer circuit which operates to "time-out" the loop-back code detector circuit after the passage of a designated time period. The loop-back timer circuit has two states, namely, the enable state and the disable state. Accordingly, if a loop-back code has been sent, and if the loop-back timer circuit was previously positioned to the enable state, the timer circuit will be initialized to allow the facility loop-back diagnostics interface to automatically time-out following the passage of a designated period of time (for example, say 20 minutes following the receipt of the loop-back code by the interface 200), and the loop-back code detector circuit will automatically reset itself, ready again to receive a subsequent loop-back command code in the future. In this manner, the interface 200 is protected from continuously operating in its looped-up state in response to a previously sent command codes, which may have been falsely or inadvertently transmitted. Additionally, this particular feature also provides a battery saving safeguard for the interface 200, which does contain an internal long-life battery that is used as a back-up power supply for the on board real-time internal clock and associated random access memory.

For example, the microprocessor of the performance monitoring unit for the facility loop-back diagnostics interface is synchronized with an internal clock that is driven by DC conventional power of appropriate levels, but which also has is operatively connected to a long-life battery for a dedicated back-up source of power, if needed from time to time.

Now, regarding the option of having the interface 200 operate in accordance with its feature relating to the manual facility loop-back test circuitry, this can be activated by a push-button type switch 203 that has dedicated flip-flop circuitry and which is located on the front of the facility loop-back diagnostics interface 200, or by a separate dedicated single pole slide-type of switch 205 which will loop-up the interface 200 indefinitely until the switch 205 is turned off. Additionally, the solenoid of the K1 relay may also be energized by the shorting of pins 1 and 19 of the edge connector, the operation of which permits a positive voltage signal to be sent to ground, thereby manually initiating a facility loop-back test by the interface 200.

Accordingly, it will be seen from an understanding of the details of FIGS. 6 through 12, that there are a number of alternative methods that will always be available to the telephone company or service provider to use from time to time in order to initiate a facility loop-back test that the telephone company or service provider may utilize under normal and emergency situations to determine where reported suspect faults are localized by using the facility loop-back diagnostics 200. For example, upon occasion it is necessary that the diagnostics interface 200 be manually operated and placed into a facility loop-back test by using the manual control feature of the interface 200. This method usually requires the dispatching of field technicians to the location of the facility loop-back diagnostics interface 200 in order to activate and deactivate the facility loop-back test (i.e., whereby a switch or locking button that is present on the interface 200 will be used for the local activation of the facility loop-back test signal). Another example for initiating a facility loop-back test is by using the DC control feature of the interface 200. This second method requires that a dedicated cable pair be used for the sole purpose of initiating and deactivating the interface 200 to conduct a facility loop-back test (e.g., what is technically required is that the dedicated cable pair originate from the central office of the telephone company or service provider and is hard-wired to the facility loop-back diagnostics interface 200, so that the simple application of direct voltage on the dedicated cable pair will activate the interface 200 to initiate a facility loop-back test and removal of the voltage on the dedicated cable pair will deactivate the interface 200). Since the facility in-band command code transmitted over the digital DS1 facility transmission network uses the 192 information bits of the DS1 digital signal frame to carry the unframed codes for initiating a facility loop-back test or for deactivation of the interface 200, another example for initiating a facility loop-back test is by using the inherent remote control feature of the facility loop-back diagnostics interface 200 by using command codes that are transmitted to the interface 200 from the central office of the telephone company or service provider (or from any other designated location within the DS1 facility transmission span, say for example, from the location of a repeater bay). This third method, usually requires the application of command codes to be transmitted on the receive side of the transmission path, and when received by the interface 200, will activate the interface 200, thereafter initiating a facility loop-back test and afterwards deactivating the interface 200 by a subsequent set of transmitted command codes. Another example for initiating a facility loop-back test is by using the remote control feature of the diagnostics interface 200 to initiate a loop-back test by transmitting framed, in-band command codes over the digital DS1 facility transmission network to the interface 200, since the in-band command codes use the 192 information bits of the DS1 digital signal frame (excluding the 193rd framing bit) to carry the codes for activating or deactivating the interface 200 (as any combination of "ones" and "zeros" can be achieved). This fourth method requires the application on the receive side transmission path of framed in-band codes to cause the interface 200 to either be activated, or thereafter deactivated, and accordingly initiate a facility loop-back test upon activation. Framed in-band command codes may be applied at any point in the DS1 facility transmission network without triggering any alarms in equipment positioned on both ends of the DS1 facility transmission path (e.g., the digital cross connect systems at the central office of the telephone company or service provider or the customer premises equipment 120 at the location of the end-user or subscriber). Finally, another example for initiating a facility loop-back test is by using the remote activation or deactivation of the interface 200 by using command codes transmitted on the 4 Kbps facility data link channel using the message structure of the extended superframe format that is compatible with the interface 200. The extended superframe format consists of 24 consecutive frames, each frame is a set of 192 information digit time slots, preceded by a 1 digit time slot containing the frame bit (F), for a total of 193 digit time slots per frame. The 8 Kbps F time slot is divided into a 2 Kbps framing pattern sequence, a 2 Kbps cyclic redundancy check, and a 4 Kbps data link channel. Also, there are two formats defined for the transmission of signals over the data link channel (i.e., a bit-oriented format and a message-oriented format). The 4 Kbps extended superframe format data link channel will be used to activate and deactivate the facility loop-back diagnostics interface 200, thereby initiating a facility loop-back test. The bit-oriented format will be used on the data link channel for the transmission of the interface 200 activation and deactivation sequences, as the bit-oriented signal format overwrites any other signals on the data link channel with respect to the loop-back command code sequence. The command code sequences are received and processed by all DS1 network equipment located between the remote location of the central office or repeater bay, where the activation or deactivation command code sequences will be transmitted, and the facility loop-back diagnostics interface 200. The use of this 4 Kbps facility data link channel (derived from the F bit sequence of the extended superframe format framing format) enables the facility loop-back test feature of the interface 200 to be remotely sequentially activated or deactivated selectively.

Figure 11A:
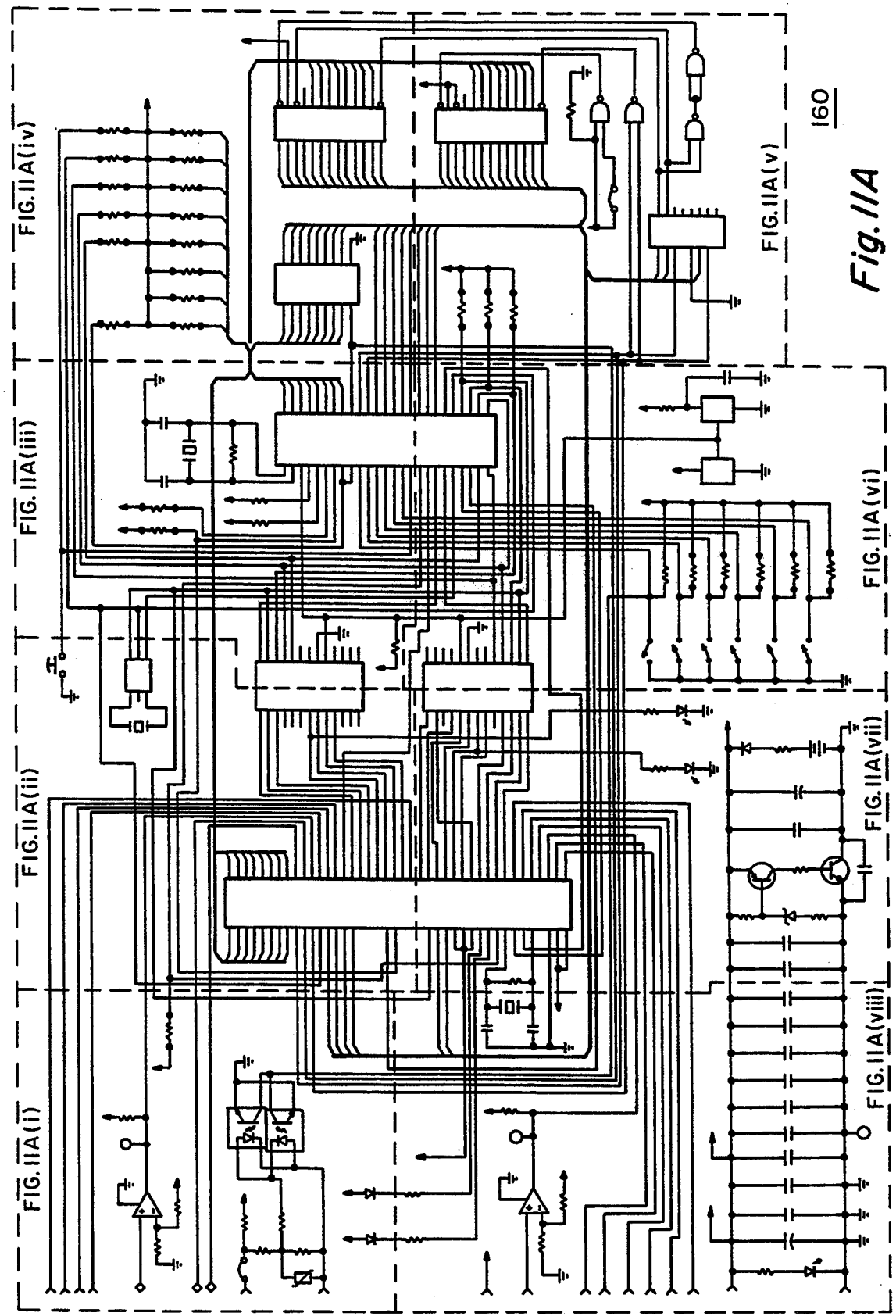
FIGS. 11A(i)–11A(viii) are a detailed electrical schematic circuit diagram of specific logic circuitry that is used to implement the performance monitoring digital logic microprocessor circuitry for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 11A is a detailed electrical schematic circuit diagram of specific logic circuitry that is used to implement the performance monitoring digital logic microprocessor circuitry for one particular embodiment of the present invention illustrating a full duplex facility loop-back test, diagnostics and maintenance system 1 with an intelligent microprocessor-based diagnostics interface having both diagnostics and continuous nonintrusive performance monitoring and storing capabilities which is used within a high-capacity digital network and that is built in accordance with the present invention.

Figure 11A:
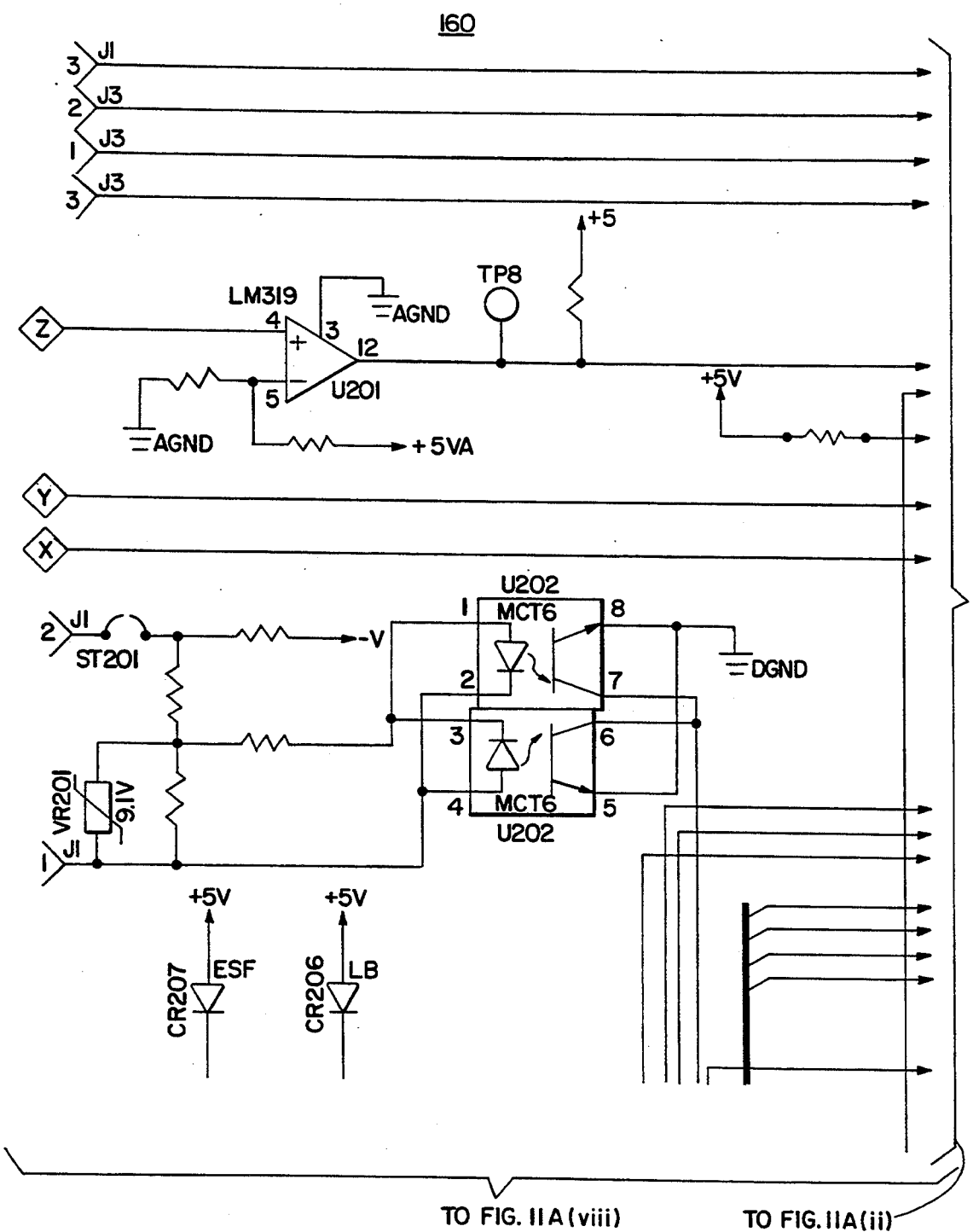
Figure 11B:
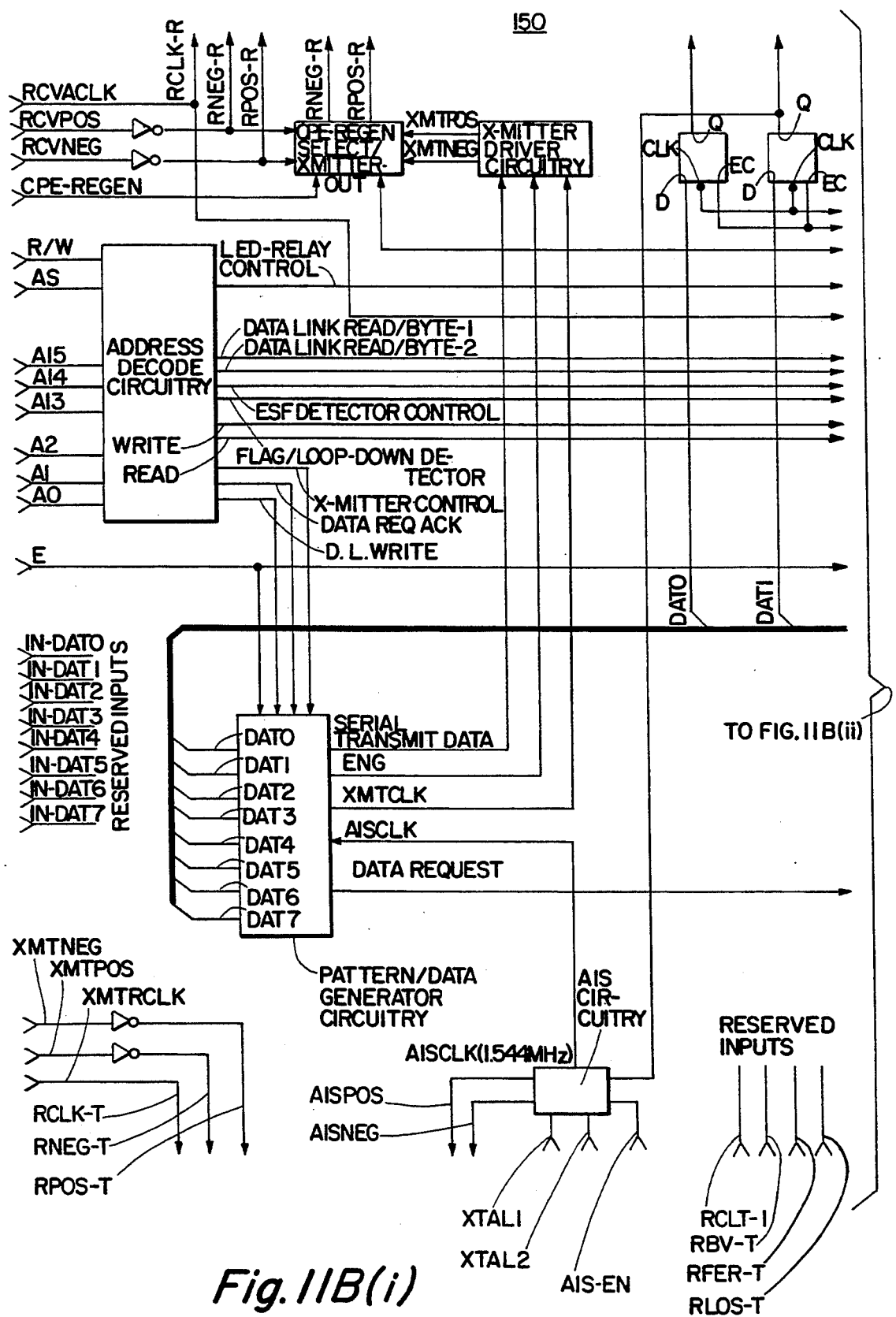
FIGS. 11B(i) and 11B(ii) a detailed electrical schematic circuit diagram of specific circuitry that is used to implement a portion of the operation of the block diagrams of FIGS. 5 and 6 relating to the performance monitoring digital logic microprocessor circuitry for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 11B is a detailed electrical schematic circuit diagram of specific circuitry that is used to implement a portion of the operation of the block diagrams of FIGS. 5 and 6 relating to the performance monitoring digital logic microprocessor circuitry for one particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. Referring to FIG. 11, the performance monitor 150 contains a 8-bit microprocessor 160, associated programmable logic array, solid-state nonvolatile random access memory, and associated performance monitoring circuitry in the form of a dedicated customized integrated circuit that is manufactured by Dallas Semiconductor (and is commonly referred to as DS2182). The microprocessor is manufactured by Motorola, Inc. (and is commonly referred to as 68HC11 chip). The microprocessor is coupled by an appropriate bus structure to a program memory containing program instructions for the microprocessor and form the central control logic of the internal processor.

The performance monitor 150 will provide nonintrusive performance monitoring capabilities for DS1 transmission spans using the superframe or extended superframe formats, and monitor the DS1 bitstream in both directions of transmission. Additionally, the performance monitor 150 will derive and maintain performance information or statistics independently for each direction of transmission, thereafter storing and retrieving the performance information, and downloading the stored performance information over the DS1 transmission span to the central office of the telephone company or service provider. At no time during the monitoring will the performance monitor 150 alter the received bit streams.

When the central office of the DS1 transmission facility is ready to receive the performance data and performance information stored in the interface 200, the DS1 transmission facility will use extended superframe format over the 4 Kbps facility data link channel to begin transmitting a LAP B idle line code onto the extended superframe format facility data link channel. The DS1 transmission facility must initially send the LAP B idle line code for at least 50 milli-seconds prior to sending a query or command with respect to down-loading the performance data and performance information by the interface 200. Once the DS1 transmission facility sends a command to the interface 200, the DS1 transmission facility can return to sending the LAP B idle line code onto the facility data link channel or return to the superframe mode of operation. Upon detection of a valid command, the diagnostics interface 200 will override the loop-back function (i.e., data from the A-Z direction will no longer be regenerated back in the Z-A direction by the diagnostics interface 200) and begin transmitting an extended superframe format framed, repeating "10101010's" pattern in the Z-A direction. Embedded into the facility data link of this repeating extended superframe format pattern will be the LAP B idle line code. The diagnostics interface 200 will transmit the idle line code for a minimum of three seconds before responding to the first command it receives, and will complete processing a received command before the interface 200 will react to all other commands. Thereafter, the diagnostics interface 200 will respond on the facility data link channel in the Z-A direction with an appropriate message (error or otherwise). Once the interface 200 has responded, the interface 200 will return to transmitting the LAPB idle line code on the facility data link for another 30 seconds. Should another command not be received by the interface 200 within that 30 second period, the interface 200 will return to its normal looped state of operation. However, if another command is received within the 30 second period, the interface 200 will respond immediately (i.e., the 3 seconds of idle line code will not be sent prior to the response). The receipt of this command within the 30 second window will always reset the 30 second timer, thereafter repeating the process.

In order to return the facility loop-back diagnostics interface 200 to its performance monitoring mode of operation, the DS1 transmission facility will send a superframe format loop-down code (i.e., "11100") towards the interface 200 in the A-Z direction. Upon detection of the loop-down code for the proper duration, the diagnostics interface 200 will immediately loop-down, thereafter the interface 200 will wait approximately 1-minute before returning to performance monitoring the DS1 transmission span for errors thereby allowing time for the loop-down signal to be removed and the DS1 transmission span returned to normal operation. In the nonlooped-up state, the DS1 bitstream transmitted in the A-Z direction will be constantly monitored by the performance monitor 150 for its error performance. Similarly, the DS1 bitstream transmitted in the Z-A direction will also be constantly monitored for its error performance. During this time, the diagnostics interface 200 will be storing and updating the performance data and derived performance information for each direction of transmission. The diagnostics interface may be looped-up or looped-down using either Extended Superframe Format or Superframe Format, depending on the type of transmission span that is present.

In order to request and retrieve the performance statistics from the diagnostics interface 200, the interface 200 initially must be looped-up. To activate loop-back, the DS1 transmission facility will transmit the extended superframe loop-up code towards the interface 200 in the A-Z direction. Upon detection of the loop-up code for the proper duration, the interface 200 will immediately loop-up. Once looped-up, the interface 200 will stop all performance monitoring activity and begin monitoring the A-Z direction for status requests or the extended superframe loop-down code. Any errors detected within the last 15 minute "monitoring window" will be subtracted from the current hour and current day error counts, thereby eliminating any errors that are caused when signal transmission was interrupted by the application of the loop-up pattern. In order to return the diagnostics interface 200 to its performance monitoring mode of operation, the interface 200 must be looped-down. To deactivate loop-back, the DS1 transmission facility will apply the extended superframe loop-down code toward in the interface 200 in the A-Z direction and upon detection of the loop-down code for the proper duration the interface 200 will immediately loop-down and return to performance monitoring the DS1 transmission span. Immediately after looping down, the interface 200 will wait approximately 1-minute before returning to performance monitoring the DS1 transmission span for errors in order to allow time for the loop-down code to be removed and the DS1 transmission span returned to normal operation.

On power up, the microprocessor marks the time by reading from the real-time clock and starts a 1-second timer. Every one-half second, the microprocessor goes out and serially reads the error counts collected by both the receive and transmit DS2182 chips and thereafter stores the information in associated nonvolatile battery backed-up random access memory. When the one-second timer times out, the error counts of the previous second interval are summed and stored. The microprocessor then resets the error counters in the associated DS2182's, resets the 1 second timer and continues to monitor for valid loop-up code. The process occurs continuously until a valid facility loop-up code is detected by the loop-up code detector of the interface 200. Once a valid loop-up code is detected, the microprocessor halts all performance monitoring activity, energizes the solenoids associated with the K1 relay and K2 relay and thereafter begins monitoring the receive signal path for a loop-down code or a status request code. When the relays are activated, the receive signal path form the DS1 facility is temporarily terminated with a 100 ohm resistor. The signal detected by the receive regenerator is then directed to the input of the loop-back regenerator driver. The output of the loop-back regenerator driver is connected to the transmit signal path through the K1 relay and K2 relay. This results in the signal being detected on the receive signal path form the DS1 facility side and is regenerated and transmitted back towards the DS1 facility of the telephone company or service provider. If the microprocessor detects a valid loop-down code it will release the K1 relay and K2 relay, thereby placing the interface 200 in its ready state with the microprocessor returning to its performance monitoring sequence. But if a valid command code has been detected on the receive signal path, the microprocessor will be interrupted and begin to access the data that has been previously stored (and which is being obtained from memory), process the data accordingly, and if requested, even down-loading the data to the central office.

The DS2182 integrated circuits utilize the data and clock from the regenerator to generate timing and control signals that is used by internal circuitry to detect loop-up and loop-down code patterns on the incoming receive signal path. In the extended superframe mode of operation, the microprocessor will be interrupted to indicate a valid loop-up or loop-down code is present on the line. The processor then reads the data that is being collected to determine if the interface 200 should be looped-up to initiate a facility loop-back test, or be looped-down to terminate a facility loop-back test. In the superframe mode of operation, the microprocessor is provided with error information and if the microprocessor is receiving valid loop-up or loop-down command codes, then no error pulses will be sent to the microprocessor. Should this error free condition exist for a designated time period, say 5.5 seconds, the microprocessor will cause the interface 200 to either loop-up to initiate a facility loop-back test, or loop-down to terminate a facility loop-back test.

The data being created by the performance monitoring of various variables relating to accessing in real-time the performance and quality of the DS1 digital signal being received and transmitted is continuous and the associated memory registers are limited and will fill up quickly, so the microprocessor has instructions to dump appropriate registers and thereafter stores the most current data in the registers, in effect using the registers as a sort of scratch pad, in order to be able to continuously store performance data for a designated period of time depending on the particular variable being monitored. This is all accomplished by the use of an internal real-time clock and synchronizing the performance monitoring and storing activity of the microprocessor to the specific cycle of the clock that has elapsed. In should be noted, that since the microprocessor 160 has software resident within, the performance monitor 150 has increased flexibility as the software (or its instruction sets) may be modified from time to time in order to achieve other types of synchronization alternatives to real-time synchronization presently envisioned, if so required in the future.

In this manner, once the facility loop-back diagnostics interface 200 has been installed it looks for loop-up command codes continuously. Consequently, once an end-user notifies the telephone company or service provider that there is a problem with its high-capacity digital service, from the remote location of the central office a command code can be transmitted down the DS1 facility cable transmission span to loop-up the interface 200 to conduct a facility loop-back test on the suspect digital circuit, thereby allowing the telephone company or service provider to examine the signal that is transmitted back to them from the interface 200. Should the signal being transmitted back from the interface 200 be fine, then the actual problem is known to exist with the customer premises equipment 120 of the end-user. Additionally, the other major function of the interface 200 is to continuously monitor performance of the digital signal for both the incoming receive signal path and the outgoing transmit signal path in a nonintrusive manner and simultaneously store this data in registers of nonvolatile memory. Therefore, if during a facility loop-back test being conducted by the interface 200, should the digital signal being transmitted back from the interface be problematic, the central office of the telephone company or service provider can have access to the previously stored performance history for this particular DS1 digital signal of the end-user by having the stored information down-loaded for further analysis and troubleshooting. Obviously, this approach is thereby possible for any point in the DS1 facility cable transmission span where a facility loop-back diagnostics interface 200 may be located.

As has been shown, the microprocessor 160 will be a shared chip and will conduct continuous nonintrusive performance monitoring of the digital signals from both sides of the incoming receive signal path and the outgoing transmit signal path and then repetitively store the performance data acquired in designated data registers that are located in associated nonvolatile random access memory.

A portion of the disclosure of this patent document contains material which is subject to copyright protection. The copyright owner has no objection to facsimile reproduction by anyone of the patent document as such appears in the Patent and Trademark Office patent file or records, but otherwise reserves all underlying pertinent copyright rights whatsoever. Accordingly, a program listing of the software program is attached hereto and hereby incorporated as part of this specification as Appendix I hereto (that is, a hexadecimal object code version [via a microfiche reproduction]) for use in the embodiment illustrated in FIGS. 7 through 12 relative to the microprocessor and associated integrated circuit chips; once this software program is resident in the microprocessor 160, the performance monitor 150 for the facility loop-back diagnostics interface 200 will operate under its direction.

Figure 12:
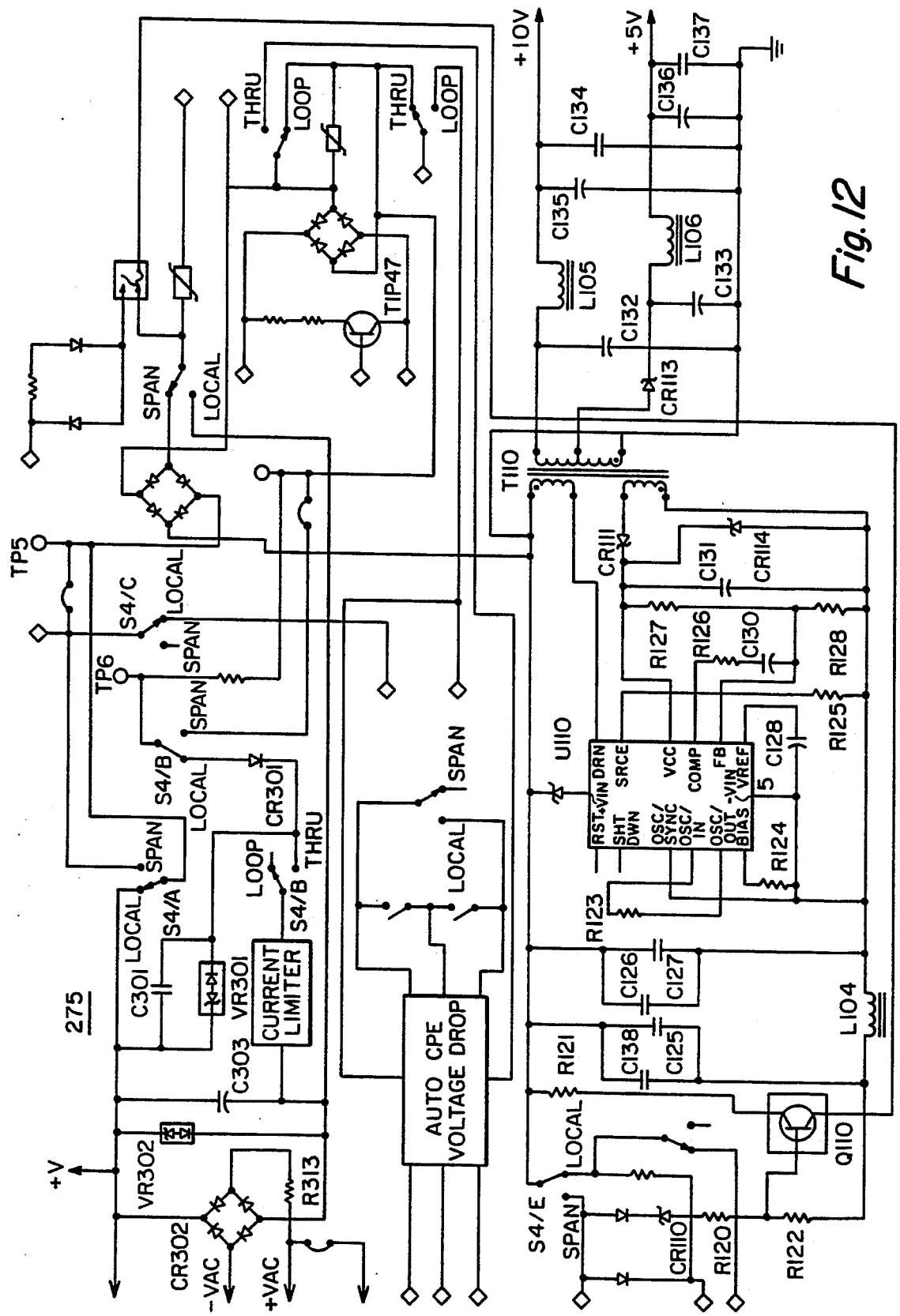
FIG. 12 is a detailed electrical schematic circuit diagram of specific circuitry that is used to implement a portion of the operation of the block diagrams of FIGS. 5 and 6 relating to the automatic customer premises equipment voltage drop and general power circuitry for one particular embodiment of the present invention illustrating a full duplex facility loop-back test, diagnostics and maintenance system with an intelligent microprocessor-based diagnostics interface having both diagnostics and continuous nonintrusive performance monitoring and storing capabilities which is used within a high-capacity digital network and that is built in accordance with the present invention.

FIG. 12 is a detailed electrical schematic circuit diagram of specific circuitry that is used to implement a portion of the operation of the block diagrams of FIGS. 5 and 6 .relating to the automatic customer premises equipment 120 voltage drop and general power circuitry 275 for one particular embodiment of the present invention illustrating a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. Referring to FIG. 12, the interface 200 may either be powered by span power or by local power. Since the incoming simplex DC is provided with its return through the customer premises equipment 120, if the customer premises equipment 120 were inadvertently opened, the return path would correspondingly be opened, thereby bringing down the entire DS1 transmission span (a negative situation to be avoided if at all possible). The automatic voltage drop circuitry 275 primarily are two types of circuits. First, a sensing circuit that senses that the load has dropped off. Second, a circuit that has, when required, a load (in the form of high wattage resistors) automatically placed across the automatic voltage drop circuitry.

In the sensing circuit there is a series resistor that senses when there is current being pulled through this circuit path and a pair or resistors that control transistors. As long as there is current flowing in the sensing circuit, the transistor is kept "on" by the series resistor. Further downstream in this sensing circuit are field effect transistors and zener diodes that determine the required voltage level that is required to be dropped. As long as there is current flowing in the sensing circuit, the upstream transistor will hold the downstream field effect transistors in the "off", but once the current is not flowing in the sensing circuit then the upstream transistor will turn "off" and the downstream field effect transistors will turn "on" which in conjunction with the respective zener diode will act as a bias for the field effect transistor, thereby allowing the current to flow through the field effect transistor.

Since the zener diode will not be able to handle the drop in volts that may be required, the second circuit is required that has a load which is automatically placed across by the use of a couple of high wattage resistors. The high wattage resistors are used to assist the field effect transistor in sharing the current, with the majority of the voltage getting dissipated by a heat build-up in this particular high power tip circuit, which can be relieved by an appropriately sized mechanical heatsink for the interface 200.

FIG. 13 illustrates a modified timing diagram for the frame bit assignments to establish communications over the DS1 channel utilizing the extended superframe format in which the Transaction Language 1 syntax command codes are multiplexed (i.e., embedded) within the 4 Kbps facility data link channel that is available and that is used in conjunction with the present invention for a full duplex facility loop-back test, diagnostics and maintenance system 1 with an intelligent microprocessor-based diagnostics interface 200 having both diagnostics and continuous nonintrusive performance monitoring and storing capabilities which is used within a high-capacity digital network and that is built in accordance with the present invention. For a detailed explanation of the appropriate command codes that are used with Transaction Language 1, see Bell Communications Research, Inc., Technical Advisory TA-TSY-000833 (as revised from time to time) and which is hereby incorporated by reference.

With respect to frame structure, each frame of information is delimited by a "flag" sequence which is a single octet consisting of a "zero" followed by six consecutive "one" bits followed by a "zero" bit. Through bit stuffing, this sequence will never occur within the frame itself. All invalid frames shall be discarded; an invalid frame is a frame that is not properly bounded by flags, or a frame that has fewer than 32 bits between flags, or a frame having a frame check sequence indicating transmission errors.

When no command or query is being sent (i.e., the line is idle), flags must be continuously sent. The first two octets of data after the opening flag consists of an address and control field. After these two fields, an information field follows. The information field must contain an integral number of octets. Following the information field is the 16-bit Frame Check Sequence (FCS) field. Finally the frame is terminated with a closing flag.

The frame check sequence shall be a 16-bit sequence and shall be the one complement of the sum (modulo 2) of the remainder, of $x^k(x^{15}+x^{14}+x^{13}+\ldots+x^2+x+1)$ divided by the generator polynomial, of $x^{16}+x^{12}+x^5+1$, where k is the number of bits in the frame existing between, but not including, the final bit of the opening flag and the first bit of the frame check sequence, excluding bits inserted for transparency; and the remainder after multiplication by $x^{16}$ and then division (modulo 2) by the generator polynomial, of $x^{16}+x^{12}+x^5+1$, of the content of the frame existing between, but not including, the final bit of the opening flag and the first bit of the frame check sequence, excluding bits inserted for transparency.

The address field is a single octet. The address field in the A-Z direction (i.e., from the DS1 transmission facility to the diagnostics interface 200) is fixed at "11000011". The address field in the Z-A direction (i.e., from the diagnostics interface 200 to the DS1 transmission facility) is fixed at "10000001". The control field is a single octet which is fixed for both directions of transmission at "00001000". The information field consists of an integral number of octets.

With respect to flag sequence, all frames shall start and end with the flag sequence consisting on one "zero" bit followed by six contiguous "one" bits followed by one "zero" bit. Prior to transmitting its initial query or command, the DS1 transmission facility must transmit the flag sequence for a minimum of 50 milli-seconds (i.e., 25 flags). This provides the performance monitor 150 with time to obtain both extended superframe format frame and LAP B frame synchronization. A single flag may be used as both the closing flag for one frame and the opening flag for the next frame. Note that the DS1 transmission facility must send at least one flag after the information block in order to terminate the query or command properly. The DS1 transmission facility is not allowed to send any additional commands until the DS1 transmission facility receives a response to its prior command or two seconds have passed without a response.

Data shall be transmitted least significant bit first. When transmitting, the transmitting device shall examine the frame content between the two flag sequences including the address field, the control field, the information field, and frame check sequence field and shall insert a "0" bit after all sequences of five contiguous "1" bits (including the last five bits of the frame check sequence) to ensure that a flag sequence is not simulated. When receiving, the receiver shall examine the frame content and shall discard any "0" bit which directly follows five contiguous "1" bits.

Referring now to FIG. 13, a frame is a set of 192 information digit time slots preceded by a one-digit time slot containing the Framing (F) bit, for a total of 193 digit time slots. The 192 information-digit time slots of the timing diagram of FIG. 13 may be positioned into 24 eight-bit time slots. Frame 1 is transmitted first using a Framing Pattern Sequence (FPS) that looks like this . . . 001011 . . . ; bits C1–C6 are transmitted over the Cyclic Redundancy Check (CRC) channel.

The LAP B Format has a N-bit information field (for transmission of bit streams consisting of ASCII character messages of various lengths) which is preceded by an 8-bit flag field, a 8-bit address field, and a 8-bit control field, and which is followed by a 8-bit check sum field and a 8-bit flag field. Each bit of the LAP B frame is then sequentially inserted into the Data Link bit of the ESF frame format.

In as much as the facility loop-back diagnostics interface 200 of the present invention is microprocessor-based, this means that all future variations of LAP B Format will be able to be accommodated by the present invention by accompanying revisions, updates or changes to the resident software within the microcomputer of the interface 200.

In Superframe format, a Superframe (SF) consists of twelve consecutive frames. In the superframe format the F bits are used for framing only, and are divided into two groups, namely, Terminal Framing bits (Ft) (that are used to identify frame boundaries) and Signaling Framing bits (Fs) (that are used to identify superframe boundaries). When the 192 information-digit time slots are channelized, the Fs bits are used to identify the robbed-bit signaling frames and associated signaling channels A and B, if used.

In an Extended Superframe format, an Extended Superframe (ESF) consists of 24 consecutive DS1 frames (e.g., 4632 bits). The F-bits of contiguous frames form an 8 Kbps channel. Previous DS1 formats used this channel entirely for terminal and signaling synchronization purposes. In the ESF, the capabilities of this channel are expanded by dividing the channel into three subchannels, namely, a 2 Kbps Terminal Synchronization Channel using 6 F-bits per Extended Superframe, a 2 Kbps Cyclic Redundancy Check (CRC) channel using 6 F-bits per Extended Superframe, and a 4 Kbps Data Link (DL) using 12 F-bits per Extended Superframe.

In the superframe format, the initial time slot is always the Framing (F) bit; in the extended superframe format, the initial time slot may alternatively be Cyclic Redundancy Check (CRC) or Data Link (DL), thereby enabling the data link to have audio information that is multiplexed on the data link channel to facilitate the digitized audio information or bit stream for Transaction Language 1 format.

While a specific embodiment of a novel apparatus and method for conducting remote facility loop-back testing and performance diagnostics related thereto has been described for the purpose of illustrating the manner in which the invention may be used and made, it should be understood that although the invention has been described by reference to particular embodiments thereof, many changes and modifications of the invention may become apparent to those skilled in the art without departing from the spirit and scope of the invention. All such modifications and changes as may reasonably and properly be included within the scope of our invention are intended to be included herein. Therefore, this invention should not be limited in scope to the particular embodiments shown and described herein, but only by the true spirit and scope of the basic underlying principles disclosed in the claims that follow.

Accordingly, we claim:

1. A full duplex digital transmission facility loop-back test, diagnostics and maintenance system, said system capable of initiating a facility loop-back test and predetermined diagnostics for a predetermined digital transmission span and customer premises equipment at the location of the network interface for a specified end-user, said system comprising in combination:

(A) a digital transmission facility and transmission medium comprising in combination:
  (i) means for originating a high-capacity digital signal of at least 1.544 Mbps from a predetermined location over a plurality of digital communications channels, the digital signal having multiple predetermined performance characteristics inherent thereto, said digital transmission facility having an originating first end and a terminating second end, said first end and said second end being operatively coupled by a plurality of digital transmission spans of predetermined lengths;
  (ii) means for transmitting said high-capacity digital signal over said digital communications channel including any predetermined digital transmission span to a single end-user location selected from a plurality of end-user locations;
  (iii) means for receiving said high-capacity digital signal from said digital communications channel by a predetermined single end-user location selected from a plurality of end-user locations; and
(B) at least one microprocessor-based facility loop-back diagnostics interface, said interface having a performance monitoring mode of operation and a maintenance mode of operation, said facility loop-back diagnostics interface comprising:
  (i) means for operatively locating the interface at any predetermined location selected from a plurality of available end-user locations;
  (ii) means for continuous and nonintrusive monitoring of a plurality of predetermined performance characteristics relating to a digital DS1 communications channel, thereafter producing an output signal corresponding to each of said multiple performance characteristics, said output signal having associated binary content in response to the performance characteristics;
  (iii) means for storing the binary content of each of said output signals for a predetermined period of time;

(iv) means responsive to adapting predetermined protocols pertaining to said digital DS1 communications channel and to the transmission and reception of digital signals within said digital DS1 communications channel, said protocol being selected from a plurality of available protocols;

(v) means responsive to adapting a particular syntax pertaining to a first and a second set of predetermined command codes for the particular protocol utilized;

(vi) means for receiving said first set of predetermined command codes from any predetermined location of a digital DS1 communications channel to place said interface into a predetermined mode of operation, said interface thereafter responding by initiating a facility loop-back test from any predetermined location within the DS1 communications channel to the location of the network interface;

(vii) means for receiving said second set of predetermined command codes from any predetermined location of said digital DS1 communications channel; and (viii) means responsive to said second set of predetermined command codes for down-loading said stored binary content to a predetermined location within the digital DS1 communications channel.

2. The full duplex digital transmission facility loop-back test, diagnostics and maintenance system in accordance with claim 1, wherein the means responsive to adapting a predetermined protocol pertaining to said digital DS1 communications channel is responsive to LAP-B Protocol.

3. The full duplex digital transmission facility loop-back test, diagnostics and maintenance system in accordance with claim 1, wherein the means responsive to adapting a particular syntax pertaining to said first set of predetermined command codes is responsive to Superframe format.

4. The full duplex digital transmission facility loop-back test, diagnostics and maintenance system in accordance with claim 1, wherein the means responsive to adapting a particular syntax pertaining to said second set of predetermined command codes is responsive to Transaction Language One syntax.

5. The full duplex digital transmission facility loop-back test, diagnostics and maintenance system in accordance with claim 1, wherein the means responsive to adapting a particular syntax pertaining to said first and said second sets of predetermined command codes is responsive to Extended Superframe format.

6. The full duplex digital transmission facility loop-back test, diagnostics and maintenance system in accordance with claim 1, wherein the means responsive to adapting a particular syntax pertaining to said second set of predetermined command codes is further responsive to a data stream of Transaction Language One syntax within a Extended Superframe data stream utilizing LAP-B Protocol.

7. The full duplex digital transmission facility loop-back test, diagnostics and maintenance system in accordance with claim 6, wherein the means responsive to adapting a particular syntax pertaining to said first and said second sets of predetermined command codes is further responsive to a data stream of Transaction Language One syntax within a Extended Superframe data stream utilizing LAP-B Protocol and further facilitates queries and responses that utilize Transaction Language One commands which are transmitted and received in Extended Superframe format within the 4 Kbps facility data link embedded operations channel associated with the digital DS1 communications channel.

8. A full duplex digital transmission facility loop-back test, diagnostics and maintenance system, said system capable of initiating a facility loop-back test and predetermined diagnostics for a predetermined digital transmission span and customer premises equipment at the location of the network interface for a specified end-user, said system comprising in combination:

(A) a digital transmission facility and transmission medium comprising in combination:
  (i) means for originating a high-capacity digital signal of at least 1.544 Mbps from a predetermined location over a plurality of digital communications channels, the digital signal having multiple predetermined performance characteristics inherent thereto, said digital transmission facility having an originating first end and a terminating second end, said first end and said second end being operatively coupled by a plurality of digital transmission spans of predetermined lengths;
  (ii) means for transmitting said high-capacity digital signal over said digital communications channel including any predetermined digital transmission span to a single end-user location selected from a plurality of end-user locations;
  (iii) means for receiving said high-capacity digital signal from said digital communications channel by a predetermined single end-user location selected from a plurality of end-user locations; and (B) at least one microprocessor-based facility loop-back diagnostics interface, said interface having a performance monitoring mode of operation and a maintenance mode of operation, said facility loop-back diagnostics interface comprising:
  (i) means for operatively locating the interface at any predetermined location selected from a plurality of available end-user locations;
  (ii) means for continuous and nonintrusive monitoring of a plurality of predetermined performance characteristics relating to a digital DS1 communications channel, thereafter producing an output signal corresponding to each of said multiple performance characteristics, said output signal having associated binary content in response to the performance characteristics;
  (iii) means for storing the binary content of each of said output signals for a predetermined period of time;
  (iv) means for deriving certain predetermined performance information relative to said binary content and thereafter storing said performance information for a predetermined period of time;
  (v) means responsive to adapting predetermined protocols pertaining to said digital DS1 communications channel and to the transmission and reception of digital signals within said digital DS1 communications channel, said protocol being selected from a plurality of available protocols;
  (vi) means responsive to adapting a particular syntax pertaining to a first and a second set of predetermined command codes for the particular protocol utilized;

(vii) means for receiving said first set of predetermined command codes from any predetermined location of a digital DS1 communications channel to place said interface into a predetermined mode of operation, said interface thereafter responding by initiating a facility loop-back test from any predetermined location within the DS1 communications channel to the location of the network interface;

(viii) means for receiving said second set of predetermined command codes from any predetermined location of said digital DS1 communications channel; and (ix) means responsive to said second set of predetermined command codes for down-loading said stored binary content and said performance information to a predetermined location within the digital DS1 communications channel.

9. The full duplex digital transmission facility loop-back test, diagnostics and maintenance system in accordance with claim 8, wherein the means responsive to adapting a predetermined protocol pertaining to said digital DS1 communications channel is responsive to LAP-B Protocol.

10. The full duplex digital transmission facility loop-back test, diagnostics and maintenance system in accordance with claim 8, wherein the means responsive to adapting a particular syntax pertaining to said first set of predetermined command codes is responsive to Superframe format.

11. The full duplex digital transmission facility loop-back test, diagnostics and maintenance system in accordance with claim 8, wherein the means responsive to adapting a particular syntax pertaining to said second set of predetermined command codes is responsive to Transaction Language One syntax.

12. The full duplex digital transmission facility loop-back test, diagnostics and maintenance system in accordance with claim 8, wherein the means responsive to adapting a particular syntax pertaining to said first and said second sets of predetermined command codes is responsive to Extended Superframe format.

13. The full duplex digital transmission facility loop-back test, diagnostics and maintenance system in accordance with claim 8, wherein the means responsive to adapting a particular syntax pertaining to said second set of predetermined command codes is further responsive to a data stream of Transaction Language One syntax within a Extended Superframe data stream utilizing LAP-B Protocol.

14. The full duplex digital transmission facility loop-back test, diagnostics and maintenance system in accordance with claim 13, wherein the means responsive to adapting a particular syntax pertaining to said first and said second sets of predetermined command codes is further responsive to a data stream of Transaction Language One syntax within a Extended Superframe data stream utilizing LAP-B Protocol and further facilitates queries and responses that utilize Transaction Language One commands which are transmitted and received in Extended Superframe format within the 4 Kbps facility data link embedded operations channel associated with the digital DS1 communications channel.

15. A full duplex digital transmission facility loop-back test, diagnostics and maintenance system, said system capable of initiating a facility loop-back test and predetermined diagnostics for a predetermined digital transmission span and customer premises equipment at the location of the network interface for a specified end-user, said system comprising in combination:

(A) a digital transmission facility and transmission medium comprising in combination:

(i) means for originating a high-capacity digital signal of at least 1.544 Mbps from a predetermined location over a plurality of digital communications channels, the digital signal having multiple predetermined performance characteristics inherent thereto, said digital transmission facility having an originating first end and a terminating second end, said first end and said second end being operatively coupled by a plurality of digital transmission spans of predetermined lengths;

(ii) means for transmitting said high-capacity digital signal over said digital communications channel including any predetermined digital transmission span to a single end-user location selected from a plurality of end-user locations;

(iii) means for receiving said high-capacity digital signal from said digital communications channel by a predetermined single end-user location selected from a plurality of end-user locations; and (B) at least one microprocessor-based facility loop-back diagnostics interface, said interface having a performance monitoring mode of operation and a maintenance mode of operation, said facility loop-back diagnostics interface comprising:

(i) means for operatively locating the interface at any predetermined location selected from a plurality of available end-user locations;

(ii) means for continuous and nonintrusive monitoring in real-time of a plurality of multiple predetermined performance characteristics relating to a digital DS1 communications channel, thereafter producing an output signal corresponding to each of said multiple performance characteristics, said output signal having associated binary content in response to the performance characteristics;

(iii) means for storing the binary content of each of said output signals in associated nonvolatile memory means for a predetermined period of time;

(iv) means responsive to adapting predetermined protocols pertaining to said digital DS1 communications channel and to the transmission and reception of digital signals within said digital DS1 communications channel, said protocol being selected from a plurality of available protocols;

(v) means responsive to adapting a particular syntax pertaining to a first and a second set of predetermined command codes for the particular protocol utilized;

(vi) means for receiving said first set of predetermined command codes from any predetermined location of a digital DS1 communications channel to place said interface into a predetermined mode of operation, said interface thereafter responding by initiating a facility loop-back test from any predetermined location within the DS1 communications channel to the location of the network interface;

(vii) means for receiving said second set of predetermined command codes from any predetermined location of said digital DS1 communications channel; and (viii) means responsive to said second set of predetermined command codes for down-loading said stored binary content to a predetermined location within the digital DS1 communications channel.

16. The full duplex digital transmission facility loop-back test, diagnostics and maintenance system in accordance with claim 15, wherein the means responsive to adapting a predetermined protocol pertaining to said digital DS1 communications channel is responsive to LAP-B Protocol.

17. The full duplex digital transmission facility loop-back test, diagnostics and maintenance system in accordance with claim 15, wherein the means responsive to adapting a particular syntax pertaining to said first set of predetermined command codes is responsive to Superframe format.

18. The full duplex digital transmission facility loop-back test, diagnostics and maintenance system in accordance with claim 15, wherein the means responsive to adapting a particular syntax pertaining to said second set of predetermined command codes is responsive to Transaction Language One syntax.

19. The full duplex digital transmission facility loop-back test, diagnostics and maintenance system in accordance with claim 15, wherein the means responsive to adapting a particular syntax pertaining to said first and said second sets of predetermined command codes is responsive to Extended Superframe format.

20. The full duplex digital transmission facility loop-back test, diagnostics and maintenance system in accordance with claim 15, wherein the means responsive to adapting a particular syntax pertaining to said second set of predetermined command codes is further responsive to a data stream of Transaction Language One syntax within a Extended Superframe data stream utilizing LAP-B Protocol.

21. The full duplex digital transmission facility loop-back test, diagnostics and maintenance system in accordance with claim 20, wherein the means responsive to adapting a particular syntax pertaining to said first and said second sets of predetermined command codes is further responsive to a data stream of Transaction Language One syntax within a Extended Superframe data stream utilizing LAP-B Protocol and further facilitates queries and responses that utilize Transaction Language One commands which are transmitted and received in Extended Superframe format within the 4 Kbps facility data link embedded operations channel associated with the digital DS1 communications channel.

22. A full duplex digital transmission facility loop-back test, diagnostics and maintenance system, said system capable of initiating a facility loop-back test and predetermined diagnostics for a predetermined digital transmission span and customer premises equipment at the location of the network interface for a specified end-user, said system comprising in combination:

(A) a digital transmission facility and transmission medium comprising in combination:

(i) means for originating a high-capacity digital signal of at least 1.544 Mbps from a predetermined location over a plurality of digital communications channels, the digital signal having multiple predetermined performance characteristics inherent thereto, said digital transmission facility having an originating first end and a terminating second end, said first end and said second end being operatively coupled by a plurality of digital transmission spans of predetermined lengths;

(ii) means for transmitting said high-capacity digital signal over said digital communications channel including any predetermined digital transmission span to a single end-user location selected from a plurality of end-user locations;

(iii) means for receiving said high-capacity digital signal from said digital communications channel by a predetermined single end-user location selected from a plurality of end-user locations; and (B) at least one microprocessor-based facility loop-back diagnostics interface, said interface having a performance monitoring mode of operation and a maintenance mode of operation, said facility loop-back diagnostics interface comprising:

(i) means for operatively locating the interface at any predetermined location selected from a plurality of available end-user locations;

(ii) means for continuous and nonintrusive monitoring in real-time of a plurality of multiple predetermined performance characteristics relating to a digital DS1 communications channel, thereafter producing an output signal corresponding to each of said multiple performance characteristics, said output signal having associated binary content in response to the performance characteristics;

(iii) means for storing the binary content of each of said output signals in associated nonvolatile memory means for a predetermined period of time;

(iv) means for deriving certain predetermined performance information relative to said binary content and thereafter storing said performance information in associated nonvolatile memory means for a predetermined period of time;

(v) means responsive to adapting predetermined protocols pertaining to said digital DS1 communications channel and to the transmission and reception of digital signals within said digital DS1 communications channel, said protocol being selected from a plurality of available protocols;

(vi) means responsive to adapting a particular syntax pertaining to a first and a second set of predetermined command codes for the particular protocol utilized;

(vii) means for receiving said first set of predetermined command codes from any predetermined location of a digital DS1 communications channel to place said interface into a predetermined mode of operation, said interface thereafter responding by initiating a facility loop-back test from any predetermined location within the DS1 communications channel to the location of the network interface;

(viii) means for receiving said second set of predetermined command codes from any predetermined location of said digital DS1 communications channel; and (ix) responsive to said second set of predetermined command codes for down-loading said stored binary content and said performance information to a predetermined location within the digital DS1 communications channel.

23. The full duplex digital transmission facility loopback test, diagnostics and maintenance system in accordance with claim 22, wherein the means responsive to adapting a predetermined protocol pertaining to said digital DS1 communications channel is responsive to LAP-B Protocol.

24. The full duplex digital transmission facility loopback test, diagnostics and maintenance system in accordance with claim 22, wherein the means responsive to adapting a particular syntax pertaining to said first set of predetermined command codes is responsive to Superframe format.

25. The full duplex digital transmission facility loopback test, diagnostics and maintenance system in accordance with claim 22, wherein the means responsive to adapting a particular syntax pertaining to said second set of predetermined command codes is responsive to Transaction Language One syntax.

26. The full duplex digital transmission facility loopback test, diagnostics and maintenance system in accordance with claim 22, wherein the means responsive to adapting a particular syntax pertaining to said first and said second sets of predetermined command codes is responsive to Extended Superframe format.

27. The full duplex digital transmission facility loopback test, diagnostics and maintenance system in accordance with claim 22, wherein the means responsive to adapting a particular syntax pertaining to said second set of predetermined command codes is further responsive to a data stream of Transaction Language One syntax within a Extended Superframe data stream utilizing LAP-B Protocol.

28. The full duplex digital transmission facility loopback test, diagnostics and maintenance system in accordance with claim 27, wherein the means responsive to adapting a particular syntax pertaining to said first and said second sets of predetermined command codes is further responsive to a data stream of Transaction Language One syntax within a Extended Superframe data stream utilizing LAP-B Protocol and further facilitates queries and responses that utilize Transaction Language One commands which are transmitted and received in Extended Superframe format within the 4 Kbps facility data link embedded operations channel associated with the digital DS1 communications channel.

* * * * *